(12) United States Patent
Chujoh et al.

(10) Patent No.: US 7,376,187 B2
(45) Date of Patent: May 20, 2008

(54) MOVING PICTURE CODING AND/OR DECODING SYSTEMS, AND VARIABLE-LENGTH CODING AND/OR DECODING SYSTEM

(75) Inventors: Takeshi Chujoh, Tokyo-to (JP);
Toshiaki Watanabe, Yokohama (JP);
Yoshihiro Kikuchi, Yokohama (JP);
Takeshi Nagai, Tokyo-to (JP)

(73) Assignee: Kabushiki Kaisha Toshiba, Kanwasaki-shi (JP)

( * ) Notice: Subject to any disclaimer, the term of this patent is extended or adjusted under 35 U.S.C. 154(b) by 0 days.

(21) Appl. No.: 11/686,807

(22) Filed: Mar. 15, 2007

(65) Prior Publication Data

US 2007/0205928 A1 Sep. 6, 2007

Related U.S. Application Data

(60) Continuation of application No. 10/682,831, filed on Oct. 10, 2003, now abandoned, which is a continuation of application No. 09/476,088, filed on Jan. 3, 2000, now Pat. No. 6,704,494, which is a division of application No. 08/924,387, filed on Sep. 5, 1997, now Pat. No. 6,104,754, which is a continuation-in-part of application No. 08/616,809, filed on Mar. 15, 1996, now Pat. No. 5,852,469.

(30) Foreign Application Priority Data

| Mar. 15, 1995 | (JP) | ................................. 7-056285 |
| Apr. 14, 1995 | (JP) | ................................. 7-089772 |
| Oct. 6, 1995 | (JP) | ................................. 7-260383 |
| Oct. 25, 1995 | (JP) | ................................. 7-277982 |
| Mar. 8, 1996 | (JP) | ................................. 8-080550 |
| Sep. 6, 1996 | (JP) | ................................. 8-236779 |
| Nov. 11, 1996 | (JP) | ................................. 8-298779 |
| Mar. 31, 1997 | (JP) | ................................. 9-081614 |

(51) Int. Cl.
*H04N 7/18* (2006.01)

(52) U.S. Cl. .................. 375/240.23; 341/67

(58) Field of Classification Search ........... 375/240.23; 341/65.67
See application file for complete search history.

(56) References Cited

U.S. PATENT DOCUMENTS 4,353,090 A    10/1982   Broadbent (Continued)

FOREIGN PATENT DOCUMENTS

EP        0 267 578         5/1988

(Continued)

OTHER PUBLICATIONS

U.S. Appl. No. 11/666,790, filed Mar. 15, 2007, Chujoh et al.

(Continued)

*Primary Examiner*—Anand Rao
(74) *Attorney, Agent, or Firm*—Foley & Lardner LLP

(57) ABSTRACT

A coding and/or decoding system includes: a code-word table for storing therein a plurality of code words, which are capable of being decoded both in forward and backward directions and which are formed so that delimiters of the code words are capable of being identified by a predetermined weight of the code words, so that the code words correspond to different source symbols; an encoder for selecting code words corresponding to inputted source symbols from the code-word table; and a synchronization interval setting part for preparing coded data every predetermined interval using the code words selected by the encoder and for inserting stuffing codes capable of being decoded in the backward direction. Thus, it is possible to decrease useless bit patterns to enhance the coding efficiency by smaller amounts of calculation and storage, and to decode variable length codes both in the forward and backward directions even if the synchronization interval is set every interval using the stuffing bits.

9 Claims, 62 Drawing Sheets

U.S. PATENT DOCUMENTS

| | | | |
|---|---|---|---|
| 4,513,317 A | 4/1985 | Ruoff | |
| 4,569,050 A | 2/1986 | Ohme | |
| 5,168,356 A | 12/1992 | Acampora et al. | |
| 5,302,949 A | 4/1994 | Yoshinari et al. | |
| 5,392,037 A | 2/1995 | Kato | |
| 5,392,223 A | 2/1995 | Caci | |
| 5,440,345 A | 8/1995 | Shimoda | |
| 5,469,273 A | 11/1995 | Demura | |
| 5,488,616 A | 1/1996 | Takishima | |
| 5,512,939 A | 4/1996 | Zhou | |
| 5,563,593 A | 10/1996 | Puri | |
| 5,621,466 A | 4/1997 | Miyane et al. | |
| 5,625,356 A | 4/1997 | Lee et al. | |
| 5,751,363 A | 5/1998 | Miyamoto | |
| 5,761,345 A | 6/1998 | Saito et al. | |
| 5,781,131 A | 7/1998 | Shimpuku et al. | |
| 5,812,787 A | 9/1998 | Astle | |
| 6,009,236 A | 12/1999 | Mishima et al. | |
| 6,011,901 A | 1/2000 | Kirsten | |
| 6,104,754 A * | 8/2000 | Chujoh et al. | 375/240.23 |
| 6,385,251 B1 | 5/2002 | Talluri et al. | |
| 6,621,869 B2 | 9/2003 | Talluri et al. | |
| 6,704,494 B1 | 3/2004 | Chujoh et al. | |
| 6,876,705 B2 * | 4/2005 | Katsavounidis et al. | 375/240.28 |
| 2004/0101054 A1 | 5/2004 | Chujoh et al. | |
| 2007/0160148 A1 | 7/2007 | Chujoh et al. | |
| 2007/0160149 A1 | 7/2007 | Chujoh et al. | |
| 2007/0160150 A1 | 7/2007 | Chujoh et al. | |

FOREIGN PATENT DOCUMENTS

| | | |
|---|---|---|
| EP | 0 453 229 | 10/1991 |
| EP | 0 499 303 | 8/1992 |
| EP | 0 508 606 | 10/1992 |
| EP | 0 554 871 | 8/1993 |
| EP | 0 595 242 | 5/1994 |
| JP | 02-056187 | 2/1990 |
| JP | 04-079687 | 3/1992 |
| JP | 04-219033 | 8/1992 |
| JP | 04-249492 | 9/1992 |
| JP | 5-111012 | 4/1993 |
| JP | 05-505077 | 7/1993 |
| JP | 05-252499 | 9/1993 |
| JP | 05-300027 | 11/1993 |
| JP | 06-014311 | 1/1994 |
| JP | 06-078157 | 3/1994 |
| JP | 06-205384 | 7/1994 |
| JP | 06-291673 | 10/1994 |
| JP | 06-303588 | 10/1994 |
| JP | 07-067109 | 3/1995 |
| JP | 07-123359 | 5/1995 |
| JP | 8-340258 | 12/1996 |
| WO | WO-93/18616 | 9/1993 |

OTHER PUBLICATIONS

U.S. Appl. No. 11/686,815, filed Mar. 15, 2007, Chujoh et al.

Watanabe et al., "Error Resilient Low-Bitrate Video Coding For MPEG4," Technology Research Report by The Institute of Electronics Information and Communication Engineers, vol. 95, No. 581, IE95-145, Mar. 14, 1996, pp. 37-44.

A.S. Fraenkel et al., "Bidirectional Huffman Coding," The Computer Journal, vol. 33:4, 1990, pp. 296-307.

K.M. Rose et al., "Enhancement of One-Dimensional Variable-Length DPCM Images Corrupted by Transmission Errors," IEEE Transactions of Comm., vol. 37:4, Apr. 1989, pp. 373-379.

S.K. Muttoo et al., "A Reversible Code Over," Kybernetika, vol. 22:1, 1986, pp. 85-91.

Y. Miyakawa, et al., "New Binary Encoding Schemes of Positive Integers," IEICE Transactions, vol. E74:9, 1991, pp. 2504-2511.

Japanese Office Action issued on Aug. 24, 2007 to Japanese Patent Application No. 2005-342726, 2 pages and an English Translation, 2 pages.

Japanese Office Action issued on Aug. 24, 2007 to Japanese Patent Application No. 2005-342732, 2 pages and an English Translation, 2 pages.

* cited by examiner

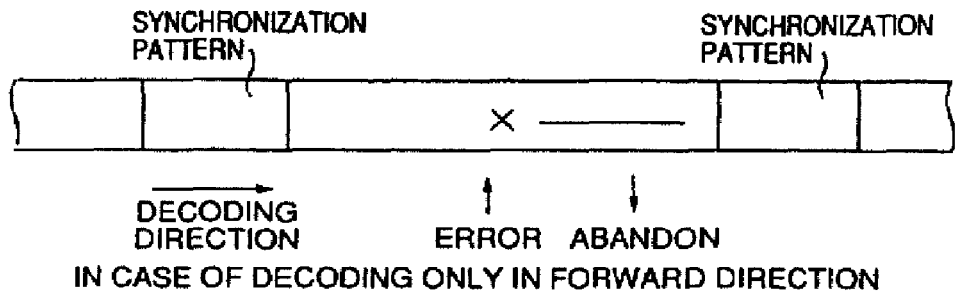
FIG.1A — IN CASE OF DECODING ONLY IN FORWARD DIRECTION
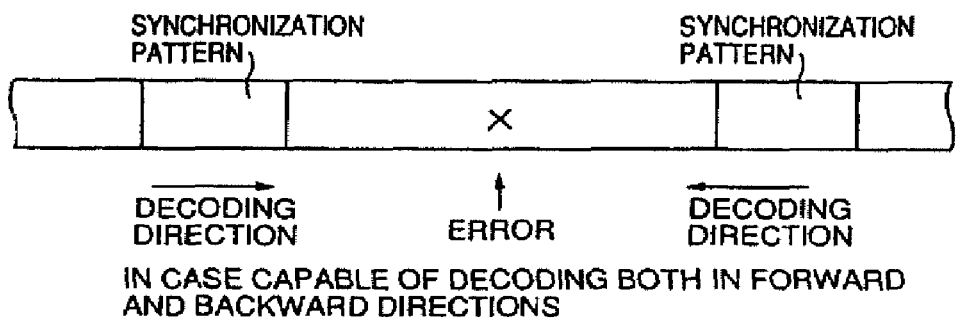
FIG.1B — IN CASE CAPABLE OF DECODING BOTH IN FORWARD AND BACKWARD DIRECTIONS
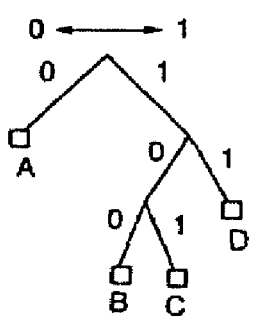
FIG.2A
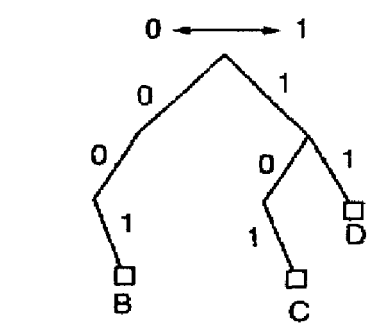
FIG.2B — DECODING TREE IN FORWARD DIRECTION
FIG.2C — DECODING TREE IN BACKWARD DIRECTION (DISABLE TO INSTANTANEOUSLY DECODE)

|   | FORWARD DIRECTION | BACKWARD DIRECTION |
|---|---|---|
| A | 0 | 0 |
| B | 1 1 1 | 1 1 1 |
| C | 1 0 1 1 | 1 1 0 1 |
| D | 1 1 0 1 | 1 0 1 1 |
FIG.3A PRIOR ART
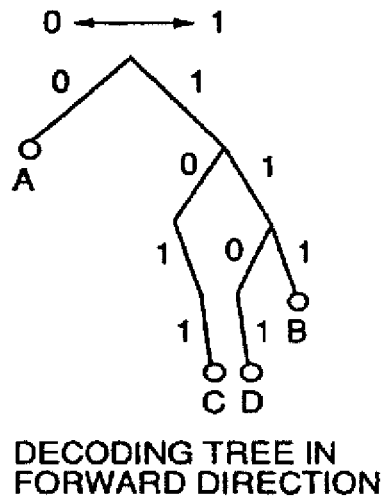
DECODING TREE IN
FORWARD DIRECTION
FIG.3B
PRIOR ART
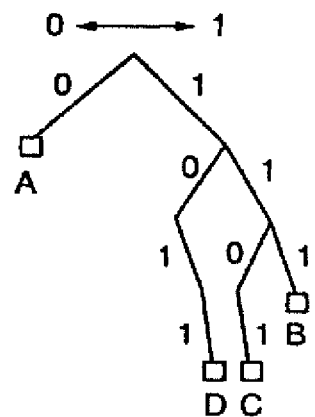
DECODING TREE IN
BACKWARD DIRECTION
FIG.3C
PRIOR ART
1  0
2  0 0
3  0 0 0
4  0 0 0 0
5  0 0 0 0
⋮  ⋮
M  0 0 0 ... 0 0
   ⎵⎵⎵⎵⎵⎵⎵
         M
FIG.4 PRIOR ART

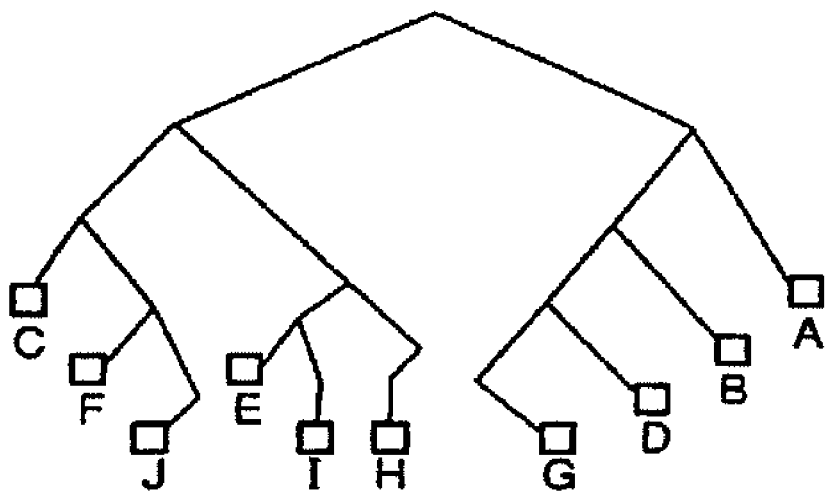
DECODING TREE IN FORWARD DIRECTION
F I G. 9A
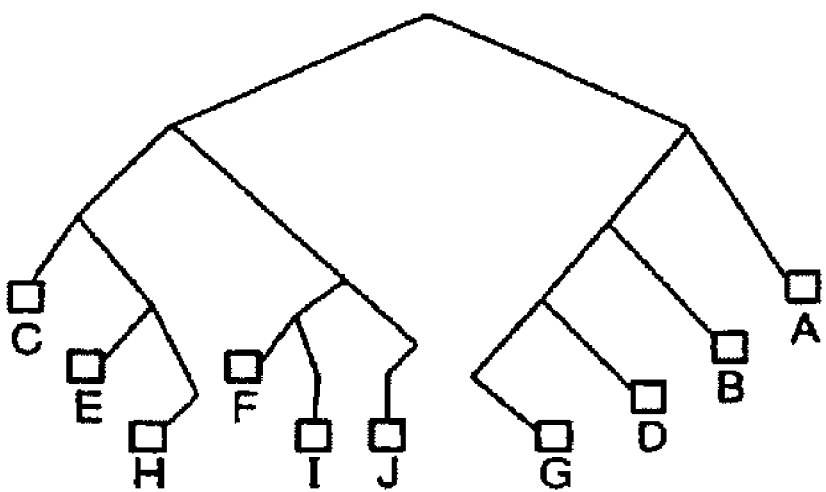
DECODING TREE IN BACKWARD DIRECTION
F I G. 9B

```
0              0 0
1 1            0 1
1 0 1   + 0 →  1 0   1 0
1 0 0 1     1  1 0   1 1
               1 1   1 0
               1 1   1 0
               1 0   0 0   1 0
               1 0   0 0   1 1
               1 0   0 1   1 0
               1 0   0 1   1 1
               1 1   0 0   1 0
               1 1   0 0   1 1
               1 1   0 1   1 0
               1 1   0 1   1 1
```
FIG.11
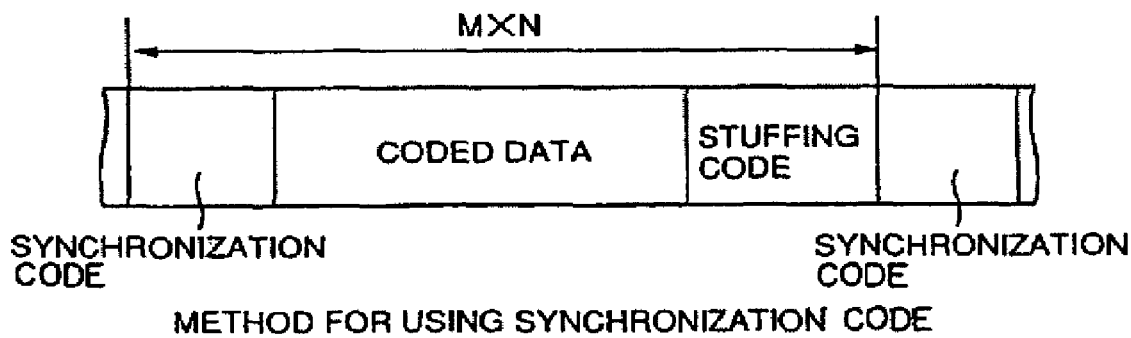
METHOD FOR USING SYNCHRONIZATION CODE
FIG.12A
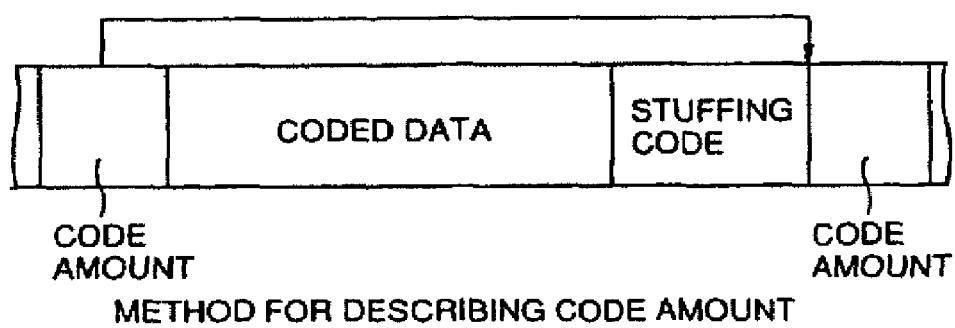
METHOD FOR DESCRIBING CODE AMOUNT
FIG.12B

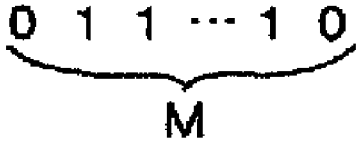
F I G. 13
F I G. 14

WHEN WAYS DO NOT OVERLAP EACH OTHER

WHEN WAYS OVERLAP EACH OTHER

WHEN ERROR IS DETECTED ONLY IN ONE WAY

WHEN ERROR IS DETECTED AT SAME CODE-WORD

SYNCHRONIZATION INTERVAL

UPPER LAYER

LOWER LAYER

| INTRA | | | INTER | | | VLC_CODE |
|---|---|---|---|---|---|---|
| LAST | RUN | LEVEL | LAST | RUN | LEVEL | |
| 0 | 0 | 1 | 0 | 0 | 1 | 110s |
| 0 | 0 | 2 | 0 | 1 | 1 | 111s |
| 0 | 1 | 1 | 0 | 2 | 1 | 1010s |
| 0 | 0 | 3 | 0 | 3 | 1 | 1011s |
| 0 | 2 | 1 | 0 | 0 | 2 | 00101s |
| 0 | 0 | 4 | 0 | 4 | 1 | 01000s |
| 0 | 3 | 1 | 0 | 5 | 1 | 01001s |
| 0 | 1 | 2 | 0 | 6 | 1 | 10010s |
| 0 | 4 | 1 | 0 | 7 | 1 | 10011s |
| 0 | 0 | 5 | 0 | 8 | 1 | 011000s |
| 0 | 5 | 1 | 0 | 9 | 1 | 011001s |
| 0 | 6 | 1 | 0 | 10 | 1 | 100010s |
| 0 | 1 | 3 | 0 | 11 | 1 | 100011s |
| 0 | 7 | 1 | 0 | 0 | 3 | 0110101s |
| 0 | 0 | 6 | 0 | 1 | 2 | 0111000s |
| 0 | 2 | 2 | 0 | 12 | 1 | 0111001s |
| 0 | 3 | 2 | 0 | 13 | 1 | 1000010s |
| 0 | 8 | 1 | 0 | 14 | 1 | 1000011s |
| 0 | 0 | 7 | 0 | 2 | 2 | 01110100s |
| 0 | 1 | 4 | 0 | 15 | 1 | 01110101s |
| 0 | 9 | 1 | 0 | 3 | 2 | 01111000s |
| 0 | 4 | 2 | 0 | 17 | 1 | 01111001s |
| 0 | 10 | 1 | 0 | 0 | 4 | 10000010s |
| 0 | 0 | 8 | 0 | 16 | 1 | 10000011s |
| 0 | 1 | 5 | 0 | 4 | 2 | 0110111101s |
| 0 | 5 | 2 | 0 | 5 | 2 | 011101100s |
| 0 | 0 | 9 | 0 | 18 | 1 | 011101101s |
| 0 | 7 | 2 | 0 | 25 | 1 | 011110100s |
| 0 | 2 | 3 | 0 | 19 | 1 | 011110101s |
| 0 | 11 | 1 | 0 | 1 | 3 | 011111000s |
| 0 | 12 | 1 | 0 | 0 | 5 | 011111001s |
| 0 | 1 | 6 | 0 | 20 | 1 | 100000010s |
| 0 | 0 | 11 | 0 | 6 | 2 | 100000011s |
| 0 | 13 | 1 | 0 | 23 | 1 | 0111101100s |
| 0 | 3 | 3 | 0 | 7 | 2 | 0111101101s |
| 0 | 8 | 2 | 0 | 21 | 1 | 0111110100s |
| 0 | 0 | 10 | 0 | 24 | 1 | 0111110101s |
| 0 | 6 | 2 | 0 | 22 | 1 | 0111111000s |
| 0 | 5 | 3 | 0 | 27 | 1 | 0111111001s |
| 0 | 9 | 2 | 0 | 8 | 2 | 1000000010s |
| 0 | 10 | 2 | 0 | 9 | 2 | 1000000011s |

FIG. 19

| INTRA | | | INTER | | | VLC_CODE |
|---|---|---|---|---|---|---|
| LAST | RUN | LEVEL | LAST | RUN | LEVEL | |
| 0 | 2 | 4 | 0 | 1 | 4 | 01110111100s |
| 0 | 3 | 4 | 0 | 26 | 1 | 01110111101s |
| 0 | 0 | 12 | 0 | 3 | 3 | 01111011100s |
| 0 | 1 | 7 | 0 | 29 | 1 | 01111011101s |
| 0 | 3 | 5 | 0 | 2 | 3 | 01111101100s |
| 0 | 6 | 3 | 0 | 31 | 1 | 01111101101s |
| 0 | 11 | 2 | 0 | 0 | 6 | 01111110100s |
| 0 | 4 | 3 | 0 | 5 | 3 | 01111110101s |
| 0 | 7 | 3 | 0 | 10 | 2 | 01111111000s |
| 0 | 0 | 15 | 0 | 40 | 1 | 01111111001s |
| 0 | 1 | 8 | 0 | 2 | 4 | 10000000010s |
| 0 | 0 | 14 | 0 | 14 | 2 | 10000000011s |
| 0 | 8 | 3 | 0 | 28 | 1 | 011110111101s |
| 0 | 15 | 1 | 0 | 11 | 2 | 011111011100s |
| 0 | 1 | 10 | 0 | 12 | 2 | 011111011101s |
| 0 | 2 | 5 | 0 | 0 | 7 | 011111101100s |
| 0 | 3 | 6 | 0 | 30 | 1 | 011111101101s |
| 0 | 5 | 4 | 0 | 33 | 1 | 011111110100s |
| 0 | 0 | 13 | 0 | 6 | 3 | 011111110101s |
| 0 | 11 | 3 | 0 | 13 | 2 | 011111111000s |
| 0 | 14 | 1 | 0 | 1 | 5 | 011111111001s |
| 0 | 4 | 4 | 0 | 4 | 4 | 100000000010s |
| 0 | 7 | 4 | 0 | 7 | 3 | 100000000011s |
| 0 | 1 | 9 | 0 | 32 | 1 | 0110111111101s |
| 0 | 6 | 4 | 0 | 37 | 1 | 0111011111100s |
| 0 | 1 | 11 | 0 | 15 | 2 | 0111011111101s |
| 0 | 20 | 1 | 0 | 38 | 1 | 0111101111100s |
| 0 | 3 | 10 | 0 | 4 | 3 | 0111101111101s |
| 0 | 3 | 9 | 0 | 8 | 3 | 0111110111100s |
| 0 | 5 | 5 | 0 | 44 | 1 | 0111110111100s |
| 0 | 14 | 2 | 0 | 9 | 3 | 0111111011100s |
| 0 | 0 | 16 | 0 | 34 | 1 | 0111111011101s |
| 0 | 4 | 6 | 0 | 36 | 1 | 0111111101100s |
| 0 | 10 | 3 | 0 | 39 | 1 | 0111111101101s |
| 0 | 12 | 2 | 0 | 42 | 1 | 0111111110100s |
| 0 | 3 | 7 | 0 | 52 | 1 | 0111111110101s |
| 0 | 7 | 5 | 0 | 0 | 8 | 0111111111000s |
| 0 | 8 | 4 | 0 | 3 | 4 | 0111111111001s |

FIG. 20

| INTRA | | | INTER | | | VLC_CODE |
|---|---|---|---|---|---|---|
| LAST | RUN | LEVEL | LAST | RUN | LEVEL | |
| 0 | 11 | 4 | 0 | 17 | 2 | 1000000000010s |
| 0 | 13 | 2 | 0 | 45 | 1 | 1000000000011s |
| 0 | 16 | 1 | 0 | 1 | 6 | 0111110111101s |
| 0 | 18 | 1 | 0 | 5 | 4 | 0111111011100s |
| 0 | 1 | 13 | 0 | 20 | 2 | 0111111011101s |
| 0 | 3 | 8 | 0 | 41 | 1 | 0111111101100s |
| 0 | 5 | 6 | 0 | 43 | 1 | 0111111101101s |
| 0 | 0 | 18 | 0 | 2 | 5 | 0111111101100s |
| 0 | 0 | 20 | 0 | 4 | 5 | 0111111101101s |
| 0 | 9 | 3 | 0 | 10 | 3 | 0111111110100s |
| 0 | 17 | 1 | 0 | 47 | 1 | 0111111110101s |
| 0 | 23 | 1 | 0 | 3 | 5 | 0111111111000s |
| 0 | 0 | 25 | 0 | 5 | 7 | 0111111111001s |
| 0 | 1 | 12 | 0 | 7 | 4 | 1000000000010s |
| 0 | 2 | 7 | 0 | 12 | 3 | 1000000000011s |
| 0 | 10 | 4 | 0 | 25 | 2 | 0111111011100s |
| 0 | 4 | 5 | 0 | 26 | 2 | 0111111011101s |
| 0 | 0 | 17 | 0 | 46 | 1 | 0111111101100s |
| 0 | 0 | 23 | 0 | 0 | 12 | 0111111101101s |
| 0 | 0 | 24 | 0 | 4 | 9 | 0111111111100s |
| 0 | 0 | 29 | 0 | 16 | 2 | 0111111111101s |
| 0 | 1 | 25 | 0 | 18 | 2 | 0111111111100s |
| 0 | 3 | 11 | 0 | 35 | 1 | 0111111111101s |

FIG. 21

| LAST | RUN | LEVEL | VLC_CODE |
|---|---|---|---|
| 1 | 0 | 1 | 0001s |
| 1 | 1 | 1 | 00100s |
| 1 | 2 | 1 | 001100s |
| 1 | 3 | 1 | 001101s |
| 1 | 4 | 1 | 010100s |
| 1 | 5 | 1 | 010101s |
| 1 | 6 | 1 | 0011100s |
| 1 | 7 | 1 | 0011101s |
| 1 | 8 | 1 | 0101100s |
| 1 | 9 | 1 | 0101101s |
| 1 | 10 | 1 | 0110100s |
| 1 | 11 | 1 | 00111100s |
| 1 | 12 | 1 | 00111101s |
| 1 | 13 | 1 | 01011100s |
| 1 | 0 | 2 | 01011101s |
| 1 | 14 | 1 | 01101100s |
| 1 | 15 | 1 | 01101101s |
| 1 | 16 | 1 | 001111100s |
| 1 | 1 | 2 | 001111101s |
| 1 | 17 | 1 | 010111100s |
| 1 | 18 | 1 | 010111101s |
| 1 | 19 | 1 | 011011100s |
| 1 | 20 | 1 | 0011111100s |
| 1 | 21 | 1 | 0011111101s |
| 1 | 22 | 1 | 0101111100s |
| 1 | 23 | 1 | 0101111101s |
| 1 | 24 | 1 | 0110111100s |
| 1 | 25 | 1 | 0110111101s |
| 1 | 26 | 1 | 0111011100s |
| 1 | 27 | 1 | 0111011101s |
| 1 | 28 | 1 | 00111111100s |
| 1 | 29 | 1 | 00111111101s |
| 1 | 30 | 1 | 01011111100s |
| 1 | 31 | 1 | 01011111101s |
| 1 | 0 | 3 | 01101111100s |
| 1 | 1 | 3 | 01101111101s |
| 1 | 2 | 2 | 001111111100s |
| 1 | 32 | 1 | 001111111101s |
| 1 | 33 | 1 | 010111111100s |
| 1 | 34 | 1 | 010111111101s |

F I G. 22

| LAST | RUN | LEVEL | VLC_CODE |
|---|---|---|---|
| 1 | 35 | 1 | 0110111111100s |
| 1 | 36 | 1 | 0110111111101s |
| 1 | 37 | 1 | 0111011111100s |
| 1 | 38 | 1 | 0111011111101s |
| 1 | 39 | 1 | 0111101111100s |
| 1 | 40 | 1 | 0011111111100s |
| 1 | 41 | 1 | 0011111111101s |
| 1 | 42 | 1 | 0101111111100s |
| 1 | 43 | 1 | 0101111111101s |
| 1 | 44 | 1 | 0110111111100s |
| 1 | 45 | 1 | 0110111111101s |
| 1 | 46 | 1 | 0111011111100s |
| 1 | 10 | 2 | 0111111111100s |
| 1 | 11 | 2 | 0011111111101s |
| 1 | 12 | 2 | 0101111111100s |
| 1 | 13 | 2 | 0101111111101s |
| 1 | 13 | 4 | 0110111111100s |
| 1 | 1 | 4 | 0110111111101s |
| 1 | 3 | 2 | 0111011111100s |
| 1 | 4 | 2 | 0111011111101s |
| 1 | 5 | 2 | 0111101111100s |
| 1 | 6 | 2 | 0111101111101s |
| 1 | 7 | 2 | 0111110111100s |
| 1 | 8 | 2 | 0011111111100s |
| 1 | 9 | 2 | 0011111111101s |
| 1 | 2 | 3 | 0101111111100s |
| 1 | 3 | 3 | 0101111111101s |
| 1 | 0 | 4 | 0110111111100s |
| 1 | 0 | 5 | 0110111111101s |
| 1 | 47 | 1 | 0111011111100s |
| 1 | 48 | 1 | 0111011111101s |
| 1 | 49 | 1 | 0111101111100s |
| 1 | 50 | 1 | 0111101111101s |
| 1 | 51 | 1 | 0111110111100s |
| 1 | 52 | 1 | 0011111111100s |
| 1 | 53 | 1 | 0011111111101s |
| 1 | 54 | 1 | 0101111111100s |
| 1 | 1 | 5 | 0101111111101s |
| 1 | 4 | 3 | 0101111111100s |

FIG. 23

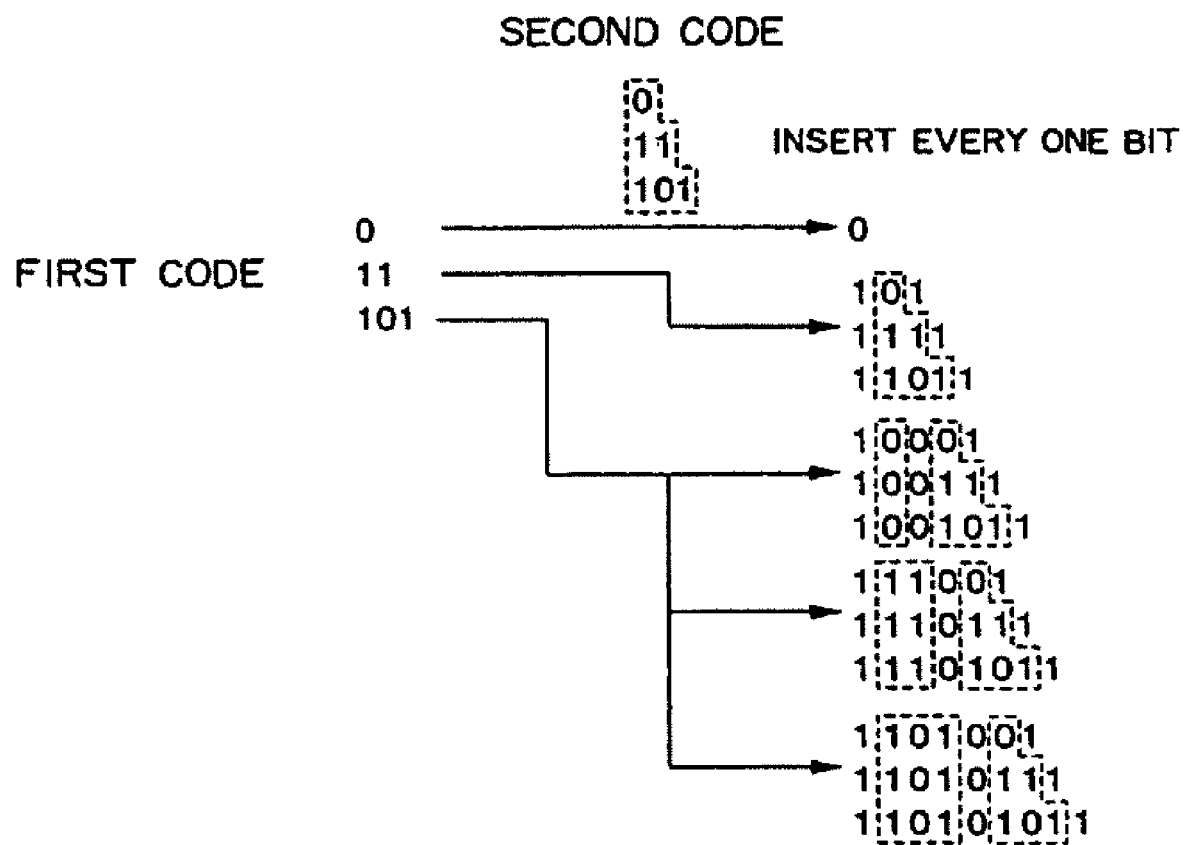
F I G. 30

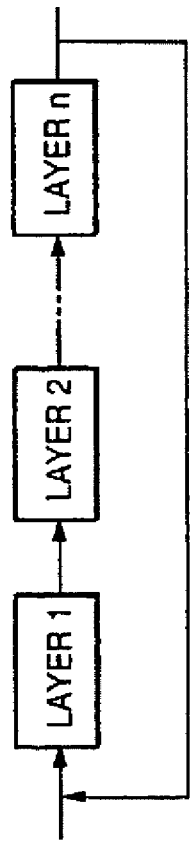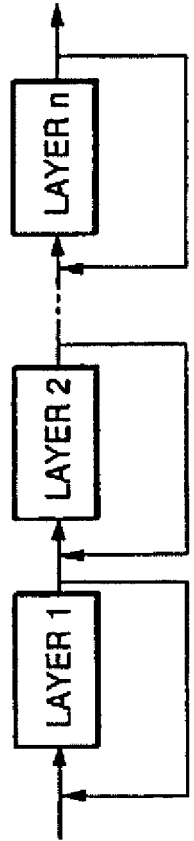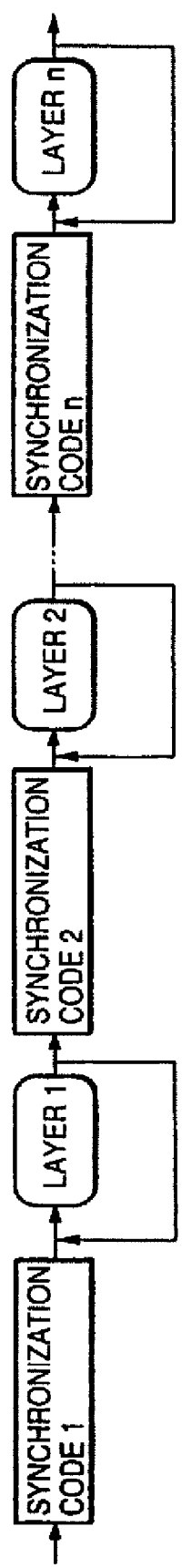

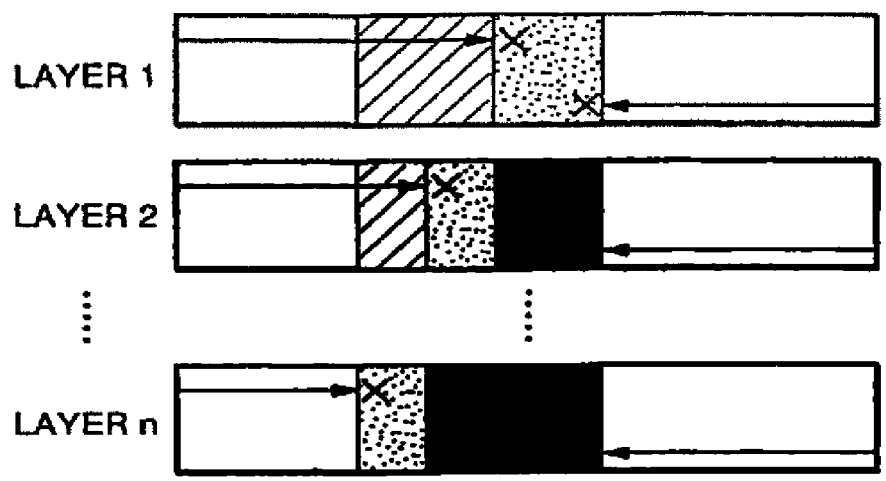
 UNDECODABLE PORTION DUE TO ERROR
 UNDECODABLE PORTION DUE TO INFLUENCE OF UPPER-LAYER
 PORTION REWRITING DECODED VALUE BY USING INFLUENCE OF LOWER-LAYER
FIG.39

| INDEX | VECTOR DIFFERENCES | BIT NUMBER | VLC_CODE |
|---|---|---|---|
| 0 | -54 | 25 | 0111111111111111111110110 |
| 1 | -63.5 | 25 | 0111111111111111111111100 |
| 2 | -63 | 24 | 010111111111111111111110 |
| 3 | -62.5 | 24 | 011101111111111111111110 |
| 4 | -62 | 24 | 011110111111111111111110 |
| 5 | -61.5 | 24 | 011111011111111111111110 |
| 6 | -61 | 24 | 011111101111111111111110 |
| 7 | -60.5 | 24 | 011111110111111111111110 |
| 8 | -60 | 24 | 011111111011111111111110 |
| 9 | -59.5 | 24 | 011111111101111111111110 |
| 10 | -59 | 24 | 011111111111111111011110 |
| 11 | -58.5 | 24 | 011111111111111111110110 |
| 12 | -58 | 24 | 011111111111111111111100 |
| 13 | -57.5 | 23 | 01011111111111111111110 |
| 14 | -57 | 23 | 01110111111111111111110 |
| 15 | -56.5 | 23 | 01111011111111111111110 |
| 16 | -56 | 23 | 01111110111111111111110 |
| 17 | -55.5 | 23 | 01111111011111111111110 |
| 18 | -55 | 23 | 01111111110111111111110 |
| 19 | -54.5 | 23 | 01111111111101111111110 |
| 20 | -54 | 23 | 01111111111111110111110 |
| 21 | -53.5 | 23 | 01111111111111111101110 |
| 22 | -53 | 23 | 01111111111111111111010 |
| 23 | -52.5 | 22 | 0011111111111111111110 |
| 24 | -52 | 22 | 0110111111111111111110 |
| 25 | -51.5 | 22 | 0111101111111111111110 |
| 26 | -51 | 22 | 0111110111111111111110 |
| 27 | -50.5 | 22 | 0111111101111111111110 |
| 28 | -50 | 22 | 0111111111011111111110 |
| 29 | -49.5 | 22 | 0111111111110111111110 |
| 30 | -49 | 22 | 0111111111111110111110 |
| 31 | -48.5 | 22 | 0111111111111111101110 |
| 32 | -48 | 22 | 0111111111111111111010 |

F I G. 44

| INDEX | VECTOR DIFFERENCES | BIT NUMBER | VLC_CODE |
|---|---|---|---|
| 33 | -47.5 | 21 | 001111111111111111110 |
| 34 | -47 | 21 | 011011111111111111110 |
| 35 | -46.5 | 21 | 011101111111111111110 |
| 36 | -46 | 21 | 011110111111111111110 |
| 37 | -45.5 | 21 | 011111011111111111110 |
| 38 | -45 | 21 | 011111101111111111110 |
| 39 | -44.5 | 21 | 011111111011111111110 |
| 40 | -44 | 21 | 011111111111111011110 |
| 41 | -43.5 | 21 | 011111111111111110110 |
| 42 | -43 | 21 | 011111111111111111100 |
| 43 | -42.5 | 20 | 01011111111111111110 |
| 44 | -42 | 20 | 01110111111111111110 |
| 45 | -41.5 | 20 | 01111011111111111110 |
| 46 | -41 | 20 | 01111110111111111110 |
| 47 | -40.5 | 20 | 01111111101111111110 |
| 48 | -40 | 20 | 01111111110111111110 |
| 49 | -39.5 | 20 | 01111111111111011110 |
| 50 | -39 | 20 | 01111111111111110110 |
| 51 | -38.5 | 20 | 01111111111111111100 |
| 52 | -38 | 19 | 0101111111111111110 |
| 53 | -37.5 | 19 | 0111011111111111110 |
| 54 | -37 | 19 | 0111110111111111110 |
| 55 | -36.5 | 19 | 0111111101111111110 |
| 56 | -36 | 19 | 0111111111011111110 |
| 57 | -35.5 | 19 | 0111111111110111110 |
| 58 | -35 | 19 | 0111111111111101110 |
| 59 | -34.5 | 19 | 0111111111111111010 |
| 60 | -34 | 18 | 001111111111111110 |
| 61 | -33.5 | 18 | 011011111111111110 |
| 62 | -33 | 18 | 011110111111111110 |
| 63 | -32.5 | 18 | 011111101111111110 |
| 64 | -32 | 18 | 011111111011111110 |

FIG. 45

| INDEX | VECTOR DIFFERENCES | BIT NUMBER | VLC_CODE |
|---|---|---|---|
| 65 | -31.5 | 18 | 011111111110111110 |
| 66 | -31 | 18 | 011111111111101110 |
| 67 | -30.5 | 18 | 011111111111111010 |
| 68 | -30 | 17 | 00111111111111110 |
| 69 | -29.5 | 17 | 01101111111111110 |
| 70 | -29 | 17 | 01111011111111110 |
| 71 | -28.5 | 17 | 01111110111111110 |
| 72 | -28 | 17 | 01111111101111110 |
| 73 | -27.5 | 17 | 01111111111011110 |
| 74 | -27 | 17 | 01111111111110110 |
| 75 | -26.5 | 17 | 01111111111111100 |
| 76 | -26 | 16 | 0101111111111110 |
| 77 | -25.5 | 16 | 0111011111111110 |
| 78 | -25 | 16 | 0111110111111110 |
| 79 | -24.5 | 16 | 0111111101111110 |
| 80 | -24 | 16 | 0111111111011110 |
| 81 | -23.5 | 16 | 0111111111110110 |
| 82 | -23 | 16 | 0111111111111100 |
| 83 | -22.5 | 15 | 010111111111110 |
| 84 | -22 | 15 | 011101111111110 |
| 85 | -21.5 | 15 | 011111011111110 |
| 86 | -21 | 15 | 011111110111110 |
| 87 | -20.5 | 15 | 011111111101110 |
| 88 | -20 | 15 | 011111111111010 |
| 89 | -19.5 | 14 | 00111111111110 |
| 90 | -19 | 14 | 01101111111110 |
| 91 | -18.5 | 14 | 01111011111110 |
| 92 | -18 | 14 | 01111110111110 |
| 93 | -17.5 | 14 | 01111111101110 |
| 94 | -17 | 14 | 01111111111010 |
| 95 | -16.5 | 13 | 0011111111110 |
| 96 | -16 | 13 | 0110111111110 |

FIG. 46

| INDEX | VECTOR DIFFERENCES | BIT NUMBER | VLC_CODE |
|---|---|---|---|
| 97 | -15.5 | 13 | 0111101111110 |
| 98 | -15 | 13 | 0111111011110 |
| 99 | -14.5 | 13 | 0111111110110 |
| 100 | -14 | 13 | 0111111111100 |
| 101 | -13.5 | 12 | 010111111110 |
| 102 | -13 | 12 | 011101111110 |
| 103 | -12.5 | 12 | 011111011110 |
| 104 | -12 | 12 | 011111110110 |
| 105 | -11.5 | 12 | 011111111100 |
| 106 | -11 | 11 | 01011111110 |
| 107 | -10.5 | 11 | 01110111110 |
| 108 | -10 | 11 | 01111101110 |
| 109 | -9.5 | 11 | 01111111010 |
| 110 | -9 | 10 | 0011111110 |
| 111 | -8.5 | 10 | 0110111110 |
| 112 | -8 | 10 | 0111101110 |
| 113 | -7.5 | 10 | 0111111010 |
| 114 | -7 | 9 | 001111110 |
| 115 | -6.5 | 9 | 011011110 |
| 116 | -6 | 9 | 011110110 |
| 117 | -5.5 | 9 | 011111100 |
| 118 | -5 | 9 | 01011110 |
| 119 | -4.5 | 8 | 01110110 |
| 120 | -4 | 8 | 01111100 |
| 121 | -3.5 | 8 | 0101110 |
| 122 | -3 | 7 | 0111010 |
| 123 | -2.5 | 7 | 001110 |
| 124 | -2 | 6 | 011010 |
| 125 | -1.5 | 6 | 00110 |
| 126 | -1 | 5 | 01100 |
| 127 | -0.5 | 4 | 0100 |
| 128 | -0 | 1 | 01 |

FIG. 47

| INDEX | VECTOR DIFFERENCES | BIT NUMBER | VLC_CODE |
|---|---|---|---|
| 129 | 0.5 | 4 | 0010 |
| 130 | 1 | 5 | 01010 |
| 131 | 1.5 | 6 | 011100 |
| 132 | 2 | 6 | 010110 |
| 133 | 2.5 | 7 | 0111100 |
| 134 | 3 | 7 | 0110110 |
| 135 | 3.5 | 7 | 0011110 |
| 136 | 4 | 8 | 01111010 |
| 137 | 4.5 | 8 | 01101110 |
| 138 | 5 | 8 | 00111110 |
| 139 | 5.5 | 9 | 011111010 |
| 140 | 6 | 9 | 011101110 |
| 141 | 6.5 | 9 | 010111110 |
| 142 | 7 | 10 | 0111111100 |
| 143 | 7.5 | 10 | 0111110110 |
| 144 | 8 | 10 | 0111011110 |
| 145 | 8.5 | 10 | 0101111110 |
| 146 | 9 | 11 | 01111111100 |
| 147 | 9.5 | 11 | 01111110110 |
| 148 | 10 | 11 | 01111011110 |
| 149 | 10.5 | 11 | 01101111110 |
| 150 | 11 | 11 | 00111111110 |
| 151 | 11.5 | 12 | 011111111010 |
| 152 | 12 | 12 | 011111101110 |
| 153 | 12.5 | 12 | 011110111110 |
| 154 | 13 | 12 | 011011111110 |
| 155 | 13.5 | 12 | 001111111110 |
| 156 | 14 | 13 | 0111111111010 |
| 157 | 14.5 | 13 | 0111111101110 |
| 158 | 15 | 13 | 0111110111110 |
| 159 | 15.5 | 13 | 0111011111110 |
| 160 | 16 | 13 | 0101111111110 |

FIG. 48

| INDEX | VECTOR DIFFERENCES | BIT NUMBER | VLC_CODE |
|---|---|---|---|
| 161 | 16.5 | 14 | 01111111111100 |
| 162 | 17 | 14 | 01111111110110 |
| 163 | 17.5 | 14 | 01111111011110 |
| 164 | 18 | 14 | 01111101111110 |
| 165 | 18.5 | 14 | 01110111111110 |
| 166 | 19 | 14 | 01011111111110 |
| 167 | 19.5 | 15 | 011111111111100 |
| 168 | 20 | 15 | 011111111110110 |
| 169 | 20.5 | 15 | 011111111011110 |
| 170 | 21 | 15 | 011111101111110 |
| 171 | 21.5 | 15 | 011110111111110 |
| 172 | 22 | 15 | 011011111111110 |
| 173 | 22.5 | 15 | 001111111111110 |
| 174 | 23 | 16 | 0111111111111010 |
| 175 | 23.5 | 16 | 0111111111101110 |
| 176 | 24 | 16 | 0111111110111110 |
| 177 | 24.5 | 16 | 0111111011111110 |
| 178 | 25 | 16 | 0111101111111110 |
| 179 | 25.5 | 16 | 0110111111111110 |
| 180 | 26 | 16 | 0011111111111110 |
| 181 | 26.5 | 17 | 01111111111111010 |
| 182 | 27 | 17 | 01111111111101110 |
| 183 | 27.5 | 17 | 01111111110111110 |
| 184 | 28 | 17 | 01111111011111110 |
| 185 | 28.5 | 17 | 01111101111111110 |
| 186 | 29 | 17 | 01110111111111110 |
| 187 | 29.5 | 17 | 01011111111111110 |
| 188 | 30 | 18 | 011111111111111100 |
| 189 | 30.5 | 18 | 011111111111110110 |
| 190 | 31 | 18 | 011111111111011110 |
| 191 | 31.5 | 18 | 011111111101111110 |
| 192 | 32 | 18 | 011111110111111110 |

F I G. 49

| INDEX | VECTOR DIFFERENCES | BIT NUMBER | VLC_CODE |
|---|---|---|---|
| 193 | 32.5 | 18 | 011111011111111110 |
| 194 | 33 | 18 | 011101111111111110 |
| 195 | 33.5 | 18 | 010111111111111110 |
| 196 | 34 | 19 | 0111111111111111100 |
| 197 | 34.5 | 19 | 0111111111111110110 |
| 198 | 35 | 19 | 0111111111111011110 |
| 199 | 35.5 | 19 | 0111111111101111110 |
| 200 | 36 | 19 | 0111111110111111110 |
| 201 | 36.5 | 19 | 0111111011111111110 |
| 202 | 37 | 19 | 0111101111111111110 |
| 203 | 37.5 | 19 | 0110111111111111110 |
| 204 | 38 | 19 | 0011111111111111110 |
| 205 | 38.5 | 20 | 01111111111111111010 |
| 206 | 39 | 20 | 01111111111111101110 |
| 207 | 39.5 | 20 | 01111111111110111110 |
| 208 | 40 | 20 | 01111111110111111110 |
| 209 | 40.5 | 20 | 01111111101111111110 |
| 210 | 41 | 20 | 01111101111111111110 |
| 211 | 41.5 | 20 | 01111011111111111110 |
| 212 | 42 | 20 | 01101111111111111110 |
| 213 | 42.5 | 20 | 00111111111111111110 |
| 214 | 43 | 21 | 011111111111111111010 |
| 215 | 43.5 | 21 | 011111111111111101110 |
| 216 | 44 | 21 | 011111111111110111110 |
| 217 | 44.5 | 21 | 011111111101111111110 |
| 218 | 45 | 21 | 011111111011111111110 |
| 219 | 45.5 | 21 | 011111101111111111110 |
| 220 | 46 | 21 | 011111011111111111110 |
| 221 | 46.5 | 21 | 011101111111111111110 |
| 222 | 47 | 21 | 010111111111111111110 |
| 223 | 47.5 | 22 | 0111111111111111111100 |
| 224 | 48 | 22 | 0111111111111111110110 |

F I G. 50

| INDEX | VECTOR DIFFERENCES | BIT NUMBER | VLC_CODE |
|---|---|---|---|
| 225 | 48.5 | 22 | 0111111111111111011110 |
| 226 | 49 | 22 | 0111111111111101111110 |
| 227 | 49.5 | 22 | 0111111111110111111110 |
| 228 | 50 | 22 | 0111111111011111111110 |
| 229 | 50.5 | 22 | 0111111101111111111110 |
| 230 | 51 | 22 | 0111110111111111111110 |
| 231 | 51.5 | 22 | 0111011111111111111110 |
| 232 | 52 | 22 | 0101111111111111111110 |
| 233 | 52.5 | 23 | 01111111111111111111100 |
| 234 | 53 | 23 | 01111111111111111110110 |
| 235 | 53.5 | 23 | 01111111111111111011110 |
| 236 | 54 | 23 | 01111111111111101111110 |
| 237 | 54.5 | 23 | 01111111111110111111110 |
| 238 | 55 | 23 | 01111111111011111111110 |
| 239 | 55.5 | 23 | 01111111101111111111110 |
| 240 | 56 | 23 | 01111110111111111111110 |
| 241 | 56.5 | 23 | 01111011111111111111110 |
| 242 | 57 | 23 | 01101111111111111111110 |
| 243 | 57.5 | 23 | 00111111111111111111110 |
| 244 | 58 | 24 | 011111111111111111111010 |
| 245 | 58.5 | 24 | 011111111111111111101110 |
| 246 | 59 | 24 | 011111111111111110111110 |
| 247 | 59.5 | 24 | 011111111111111011111110 |
| 248 | 60 | 24 | 011111111111101111111110 |
| 249 | 60.5 | 24 | 011111111101111111111110 |
| 250 | 61 | 24 | 011111110111111111111110 |
| 251 | 61.5 | 24 | 011111011111111111111110 |
| 252 | 62 | 24 | 011110111111111111111110 |
| 253 | 62.5 | 24 | 011011111111111111111110 |
| 254 | 63 | 24 | 001111111111111111111110 |
| 255 | 63.5 | 25 | 0111111111111111111111010 |
| 256 | 64 | 25 | 0111111111111111111101110 |

FIG. 51

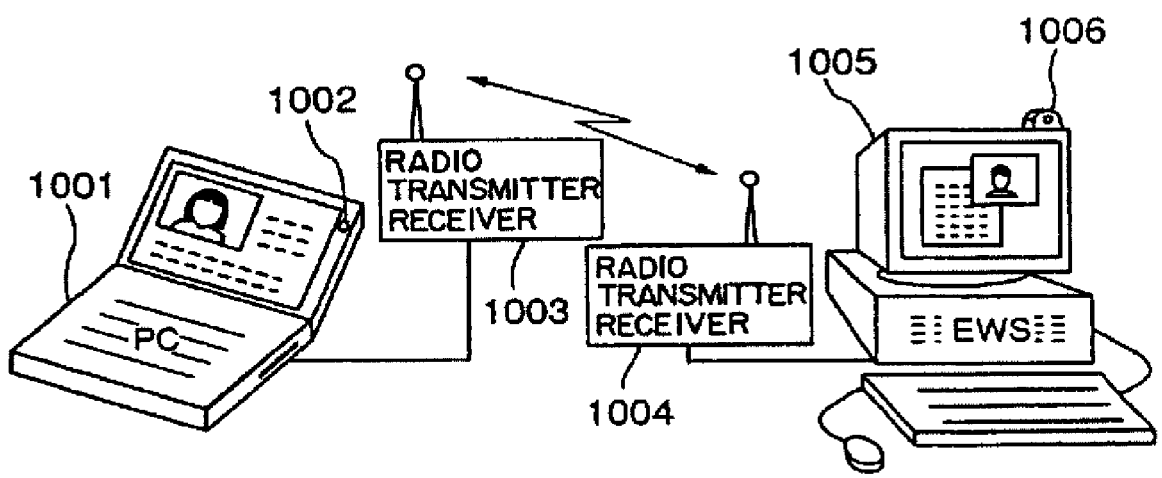
F I G. 62

FIG. 66

| RUN | \multicolumn{25}{c}{LEVEL} |
|---|---|

| RUN | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|-----|---|---|---|---|---|---|---|---|---|----|----|----|----|----|----|----|----|----|----|----|----|----|----|----|----|
| 0 | 1 | 2 | 3 | 6 | 12 | 13 | 20 | 30 | 31 | 42 | 43 | 56 | 57 | 58 | 72 | 73 | 74 | 90 | 91 | 110 | 111 | 92 | 112 | 132 | 133 |
| 1 | 4 | 7 | 21 | 32 | 33 | 44 | 59 | 75 | 76 | 93 | 113 | 135 | 136 | 0 | 0 | 0 | 0 | 0 | 0 | 0 | 0 | 0 | 0 | 0 | 0 |
| 2 | 8 | 22 | 45 | 60 | 77 | 78 | 114 | 115 | 116 | 137 | 138 | 0 | 0 | 0 | 0 | 0 | 0 | 0 | 0 | 0 | 0 | 0 | 0 | 0 | 0 |
| 3 | 9 | 34 | 46 | 79 | 94 | 117 | 139 | 140 | 157 | 0 | 0 | 0 | 0 | 0 | 0 | 0 | 0 | 0 | 0 | 0 | 0 | 0 | 0 | 0 | 0 |
| 4 | 14 | 35 | 61 | 95 | 96 | 141 | 0 | 0 | 0 | 0 | 0 | 0 | 0 | 0 | 0 | 0 | 0 | 0 | 0 | 0 | 0 | 0 | 0 | 0 | 0 |
| 5 | 15 | 47 | 80 | 97 | 142 | 143 | 0 | 0 | 0 | 0 | 0 | 0 | 0 | 0 | 0 | 0 | 0 | 0 | 0 | 0 | 0 | 0 | 0 | 0 | 0 |
| 6 | 23 | 62 | 81 | 98 | 158 | 0 | 0 | 0 | 0 | 0 | 0 | 0 | 0 | 0 | 0 | 0 | 0 | 0 | 0 | 0 | 0 | 0 | 0 | 0 | 0 |
| 7 | 24 | 63 | 82 | 118 | 159 | 0 | 0 | 0 | 0 | 0 | 0 | 0 | 0 | 0 | 0 | 0 | 0 | 0 | 0 | 0 | 0 | 0 | 0 | 0 | 0 |
| 8 | 36 | 64 | 119 | 144 | 160 | 0 | 0 | 0 | 0 | 0 | 0 | 0 | 0 | 0 | 0 | 0 | 0 | 0 | 0 | 0 | 0 | 0 | 0 | 0 | 0 |
| 9 | 37 | 83 | 120 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 10 | 48 | 99 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11 | 65 | 121 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 12 | 66 | 161 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 13 | 84 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 14 | 122 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 15 | 123 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 | 145 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 17 | 146 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 | 147 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 19 | 162 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| RUN \ LEVEL | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 0 | 1 | 3 | 6 | 20 | 30 | 31 | 42 | 56 | 57 | 72 | 73 | 90 | 110 | 111 | 112 | 113 | 132 | 133 | 156 |
| 1 | 2 | 12 | 32 | 43 | 58 | 74 | 91 | 114 | 134 | 135 | 0 | 0 | 0 | 0 | 0 | 0 | 0 | 0 | 0 |
| 2 | 4 | 21 | 44 | 75 | 92 | 136 | 137 | 0 | 0 | 0 | 0 | 0 | 0 | 0 | 0 | 0 | 0 | 0 | 0 |
| 3 | 7 | 33 | 59 | 93 | 115 | 138 | 157 | 0 | 0 | 0 | 0 | 0 | 0 | 0 | 0 | 0 | 0 | 0 | 0 |
| 4 | 8 | 34 | 76 | 116 | 158 | 0 | 0 | 0 | 0 | 0 | 0 | 0 | 0 | 0 | 0 | 0 | 0 | 0 | 0 |
| 5 | 9 | 45 | 77 | 117 | 0 | 0 | 0 | 0 | 0 | 0 | 0 | 0 | 0 | 0 | 0 | 0 | 0 | 0 | 0 |
| 6 | 13 | 60 | 94 | 139 | 0 | 0 | 0 | 0 | 0 | 0 | 0 | 0 | 0 | 0 | 0 | 0 | 0 | 0 | 0 |
| 7 | 14 | 61 | 95 | 159 | 0 | 0 | 0 | 0 | 0 | 0 | 0 | 0 | 0 | 0 | 0 | 0 | 0 | 0 | 0 |
| 8 | 15 | 62 | 118 | 0 | 0 | 0 | 0 | 0 | 0 | 0 | 0 | 0 | 0 | 0 | 0 | 0 | 0 | 0 | 0 |
| 9 | 22 | 63 | 140 | 0 | 0 | 0 | 0 | 0 | 0 | 0 | 0 | 0 | 0 | 0 | 0 | 0 | 0 | 0 | 0 |
| 10 | 23 | 78 | 0 | 0 | 0 | 0 | 0 | 0 | 0 | 0 | 0 | 0 | 0 | 0 | 0 | 0 | 0 | 0 | 0 |
| 11 | 24 | 96 | 0 | 0 | 0 | 0 | 0 | 0 | 0 | 0 | 0 | 0 | 0 | 0 | 0 | 0 | 0 | 0 | 0 |
| 12 | 35 | 119 | 0 | 0 | 0 | 0 | 0 | 0 | 0 | 0 | 0 | 0 | 0 | 0 | 0 | 0 | 0 | 0 | 0 |
| 13 | 36 | 141 | 0 | 0 | 0 | 0 | 0 | 0 | 0 | 0 | 0 | 0 | 0 | 0 | 0 | 0 | 0 | 0 | 0 |
| 14 | 37 | 142 | 0 | 0 | 0 | 0 | 0 | 0 | 0 | 0 | 0 | 0 | 0 | 0 | 0 | 0 | 0 | 0 | 0 |
| 15 | 46 | 143 | 0 | 0 | 0 | 0 | 0 | 0 | 0 | 0 | 0 | 0 | 0 | 0 | 0 | 0 | 0 | 0 | 0 |
| 16 | 47 | 144 | 0 | 0 | 0 | 0 | 0 | 0 | 0 | 0 | 0 | 0 | 0 | 0 | 0 | 0 | 0 | 0 | 0 |
| 17 | 48 | 160 | 0 | 0 | 0 | 0 | 0 | 0 | 0 | 0 | 0 | 0 | 0 | 0 | 0 | 0 | 0 | 0 | 0 |
| 18 | 64 | 0 | 0 | 0 | 0 | 0 | 0 | 0 | 0 | 0 | 0 | 0 | 0 | 0 | 0 | 0 | 0 | 0 | 0 |
| 19 | 65 | 0 | 0 | 0 | 0 | 0 | 0 | 0 | 0 | 0 | 0 | 0 | 0 | 0 | 0 | 0 | 0 | 0 | 0 |
| 20 | 66 | 0 | 0 | 0 | 0 | 0 | 0 | 0 | 0 | 0 | 0 | 0 | 0 | 0 | 0 | 0 | 0 | 0 | 0 |
| 21 | 79 | 0 | 0 | 0 | 0 | 0 | 0 | 0 | 0 | 0 | 0 | 0 | 0 | 0 | 0 | 0 | 0 | 0 | 0 |
| 22 | 80 | 0 | 0 | 0 | 0 | 0 | 0 | 0 | 0 | 0 | 0 | 0 | 0 | 0 | 0 | 0 | 0 | 0 | 0 |
| 23 | 81 | 0 | 0 | 0 | 0 | 0 | 0 | 0 | 0 | 0 | 0 | 0 | 0 | 0 | 0 | 0 | 0 | 0 | 0 |
| 24 | 82 | 0 | 0 | 0 | 0 | 0 | 0 | 0 | 0 | 0 | 0 | 0 | 0 | 0 | 0 | 0 | 0 | 0 | 0 |
| 25 | 83 | 0 | 0 | 0 | 0 | 0 | 0 | 0 | 0 | 0 | 0 | 0 | 0 | 0 | 0 | 0 | 0 | 0 | 0 |
| 26 | 84 | 0 | 0 | 0 | 0 | 0 | 0 | 0 | 0 | 0 | 0 | 0 | 0 | 0 | 0 | 0 | 0 | 0 | 0 |
| 27 | 97 | 0 | 0 | 0 | 0 | 0 | 0 | 0 | 0 | 0 | 0 | 0 | 0 | 0 | 0 | 0 | 0 | 0 | 0 |
| 28 | 98 | 0 | 0 | 0 | 0 | 0 | 0 | 0 | 0 | 0 | 0 | 0 | 0 | 0 | 0 | 0 | 0 | 0 | 0 |
| 29 | 99 | 0 | 0 | 0 | 0 | 0 | 0 | 0 | 0 | 0 | 0 | 0 | 0 | 0 | 0 | 0 | 0 | 0 | 0 |
| 30 | 120 | 0 | 0 | 0 | 0 | 0 | 0 | 0 | 0 | 0 | 0 | 0 | 0 | 0 | 0 | 0 | 0 | 0 | 0 |
| 31 | 121 | 0 | 0 | 0 | 0 | 0 | 0 | 0 | 0 | 0 | 0 | 0 | 0 | 0 | 0 | 0 | 0 | 0 | 0 |
| 32 | 122 | 0 | 0 | 0 | 0 | 0 | 0 | 0 | 0 | 0 | 0 | 0 | 0 | 0 | 0 | 0 | 0 | 0 | 0 |
| 33 | 123 | 0 | 0 | 0 | 0 | 0 | 0 | 0 | 0 | 0 | 0 | 0 | 0 | 0 | 0 | 0 | 0 | 0 | 0 |
| 34 | 145 | 0 | 0 | 0 | 0 | 0 | 0 | 0 | 0 | 0 | 0 | 0 | 0 | 0 | 0 | 0 | 0 | 0 | 0 |
| 35 | 146 | 0 | 0 | 0 | 0 | 0 | 0 | 0 | 0 | 0 | 0 | 0 | 0 | 0 | 0 | 0 | 0 | 0 | 0 |
| 36 | 147 | 0 | 0 | 0 | 0 | 0 | 0 | 0 | 0 | 0 | 0 | 0 | 0 | 0 | 0 | 0 | 0 | 0 | 0 |
| 37 | 161 | 0 | 0 | 0 | 0 | 0 | 0 | 0 | 0 | 0 | 0 | 0 | 0 | 0 | 0 | 0 | 0 | 0 | 0 |
| 38 | 162 | 0 | 0 | 0 | 0 | 0 | 0 | 0 | 0 | 0 | 0 | 0 | 0 | 0 | 0 | 0 | 0 | 0 | 0 |

FIG. 67

|     | LEVEL | | | | |
|-----|---|---|---|---|---|
| RUN | 1 | 2 | 3 | 4 | 5 |
| 0 | 5 | 38 | 85 | 124 | 148 |
| 1 | 10 | 49 | 100 | 149 | 163 |
| 2 | 11 | 86 | 164 | 0 | 0 |
| 3 | 16 | 101 | 0 | 0 | 0 |
| 4 | 17 | 102 | 0 | 0 | 0 |
| 5 | 18 | 125 | 0 | 0 | 0 |
| 6 | 19 | 126 | 0 | 0 | 0 |
| 7 | 25 | 127 | 0 | 0 | 0 |
| 8 | 26 | 128 | 0 | 0 | 0 |
| 9 | 27 | 129 | 0 | 0 | 0 |
| 10 | 28 | 150 | 0 | 0 | 0 |
| 11 | 29 | 151 | 0 | 0 | 0 |
| 12 | 39 | 152 | 0 | 0 | 0 |
| 13 | 40 | 165 | 0 | 0 | 0 |
| 14 | 41 | 0 | 0 | 0 | 0 |
| 15 | 50 | 0 | 0 | 0 | 0 |
| 16 | 51 | 0 | 0 | 0 | 0 |
| 17 | 52 | 0 | 0 | 0 | 0 |
| 18 | 53 | 0 | 0 | 0 | 0 |
| 19 | 54 | 0 | 0 | 0 | 0 |
| 20 | 55 | 0 | 0 | 0 | 0 |
| 21 | 67 | 0 | 0 | 0 | 0 |
| 22 | 68 | 0 | 0 | 0 | 0 |
| 23 | 69 | 0 | 0 | 0 | 0 |
| 24 | 70 | 0 | 0 | 0 | 0 |
| 25 | 71 | 0 | 0 | 0 | 0 |
| 26 | 87 | 0 | 0 | 0 | 0 |
| 27 | 88 | 0 | 0 | 0 | 0 |
| 28 | 89 | 0 | 0 | 0 | 0 |
| 29 | 103 | 0 | 0 | 0 | 0 |
| 30 | 104 | 0 | 0 | 0 | 0 |
| 31 | 105 | 0 | 0 | 0 | 0 |
| 32 | 106 | 0 | 0 | 0 | 0 |
| 33 | 107 | 0 | 0 | 0 | 0 |
| 34 | 108 | 0 | 0 | 0 | 0 |
| 35 | 109 | 0 | 0 | 0 | 0 |
| 36 | 130 | 0 | 0 | 0 | 0 |
| 37 | 131 | 0 | 0 | 0 | 0 |
| 38 | 153 | 0 | 0 | 0 | 0 |
| 39 | 154 | 0 | 0 | 0 | 0 |
| 40 | 155 | 0 | 0 | 0 | 0 |
| 41 | 166 | 0 | 0 | 0 | 0 |
| 42 | 167 | 0 | 0 | 0 | 0 |
| 43 | 168 | 0 | 0 | 0 | 0 |
| 44 | 169 | 0 | 0 | 0 | 0 |

FIG. 68

| INDEX | VLC-CODE |
|---|---|
| 0 | 0000s |
| 1 | 110s |
| 2 | 111s |
| 3 | 0001s |
| 4 | 1010s |
| 5 | 1011s |
| 6 | 00100s |
| 7 | 00101s |
| 8 | 01000s |
| 9 | 01001s |
| 10 | 10010s |
| 11 | 10011s |
| 12 | 001100s |
| 13 | 001101s |
| 14 | 010100s |
| 15 | 010101s |
| 16 | 011000s |
| 17 | 011001s |
| 18 | 100010s |
| 19 | 100011s |
| 20 | 0011100s |
| 21 | 0011101s |
| 22 | 0101100s |
| 23 | 0101101s |
| 24 | 0110100s |
| 25 | 0110101s |
| 26 | 0111000s |
| 27 | 0111001s |
| 28 | 1000010s |
| 29 | 1000011s |
| 30 | 00111100s |
| 31 | 00111101s |
| 32 | 01011100s |
| 33 | 01011101s |
| 34 | 01101100s |
| 35 | 01101101s |
| 36 | 01110100s |
| 37 | 01110101s |
| 38 | 01111000s |
| 39 | 01111001s |
| 40 | 10000010s |
| 41 | 10000011s |
| 42 | 001111100s |
| 43 | 001111101s |
| 44 | 010111100s |
| 45 | 010111101s |
| 46 | 011011100s |
| 47 | 011011101s |
| 48 | 011101100s |
| 49 | 011101101s |
| 50 | 011110100s |
| 51 | 011110101s |
| 52 | 011111000s |
| 53 | 011111001s |
| 54 | 100000010s |
| 55 | 100000011s |
| 56 | 0011111100s |
| 57 | 0011111101s |
| 58 | 0101111100s |
| 59 | 0101111101s |
| 60 | 0110111100s |
| 61 | 0110111101s |
| 62 | 0111011100s |
| 63 | 0111011101s |
| 64 | 0111101100s |
| 65 | 0111101101s |
| 66 | 0111110100s |
| 67 | 0111110101s |
| 68 | 0111111000s |
| 69 | 0111111001s |
| 70 | 1000000010s |
| 71 | 1000000011s |
| 72 | 00111111100s |
| 73 | 00111111101s |
| 74 | 01011111100s |
| 75 | 01011111101s |
| 76 | 01101111100s |
| 77 | 01101111101s |
| 78 | 01110111100s |
| 79 | 01110111101s |
| 80 | 01111011100s |
| 81 | 01111011101s |
| 82 | 01111101100s |
| 83 | 01111011010s |
| 84 | 01111110100s |
| 85 | 01111110101s |
| 86 | 01111111000s |
| 87 | 01111111001s |
| 88 | 10000000010s |

FIG. 69

| | |
|---|---|
| 89 | 100000000011s |
| 90 | 001111111100s |
| 91 | 001111111101s |
| 92 | 010111111100s |
| 93 | 010111111101s |
| 94 | 011011111100s |
| 95 | 011011111101s |
| 96 | 011101111100s |
| 97 | 011101111101s |
| 98 | 011110111100s |
| 99 | 011110111101s |
| 100 | 011111011100s |
| 101 | 011111011101s |
| 102 | 011111101100s |
| 103 | 011111101101s |
| 104 | 011111110100s |
| 105 | 011111110101s |
| 106 | 011111111000s |
| 107 | 011111111001s |
| 108 | 100000000010s |
| 109 | 100000000011s |
| 110 | 001111111100s |
| 111 | 001111111101s |
| 112 | 010111111100s |
| 113 | 010111111101s |
| 114 | 011011111100s |
| 115 | 011011111101s |
| 116 | 011101111100s |
| 117 | 011101111101s |
| 118 | 011110111100s |
| 119 | 011110111101s |
| 120 | 011111011100s |
| 121 | 011111011101s |
| 122 | 011111101100s |
| 123 | 011111101101s |
| 124 | 011111110100s |
| 125 | 011111110101s |
| 126 | 011111111000s |
| 127 | 011111111001s |
| 128 | 011111111000s |
| 129 | 011111111001s |
| 130 | 100000000010s |
| 131 | 100000000011s |
| 132 | 001111111100s |
| 133 | 001111111101s |
| 134 | 010111111100s |
| 135 | 010111111101s |
| 136 | 011011111100s |

| | |
|---|---|
| 137 | 011011111101s |
| 138 | 011101111100s |
| 139 | 011101111101s |
| 140 | 011110111100s |
| 141 | 011110111101s |
| 142 | 011111011100s |
| 143 | 011111011101s |
| 144 | 011111101100s |
| 145 | 011111101101s |
| 146 | 011111110100s |
| 147 | 011111110101s |
| 148 | 011111111100s |
| 149 | 011111111101s |
| 150 | 011111111100s |
| 151 | 011111111101s |
| 152 | 011111111000s |
| 153 | 011111111001s |
| 154 | 100000000010s |
| 155 | 100000000011s |
| 156 | 001111111100s |
| 157 | 001111111101s |
| 158 | 010111111100s |
| 159 | 010111111101s |
| 160 | 011011111100s |
| 161 | 011011111101s |
| 162 | 011101111100s |
| 163 | 011101111101s |
| 164 | 011110111100s |
| 165 | 011110111101s |
| 166 | 011111011100s |
| 167 | 011111011101s |
| 168 | 011111101100s |
| 169 | 011111101101s |

FIG. 70

| RUN | CODE |
|---|---|
| 0 | 000000 |
| 1 | 000001 |
| : | : |
| 63 | 111111 |

| LEVEL | CODE |
|---|---|
| 0 | FORBIDDEN |
| 1 | 0000001 |
| 2 | 0000100 |
| | : |
| 127 | 1111111 |

| INDEX | INTRA | | | INTER | | |
|---|---|---|---|---|---|---|
| | LAST | RUN | LEVEL | LAST | RUN | LEVEL |
| 1 | 0 | 0 | 1 | 0 | 0 | 1 |
| 2 | 0 | 0 | 2 | 0 | 1 | 1 |
| 3 | 0 | 0 | 3 | 0 | 0 | 2 |
| 4 | 0 | 1 | 1 | 0 | 2 | 1 |
| 5 | 1 | 0 | 1 | 1 | 0 | 1 |
| 6 | 0 | 0 | 4 | 0 | 0 | 3 |
| 7 | 0 | 1 | 2 | 0 | 3 | 1 |
| 8 | 0 | 2 | 1 | 0 | 4 | 1 |
| 9 | 0 | 3 | 1 | 0 | 5 | 1 |
| 10 | 1 | 1 | 1 | 1 | 1 | 1 |
| 11 | 1 | 2 | 1 | 1 | 2 | 1 |
| 12 | 0 | 0 | 5 | 0 | 1 | 2 |
| 13 | 0 | 0 | 6 | 0 | 6 | 1 |
| 14 | 0 | 4 | 1 | 0 | 7 | 1 |
| 15 | 0 | 5 | 1 | 0 | 8 | 1 |
| 16 | 1 | 3 | 1 | 1 | 3 | 1 |
| 17 | 1 | 4 | 1 | 1 | 4 | 1 |
| 18 | 1 | 5 | 1 | 1 | 5 | 1 |
| 19 | 1 | 6 | 1 | 1 | 6 | 1 |
| 20 | 0 | 0 | 7 | 0 | 0 | 4 |
| 21 | 0 | 1 | 3 | 0 | 2 | 2 |
| 22 | 0 | 2 | 2 | 0 | 9 | 1 |
| 23 | 0 | 6 | 1 | 0 | 10 | 1 |
| 24 | 0 | 7 | 1 | 0 | 11 | 1 |
| 25 | 1 | 7 | 1 | 1 | 7 | 1 |
| 26 | 1 | 8 | 1 | 1 | 8 | 1 |
| 27 | 1 | 9 | 1 | 1 | 9 | 1 |
| 28 | 1 | 10 | 1 | 1 | 10 | 1 |
| 29 | 1 | 11 | 1 | 1 | 11 | 1 |
| 30 | 0 | 0 | 8 | 0 | 0 | 5 |
| 31 | 0 | 0 | 9 | 0 | 0 | 6 |
| 32 | 0 | 1 | 4 | 0 | 1 | 3 |
| 33 | 0 | 1 | 5 | 0 | 3 | 2 |
| 34 | 0 | 3 | 2 | 0 | 4 | 2 |
| 35 | 0 | 4 | 2 | 0 | 12 | 1 |
| 36 | 0 | 8 | 1 | 0 | 13 | 1 |
| 37 | 0 | 9 | 1 | 0 | 14 | 1 |
| 38 | 1 | 0 | 2 | 1 | 0 | 2 |
| 39 | 1 | 12 | 1 | 1 | 12 | 1 |
| 40 | 1 | 13 | 1 | 1 | 13 | 1 |
| 41 | 1 | 14 | 1 | 1 | 14 | 1 |
| 42 | 0 | 0 | 10 | 0 | 0 | 7 |
| 43 | 0 | 0 | 11 | 0 | 1 | 4 |
| 44 | 0 | 1 | 6 | 0 | 2 | 3 |
| 45 | 0 | 2 | 3 | 0 | 5 | 2 |
| 46 | 0 | 3 | 3 | 0 | 15 | 1 |
| 47 | 0 | 5 | 2 | 0 | 16 | 1 |
| 48 | 0 | 10 | 1 | 0 | 17 | 1 |
| 49 | 1 | 1 | 2 | 1 | 1 | 2 |
| 50 | 1 | 15 | 1 | 1 | 15 | 1 |
| 51 | 1 | 16 | 1 | 1 | 16 | 1 |
| 52 | 1 | 17 | 1 | 1 | 17 | 1 |
| 53 | 1 | 18 | 1 | 1 | 18 | 1 |
| 54 | 1 | 19 | 1 | 1 | 19 | 1 |
| 55 | 1 | 20 | 1 | 1 | 20 | 1 |
| 56 | 0 | 0 | 12 | 0 | 0 | 8 |
| 57 | 0 | 0 | 13 | 0 | 0 | 9 |
| 58 | 0 | 0 | 14 | 0 | 1 | 5 |
| 59 | 0 | 1 | 7 | 0 | 3 | 3 |
| 60 | 0 | 2 | 4 | 0 | 6 | 2 |
| 61 | 0 | 4 | 3 | 0 | 7 | 2 |
| 62 | 0 | 6 | 2 | 0 | 8 | 2 |
| 63 | 0 | 7 | 2 | 0 | 9 | 2 |
| 64 | 0 | 8 | 2 | 0 | 18 | 1 |
| 65 | 0 | 11 | 1 | 0 | 19 | 1 |
| 66 | 0 | 12 | 1 | 0 | 20 | 1 |
| 67 | 1 | 21 | 1 | 1 | 21 | 1 |
| 68 | 1 | 22 | 1 | 1 | 22 | 1 |
| 69 | 1 | 23 | 1 | 1 | 23 | 1 |
| 70 | 1 | 24 | 1 | 1 | 24 | 1 |
| 71 | 1 | 25 | 1 | 1 | 25 | 1 |
| 72 | 0 | 0 | 15 | 0 | 0 | 10 |
| 73 | 0 | 0 | 16 | 0 | 0 | 11 |
| 74 | 0 | 0 | 17 | 0 | 1 | 6 |
| 75 | 0 | 1 | 8 | 0 | 2 | 4 |
| 76 | 0 | 1 | 9 | 0 | 4 | 3 |
| 77 | 0 | 2 | 5 | 0 | 5 | 3 |
| 78 | 0 | 2 | 6 | 0 | 10 | 2 |
| 79 | 0 | 3 | 4 | 0 | 21 | 1 |
| 80 | 0 | 5 | 3 | 0 | 22 | 1 |
| 81 | 0 | 6 | 3 | 0 | 23 | 1 |
| 82 | 0 | 7 | 3 | 0 | 24 | 1 |
| 83 | 0 | 9 | 2 | 0 | 25 | 1 |
| 84 | 0 | 13 | 1 | 0 | 26 | 1 |
| 85 | 1 | 0 | 3 | 1 | 0 | 3 |
| 86 | 1 | 2 | 2 | 1 | 2 | 2 |
| 87 | 1 | 26 | 1 | 1 | 26 | 1 |
| 88 | 1 | 27 | 1 | 1 | 27 | 1 |

FIG. 74

| | | | | | | | | | | | | |
|---|---|---|---|---|---|---|---|---|---|---|---|---|
| 89 | 1 | 28 | 1 | 1 | 28 | 1 | 134 | 0 | 0 | 26 | 0 | 1 | 9 |
| 90 | 0 | 0 | 18 | 0 | 0 | 12 | 135 | 0 | 1 | 12 | 0 | 1 | 10 |
| 91 | 0 | 0 | 19 | 0 | 1 | 7 | 136 | 0 | 1 | 13 | 0 | 2 | 6 |
| 92 | 0 | 0 | 22 | 0 | 2 | 5 | 137 | 0 | 2 | 10 | 0 | 2 | 7 |
| 93 | 0 | 1 | 10 | 0 | 3 | 4 | 138 | 0 | 2 | 11 | 0 | 3 | 6 |
| 94 | 0 | 3 | 5 | 0 | 6 | 3 | 139 | 0 | 3 | 7 | 0 | 6 | 4 |
| 95 | 0 | 4 | 4 | 0 | 7 | 3 | 140 | 0 | 3 | 8 | 0 | 9 | 3 |
| 96 | 0 | 4 | 5 | 0 | 11 | 2 | 141 | 0 | 4 | 6 | 0 | 13 | 2 |
| 97 | 0 | 5 | 4 | 0 | 27 | 1 | 142 | 0 | 5 | 5 | 0 | 14 | 2 |
| 98 | 0 | 6 | 4 | 0 | 28 | 1 | 143 | 0 | 5 | 6 | 0 | 15 | 2 |
| 99 | 0 | 10 | 2 | 0 | 29 | 1 | 144 | 0 | 8 | 4 | 0 | 16 | 2 |
| 100 | 1 | 1 | 3 | 1 | 1 | 3 | 145 | 0 | 16 | 1 | 0 | 34 | 1 |
| 101 | 1 | 3 | 2 | 1 | 3 | 2 | 146 | 0 | 17 | 1 | 0 | 35 | 1 |
| 102 | 1 | 4 | 2 | 1 | 4 | 2 | 147 | 0 | 18 | 1 | 0 | 36 | 1 |
| 103 | 1 | 29 | 1 | 1 | 29 | 1 | 148 | 1 | 0 | 5 | 1 | 0 | 5 |
| 104 | 1 | 30 | 1 | 1 | 30 | 1 | 149 | 1 | 1 | 4 | 1 | 1 | 4 |
| 105 | 1 | 31 | 1 | 1 | 31 | 1 | 150 | 1 | 10 | 2 | 1 | 10 | 2 |
| 106 | 1 | 32 | 1 | 1 | 32 | 1 | 151 | 1 | 11 | 2 | 1 | 11 | 2 |
| 107 | 1 | 33 | 1 | 1 | 33 | 1 | 152 | 1 | 12 | 2 | 1 | 12 | 2 |
| 108 | 1 | 34 | 1 | 1 | 34 | 1 | 153 | 1 | 38 | 1 | 1 | 38 | 2 |
| 109 | 1 | 35 | 1 | 1 | 35 | 1 | 154 | 1 | 39 | 1 | 1 | 39 | 1 |
| 110 | 0 | 0 | 20 | 0 | 0 | 13 | 155 | 1 | 40 | 1 | 1 | 40 | 1 |
| 111 | 0 | 0 | 21 | 0 | 0 | 14 | 156 | 0 | 0 | 27 | 0 | 0 | 19 |
| 112 | 0 | 0 | 23 | 0 | 0 | 15 | 157 | 0 | 3 | 9 | 0 | 3 | 7 |
| 113 | 0 | 1 | 11 | 0 | 0 | 16 | 158 | 0 | 6 | 5 | 0 | 4 | 5 |
| 114 | 0 | 2 | 7 | 0 | 1 | 8 | 159 | 0 | 7 | 5 | 0 | 7 | 4 |
| 115 | 0 | 2 | 8 | 0 | 3 | 5 | 160 | 0 | 9 | 4 | 0 | 17 | 2 |
| 116 | 0 | 2 | 9 | 0 | 4 | 4 | 161 | 0 | 12 | 2 | 0 | 37 | 1 |
| 117 | 0 | 3 | 6 | 0 | 5 | 4 | 162 | 0 | 19 | 1 | 0 | 38 | 1 |
| 118 | 0 | 7 | 4 | 0 | 8 | 3 | 163 | 1 | 1 | 5 | 1 | 1 | 5 |
| 119 | 0 | 8 | 3 | 0 | 12 | 2 | 164 | 1 | 2 | 3 | 1 | 2 | 3 |
| 120 | 0 | 9 | 3 | 0 | 30 | 1 | 165 | 1 | 13 | 2 | 1 | 13 | 2 |
| 121 | 0 | 11 | 2 | 0 | 31 | 1 | 166 | 1 | 41 | 1 | 1 | 41 | 1 |
| 122 | 0 | 14 | 1 | 0 | 32 | 1 | 167 | 1 | 42 | 1 | 1 | 42 | 1 |
| 123 | 0 | 15 | 1 | 0 | 33 | 1 | 168 | 1 | 43 | 1 | 1 | 43 | 1 |
| 124 | 1 | 0 | 4 | 1 | 0 | 4 | 169 | 1 | 44 | 1 | 1 | 44 | 1 |
| 125 | 1 | 5 | 2 | 1 | 5 | 2 |
| 126 | 1 | 6 | 2 | 1 | 6 | 2 |
| 127 | 1 | 7 | 2 | 1 | 7 | 2 |
| 128 | 1 | 8 | 2 | 1 | 8 | 2 |
| 129 | 1 | 9 | 2 | 1 | 9 | 2 |
| 130 | 1 | 36 | 1 | 1 | 36 | 1 |
| 131 | 1 | 37 | 1 | 1 | 37 | 1 |
| 132 | 0 | 0 | 24 | 0 | 0 | 17 |
| 133 | 0 | 0 | 25 | 0 | 0 | 18 |

F I G. 75

MOVING PICTURE CODING AND/OR DECODING SYSTEMS, AND VARIABLE-LENGTH CODING AND/OR DECODING SYSTEM

This application is a Continuation of U.S. application Ser. No. 10/682,831, filed Oct. 10, 2003 now abandoned, which is a Continuation of U.S. application Ser. No. 09/476,088, filed Jan. 3, 2000 now U.S. Pat. No. 6,704,494 which is a Divisional of U.S. application Ser. No. 08/924,387, filed Sep. 5, 1997 now U.S. Pat. No. 6,104,754, which is a Continuation-in-Part of U.S. application Ser. No. 08/616, 809, filed Mar. 15, 1996 now U.S. Pat. No. 5,852,469, which claims priority from Japanese Patent Applications 7-056285, filed Mar. 15, 1995, 7-089772, filed Apr. 14, 1995, 7-260383, filed Oct. 6, 1995, 7-277982, filed Oct. 25, 1995, 8-080550, filed Mar. 8, 1996, 8-236779, filed Sep. 6, 1996, 8-298779, filed Nov. 11, 1996 and 9-081614, filed Mar. 31, 1997. The entire content of the aforementioned applications are incorporated herein by reference.

BACKGROUND OF THE INVENTION

The present invention relates generally to a variable length coding and/or decoding system used for compression coding and/or decoding moving picture signals or the like. More specifically, the invention relates to a variable length coding and/or decoding system capable of decoding both in forward and backward directions, and a recording medium for recording data or programs for use in the system.

A variable length code is a code system of a short code length on average, which is obtained by assigning a short code length of codes to a frequently appearing symbols and a long code length of codes to a rarely appearing symbols on the basis of the appearance frequency of symbols. Therefore, if a variable length code is used, the amount of data can be considerably compressed in comparison with the amount of data before being coded. As a method for forming such a variable length code, the Huffman algorithm suitable for memoryless sources is known.

In general, there is a problem in that, if an error is mixed in a variable length code due to a channel error of coded data or the like, a decoding system can not correctly decode the data due to the propagation of influence of the error after the error is mixed therein. In order to avoid this problem, there is a typical method for inserting synchronization patterns at intervals to prevent the propagation of an error when there is a possibility that the error may occur in a channel. Bit patterns, which do not appear by any combinations of variable length codes, are assigned to the synchronization patterns. According to this method, even if coded data can not be decoded due to an error occurring therein, it is possible to prevent the propagation of the error to correctly decode the coded data by finding the next synchronization pattern.

However, even if the synchronization patterns are used, the coded data can not be decoded until the next synchronization pattern is found from the position, at which the coded data can not be correctly decoded due to the error occurring therein as shown in FIG. 1A.

Therefore, there is known a method for changing the variable length codes from the usual configurations shown in FIGS. 2A through 2C to the configurations shown in FIGS. 3A through 3C to form code words, which can be decoded in a usual forward direction as well as in a backward direction as shown in FIG. 1B. Since the coded data of such code words are also readable in the backward direction, the code words can be also used for reverse reproduction in a storage medium, such as a disc memory, for storing the coded data. This variable length code, which can be decoded in the forward direction as well as in the backward direction, will be hereinafter referred to as a "reversible code".

An example of the reversible code is disclosed in Japanese Patent Laid-Open No. 5-300027, entitled "Reversible Variable Length Coding System". This publicly-known reversible code is a variable length code, which can also be decoded in the backward direction by adding bits to the ends of code words of a Huffman code, which is a variable code capable of being decoded in the forward direction as shown in FIGS. 2A through 2C, so that the respective code words are not coincident with other code words having longer code lengths as shown in FIGS. 3A through 3C. However, this reversible code contains many useless bits to have a long average code length since the bits are added to the ends of the code words of the variable length code, which can be decoded only in the forward direction. Consequently, the coding efficiency is considerably deteriorated in comparison with the variable length code, which can be decoded only in the forward direction.

There is also a problem in that the conventional reversible code can not be decoded in the backward direction if synchronization intervals are set every predetermined intervals. For example, ITU-T H.263 (1996) can align synchronization patterns every 8 bits (=1 byte), i.e., it can set positions, at which the synchronization patterns can be inserted, every 1 byte. In order to realize such alignment of synchronization intervals, stuffing codes shown in FIG. 34 are inserted before the synchronization patterns. In such a case, in the conventional reversible codes, there is a problem in that the backward decoding can not be carried out due to the stuffing bits.

Moreover, when the reversible code is simply decoded, there is a problem in that the circuit scale and the amount of operation have to be twice as large as those in a usual decoding system for variable length codes, which can be decoded only in the forward direction, by the amount decoded in the backward direction.

There is another problem in that the conventional reversible code can not be decoded in the backward direction by syntax of input information as the case may be. For example, in the case of source symbols having syntax shown in FIG. 5A, the sign of symbol B is determined by symbol A. Coded data obtained by coding source symbols having such syntax can not be decoded in the backward direction since the symbol B can not be decoded unless the symbol A has been decoded as shown in FIG. 5B.

As a coding system used when the number of source symbols is high, there is a system using escape codes. This system using escape codes has code words corresponding to a small number of source symbols having a high appearance frequency as a code-word table, and encodes a large majority of source symbols having a low appearance frequency by the combinations of escape codes and fixed length codes. Also in this system using escape codes, there has been provided a system for applying escape codes to the prefix and suffix of a variable length code, similar to the variable length code capable of being decoded both in the forward and backward directions.

In the conventional coding and/or decoding system using escape codes, it is required to search the code-word table for the presence of code words in order to distinguish the code words existing in the code-word table from the code words to be coded using escape codes.

That is, as described above, since the conventional reversible code, i.e., the variable length code capable of being decoded both in the forward and backward directions, is formed by adding bits to the suffix of code words of a variable length code capable of being decoded only in the forward direction, there is a problem in that useless bit patterns are increased to increase an average code length, so that the coding efficiency is considerably deteriorated in comparison with the variable length code capable of being decoded only in the forward direction. In addition, if the synchronization intervals are set every predetermined intervals using stuffing bits, there is a problem in that the reversible code can not be decoded in the backward direction due to the stuffing bits. Moreover, if the reversible code is simply decoded, there is a problem in that the circuit scale and the amount of operation have to be twice as large as those in a usual decoding system for variable length codes capable of being decoded only in the forward direction, by the amount decoded in the backward direction, and there is a problem in that it is not possible to decode in the backward direction by the syntax of input information as the case may be.

SUMMARY OF THE INVENTION

It is therefore an object of the present invention to eliminate the aforementioned problems and to provide a variable length coding and/or decoding system, which can efficiently encode and/or decode data by a small amount of operation and a small memory capacity and which can decode both in forward and backward directions.

It is another object of the present invention to provide a variable length coding and/or decoding system, which can decrease the number of useless bit patterns to enhance the coding efficiency and which can decode both in forward and backward directions even if synchronization intervals are set every predetermined intervals using stuffing codes.

It is further object of the present invention to provide a variable length coding and/or decoding system, which can decrease the number of useless bit patterns to enhance the coding efficiency, which can decrease the circuit scale and the amount of operation to efficiently decode by sequentially carrying out the decoding process, and which can decode both in forward and backward directions.

It is still further object of the present invention to provide a variable length coding and/or decoding system, which can decode both in forward and backward directions regardless of the syntax of inputted source symbols and which has a higher resistance to errors.

In order to accomplish the aforementioned and other objects, according to one aspect of the present invention, there is provided a first variable length coding system, which assigns, to a plurality of source symbols, code words having a code length corresponding to the occurrence probability of the source symbols and which outputs code words corresponding to inputted source symbols as coded data, the variable length coding system comprising: a code-word table for storing therein a plurality of code words including codes words, which are capable of being decoded both in forward and backward directions and which are formed so that delimiters of the code words are capable of being determined by a predetermined weight of the code words, so that the plurality of code words correspond to source symbols; code-word selecting means for selecting code words corresponding to inputted source symbols from the code-word table; and synchronization interval setting means for preparing coded data for each of predetermined synchronization intervals using code words selected by the code-word selecting means and for inserting stuffing codes, which are capable of being decoded in the backward direction.

The term "weight of code words" corresponds to a Hamming distance with respect to the minimum or maximum value of the code words. When the code words are binary codes, since all the minimum values of the code words are "0" and all the maximum values are "1", the weight of the code words corresponds to the number of "1"s or "0"s. The position, at which the weight of the code words is a predetermined value, is a delimiter of code words in a variable length code.

In this variable length coding system, the delimiter of code words, i.e., a variable length code of code words having a predetermined code length, is formed by the weight of the code words, i.e., a value independent of the order of the code words. Therefore, this variable length code is a reversible code capable of being decoded both in the forward and backward directions since the delimiter can be identified both in the forward and backward directions. Since the reversible code is originally formed without adding excessive bits unlike a conventional reversible code that a bit is added to the suffix of a variable length code capable of being decoded only in the forward direction, it is possible to obtain a variable length code having a small amount of useless bit patterns and a high coding efficiency.

In this variable length coding system, even if synchronization intervals are set every predetermined interval, it is possible to decode the reversible code in the backward direction using a stuffing code capable of being decoded in the backward direction. That is, when the reversible code is decoded in the backward direction, the suffix of the reversible code (the prefix in the backward direction) must be identified. However, if the stuffing code capable of being decoded in the backward direction is used, the suffix of the reversible code can be identified, so that the reversible code can be decoded in the backward direction.

According to another aspect of the present invention, there is provided a second variable length coding system, which assigns, to a plurality of source symbols, code words having a code length corresponding to the occurrence probability of the source symbols and which outputs code words corresponding to inputted source symbols as coded data, the variable length coding system comprising: layering means for layering inputted source symbols in accordance with importance; a code-word table for storing therein a plurality of code words including codes words, which are capable of being decoded both in forward and backward directions and which are formed so that the delimiters of the code words are capable of being identified by a predetermined weight of the code words, so that the plurality of code words correspond to the source symbols; code-word selecting means for selecting code words corresponding to the inputted source symbols layered by the layering means, from the code-word table; and synchronization interval setting means for preparing coded data of each of layers for each of predetermined synchronization intervals using code words selected by the code-word selecting means and for multiplexing the coded data of each of layers.

In this variable length coding system, the inputted source symbols are variable-length coded using the code-word table, and the synchronization interval is set every layer, so that it is possible to carry out the variable-length coding resistant to errors, which can be decoded both in the forward and backward directions independent of syntax of the inputted source symbols.

In the first and second variable length coding systems, out of the plurality of code words stored in the code-word table, the code words, which are capable of being decoded both in forward and backward directions and which are formed so that the delimiters of the code words are capable of being identified by a predetermined weight of the code words, have preferably first and second code words capable of being decoded both in the forward and backward directions, the second code word being added to at least one of the prefix and suffix of the first code word, or the second code word being added at least one of immediately before and after respective bits of the first code word.

Since the code words of this construction can correspond to a wider probability distribution of source symbols, it is possible to enhance the coding efficiency and to design codes having a high degree of freedom for the bit patterns of code words. Therefore, even if synchronization intervals are set using synchronization patterns, it is possible to avoid the problem in pseudo synchronization due to the coincidence of the synchronization pattern with the bit pattern of code words.

In the first and second variable length coding systems, out of the plurality of code words stored in the code-word table, the code words, which are capable of being decoded both in the forward and backward directions and which are formed so that the delimiters of the code words are capable of being identified by a predetermined weight of the code words, may have code words, which are capable of being decoded both in the forward and backward directions and between the respectively bits of which code words of a fixed length code are inserted by predetermined bits.

Alternatively, the code words, which are capable of being decoded both in the forward and backward directions and which are formed so that the delimiters of the code words are capable of being identified by a predetermined weight of the code words, may have first and second code words, which are capable of being decoded both in forward and backward directions, the second code word being inserted between the respective bits of the first code word.

Since the code words of this construction can correspond to a wider probability distribution of source symbols, it is possible to enhance the coding efficiency and to design codes having a high degree of freedom for the bit patterns of code words. Therefore, even if synchronization intervals are set using synchronization patterns, it is possible to avoid the problem in pseudo synchronization due to the coincidence of the synchronization pattern with the bit pattern of code words.

According to further aspect of the present invention, a first variable length decoding system corresponds to the first variable length coding system. The first variable length decoding system for decoding coded data, which are of variable length codes of code words containing code words, which are capable of being decoded both in forward and backward directions and into which stuffing codes capable of being decoded in the backward direction are inserted every predetermined synchronization interval, comprises: synchronization interval detecting means for detecting a synchronization interval of the coded data; forward decoding means for decoding, in the forward direction, the coded data in the synchronization interval detected by the synchronization interval detecting means; and backward decoding means for decoding, in the backward direction, the data in the synchronization interval detected by the synchronization interval detecting means.

This variable length decoding system may have decoded-value determining means for determining decoded values on the basis of the decoded results of the forward decoding means and the backward decoding means.

The synchronization interval detecting means may detect the bit number of the coded data, e.g., by decoding the stuffing code in the backward direction.

At least one of the forward decoding means and the backward decoding means may detect the coded data as an error when a code word, which does not exist in a code-word table of a variable length code, appears in the coded data, or detect as an error when the bit number of the decoded coded data is not coincident with the bit number of transmitted coded data.

Alternatively, at least one of the forward and backward decoding means may detect as an error in the decoding processing when a decoded value obtained by decoding the coded data is inadequate, On the other hand, the decoded-value determining means uses a decoded result, which is presumed to be correct, of decoded results of the forward decoding means and the backward decoding means, and abandons a portion, which is not capable of being decoded in both of the decoded results, when an error is detected by at least one of the forward decoding means and the backward decoding means.

Specifically, the decoded-value determining means:
(a) uses, as decoded values, only decoded values, in which no error has been detected, when the error is detected in both of the forward decoding means and the backward decoding means and when the ways to the error detected positions do not overlap with each other;
(b) uses forward decoded results as decoded values for code words immediately before a position, at which the error is found by the forward decoding means, and uses backward decoded results as decoded values for code words after the position, when errors are detected both in the forward decoding means and the backward decoding means and when the ways to error detected positions overlap with each other;
(c) uses forward decoded results as coded values for code words immediately before a position, at which the error is detected, and uses backward decoded results as decoded values for code words after the position, when the error is detected by only one of the forward decoding means and the backward decoding means; and
(d) abandons decoded values for code words at the position, at which the error has been decoded, and uses backward decoded results as decoded values for code words after the position, when the error is detected for the same code word by the forward decoding means and the backward decoding means.

The decoded-value determining means may abandon all the portions, which may contain errors, when the errors are detected by at least one of the forward decoding means and the backward decoding means.

When the decoded values are determined on the basis of the decoded results of the forward and backward decoding means, which have the function of detecting errors in the code words of the variable length code, this variable length decoding system determines decoded values of coded data in accordance with the error detection results in the forward decoding means and the backward decoding means, so that the reversible code outputted from the variable length coding system can be effectively decoded to channel errors.

In addition, since the code capable of being decoded in the backward direction is used as the stuffing code, even if the synchronization intervals are set every predetermined interval using the stuffing code, the reversible code can be decoded in the backward direction.

According to still further aspect of the present invention, a second variable length decoding system for decoding coded data, which are of variable length codes of code words containing code words capable of being decoded both in forward and backward directions and into which stuffing codes capable of being decoded in the backward direction are inserted every predetermined synchronization interval, comprises: synchronization interval detecting means for detecting a synchronization interval of the coded data; and bidirectional decoding means for decoding the decoded data in the synchronization interval detected by the synchronization interval detecting means, both in the forward and backward directions.

The bidirectional decoding means may detect as an error of the decoding process, when a decoded value obtained by decoding coded data is inadequate in at least one of the forward and backward decoding processes.

As the decoding methods by the bidirectional decoding means, the following methods can be used.

(a) After the forward decoding process is carried out, the backward decoding process is carried out from the suffix of the coded data.
(b) When an error is detected in the forward decoding process, the forward decoding process is stopped and the backward decoding process is carried out from the suffix of the coded data.
(c) When an error is decoded in the forward decoding process, the forward decoding process is resumed from a position apart from the position of the error by a predetermined distance.
(d) When an error is detected in the forward decoding process, the backward decoding process is carried out from a position apart from the position of the error by a predetermined distance to the position of the error.
(e) Only when an error is detected at the suffix of the coded data in the forward decoding process, the backward decoding process is carried out.

This second variable length decoding system may also have decoded-value determining means for determining decoded values on the basis of the decoded results of the forward decoding means and the backward decoding means.

In this variable length decoding system, when the decoding process is carried out by the bidirectional decoding means having the function of detecting errors in the code words of the variable length code, the decoding process of the coded data is switched in accordance with the error detected results in the forward decoding process, so that the forward and backward decoding means can be commonly used. Therefore, the reversible code outputted from the variable length coding system can be effectively decoded to the channel errors without greatly increasing the circuit scale and the amount of operation.

According to another aspect of the present invention, a third variable length decoding system corresponds to the third variable length coding system. The third variable length decoding system for decoding coded data every predetermined synchronization interval, the coded data comprising variable length codes, which are of code words containing code words capable of being decoded both in forward and backward directions, and the coded data being prepared by code words corresponding to layered source symbols to be multiplexed, comprises: dividing means for dividing the multiplexed coded data into respective layers; synchronization interval detecting means for detecting a synchronization interval of the coded data divided by the dividing means; forward decoding means for decoding, in the forward direction, the coded data in the synchronization interval detected by the synchronization interval detecting means; backward decoding means for decoding, in the backward direction, the data in the synchronization interval detected by the synchronization interval detecting means; and synthesizing means for synthesizing decoded results of respective layers obtained by the forward decoding means and the backward decoding means.

This third variable length decoding system may also have decoded-value determining means for determining decoded values on the basis of the decoded results of the forward decoding means and the backward decoding means.

If the third variable length decoding system is combined with the third variable length coding system, it is possible to provide a variable length coding and/or decoding system, which can be decoded both in the forward and backward directions regardless. of the syntax of source symbols and which has a higher resistance to errors.

A recording medium, which has recorded therein variable length coded data capable of being inputted and is outputted by a first variable length coding and/or decoding system of the present invention, readably records therein: coded data including code words, which are capable of being decoded both in forward and backward direction and which are formed so that the delimiters of the code words are identified by a predetermined weight of the code words; and data, in which stuffing codes capable of being decoded in the backward direction every predetermined synchronization interval are inserted into the coded data.

A recording medium having recorded therein transform coefficient data capable of being produced by orthogonal transforming every block in an image coding and/or decoding system, to which a variable length coding and/or decoding system of the present invention is applied, readably records therein: the transform coefficient data wherein a plurality of code words capable of being decoded both in forward and backward directions correspond to orthogonal transform coefficients having high appearance frequencies except for the last orthogonal transform coefficients of the block, for each of a plurality of coded modes of the image coding and/or decoding system; data wherein a plurality of code words capable of being decoded both in the forward and backward directions are commonly provided for a plurality of coded modes of the image coding and/or decoding system and correspond to orthogonal transform coefficients having high appearance frequencies of the last orthogonal transform coefficients of the block; data wherein transform coefficient data having low appearance frequency are described by fixed length codes, and code words capable of being decoded both in forward and backward directions are added to the prefix and suffix thereof; and data wherein stuffing codes capable of being decoded in the backward direction are inserted in the coded data every predetermined synchronization interval.

In addition, a recording medium, which has recorded therein variable length coded data capable of being inputted and outputted by a variable length coding and/or decoding system of the present invention, records therein: coded data including code words, which are capable of being decoded both in forward and backward direction and which are formed so that the delimiters of the code words are identified by a predetermined weight of the code words; and data wherein stuffing codes capable of being decoded in the backward direction every predetermined synchronization interval are inserted into the coded data.

Moreover, a recording medium, which has recorded therein transform coefficient data capable of being produced by orthogonal transforming every block in an image coding and/or decoding system of the present invention, records therein: the transform coefficient data wherein a plurality of code words capable of being decoded both in forward and backward directions correspond to orthogonal transform coefficients having high appearance frequencies other than the last orthogonal transform coefficients of the block, for each of a plurality of coded modes of the image coding and/or decoding system; data wherein a plurality of code words capable of being decoded both in the forward and backward directions are commonly provided for a plurality of coded modes of the image coding and/or decoding system and correspond to orthogonal transform coefficients having high appearance frequencies of the last orthogonal transform coefficients of the block; data wherein transform coefficient data having low appearance frequency are described by fixed length codes and code words capable of being decoded both in the forward and backward directions are added to the prefix and suffix thereof; and data wherein stuffing codes capable of being decoded in the backward direction are inserted in the coded data every predetermined synchronization interval.

In addition, a recording medium having recorded therein a program for use in a variable length coding system, which assigns, to a plurality of source symbols, code words having a code length according to occurrence probability of the source symbols, to output code words corresponding to inputted source symbols as coded data, includes at least the steps of: storing a code-word table wherein a plurality of code words including code words, which are capable of being decoded both in forward and backward directions and which are formed so that the delimiters of the code words are capable of being identified by a predetermined weight of the code words, correspond to source symbols; selecting code words corresponding to the inputted source symbols from the code-word table; and preparing coded data every synchronization interval by using the code words selected by the code-word selecting step, and setting a synchronization interval to the code words by inserting stuffing codes capable of being decoded in the backward direction.

Moreover, a recording medium having recorded therein a program for use in a variable length decoding system for decoding coded data, which are of variable length codes of code words including code words capable of being decoded both in forward and backward directions and into which stuffing codes capable of being decoded in the backward direction are inserted every predetermined synchronization interval, includes at least the steps of: detecting a synchronization interval of the coded data; decoding the coded data in the synchronization interval detected by the synchronization interval detecting step in the forward direction; and decoding the coded data in the synchronization interval detected by the synchronization interval detecting step in the backward direction.

As described above, according to the present invention, it is possible to provide a variable length coding and/or decoding system, which can efficiently code and decode with smaller amounts of calculation and storage and which can decode both in the forward and backward directions.

According to the present invention, it is possible to provide a variable length coding and/or decoding system, which can decrease useless bit patterns to enhance the coding efficiency and which can decode both in the forward and backward directions even if the synchronization intervals are set every predetermined interval using the stuffing code.

The code-word forming method of the present invention can be applied to a wider probability distribution of source symbols and to code words of a large number of source symbols, to which conventional methods can not be applied. Specifically, it can be applied to a moving picture coding and/or decoding system, and it is possible to provide a moving picture coding and/or decoding system resistant to errors.

In addition, since this code-word forming method can enhance the coding efficiency and design codes having a high degree of freedom for bit patterns of code words, even if synchronization intervals are set by means of synchronization patterns, it is possible to avoid the problem in pseudo synchronization due to the coincident of the synchronization pattern with the bit pattern of the code words.

Moreover, according to the present invention, when the decoded values are determined on the basis of the forward and backward decoded results, the reversible code can be effectively decoded to channel errors by determining the decoded values of the coded data.

In addition, according to the present invention, when the decoding process is carried out by the bidirectional decoding means having the function of detecting errors in the code words of the variable length code, if the decoding process of the coded data is switched in accordance with the error detected results in the forward decoding process, the forward and backward decoding processes can be commonly used, so that decoding can be effectively carried out to channel errors without greatly increasing the circuit scale and the amount of operation.

Moreover, according to the present invention, source symbols are layered in accordance with importance to be variable-length coded on the coding side, and coded data for each of layers are prepared every synchronization interval and multiplexed, so that it is possible to decode both in the forward and backward directions regardless of the syntax of source symbols and to carry out the variable length coding and/or decoding with a higher resistance to errors.

BRIEF DESCRIPTION OF THE DRAWINGS

In the drawings:

FIGS. 1A and 1B are schematic drawings, each illustrating a typical coding method for a reversible code;

FIG. 2A is a table explaining a usual variable length code;

FIG. 2B is a diagram illustrating a coding tree for decoding the usual variable length code in a forward direction;

FIG. 2C is a diagram illustrating a coding tree for decoding the usual variable length code in a backward direction;

FIG. 3A is a table explaining a conventional reversible code;

FIG. 3B is a diagram illustrating a coding tree for decoding the conventional reversible code in a forward direction;

FIG. 3c is a diagram illustrating a coding tree for decoding the conventional reversible code in a backward direction;

FIG. 4 is a diagram illustrating conventional stuffing bits;

FIGS. 9A and 9B are diagrams illustrating decoding trees in forward and backward directions, respectively, which are prepared from code words formed by the first code-word forming method;

FIG. 11 is a diagram explaining a third code-word forming method in the code-word forming part of FIG. 7;

FIG. 12A is a diagram explaining a method for setting a synchronization interval using a synchronization pattern in a synchronization interval setting part;

FIG. 12B is a diagram explaining a method for setting a synchronization interval by describing a coded amount;

FIG. 13 is a diagram illustrating a first embodiment of stuffing bits;

FIG. 14 is a diagram illustrating a second embodiment of stuffing bits;

FIG. 19 is a table showing a part of a code-word table of INTRA and INTER non-LAST coefficients in the second preferred embodiments;

FIG. 20 is a table showing a part of a code-word table of INTRA and INTER non-LAST coefficients in the second preferred embodiment, which is continued from FIG. 19;

FIG. 21 is a table showing a part of a code-word table of INTRA and INTER non-LAST coefficients in the second preferred embodiment, which is continued from FIG. 20;

FIG. 22 is a table showing a first half of a code-word table of INTRA and INTER LAST coefficients in the second preferred embodiment;

FIG. 23 is a table showing a second half of a code-word table of INTRA and INTER LAST coefficients in the second preferred embodiment;

FIG. 30 is a diagram explaining a second code-word forming method in the code-word forming part of FIG. 28;

FIGS. 38A through 38C are diagrams illustrating examples of the data hierarchization and multiplexing in a data layering part and a multiplexing part of FIG. 35, respectively;

FIG. 39 is a diagram showing an example of a decoded-value determining method in a decoded-value determining part of FIG. 37;

FIG. 44 is a table showing a part of a coding table of motion vectors in the fourth preferred embodiment;

FIG. 45 is a table showing a part of a coding table of motion vectors in the fourth preferred embodiment, which is continued from FIG. 44;

FIG. 46 is a table showing a part of a coding table of motion vectors in the fourth preferred embodiment, which is continued from FIG. 45;

FIG. 47 is a table showing a part of a coding table of motion vectors in the fourth preferred embodiment, which is continued from FIG. 46;

FIG. 48 is a table showing a part of a coding table of motion vectors in the fourth preferred embodiment, which is continued from FIG. 47;

FIG. 49 is a table showing a part of a coding table of motion vectors in the fourth preferred embodiment, which is continued from FIG. 48;

FIG. 50 is a table showing a part of a coding table of motion vectors in the fourth preferred embodiment, which is continued from FIG. 49;

FIG. 51 is a table showing a part of a coding table of motion vectors in the fourth preferred embodiment, which is continued from FIG. 50;

FIG. 62 is a schematic diagram of a system incorporating the ninth preferred embodiment of a variable length coding and/or decoding system according to the present invention;

FIG. 66 is an INDEX table of INTRA coefficients;

FIG. 67 is an INDEX table of INTER coefficients;

FIG. 68 is an INDEX table of LASR coefficients;

FIG. 69 is a code-word table in the tenth preferred embodiment;

FIG. 70 is a code-word table in the tenth preferred embodiment;

FIG. 74 is a decoded-value table in the tenth preferred embodiment;

FIG. 75 is a decoded-value table in the tenth preferred embodiment, which is continued from FIG. 74.

DESCRIPTION OF THE PREFERRED EMBODIMENTS

Referring now to the accompanying drawings, the preferred embodiments of a coding and/or decoding system, according to the present invention, will be described below.

First Preferred Embodiment

Figures 5A, 5B:
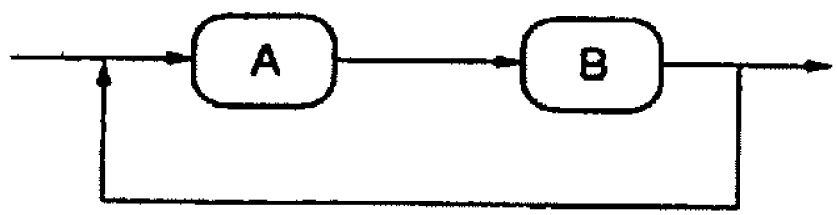
FIGS. 5A and 5B are diagrams, each illustrating a conventional syntax of source symbols, which can not be decoded in the backward direction.
Figure 6:
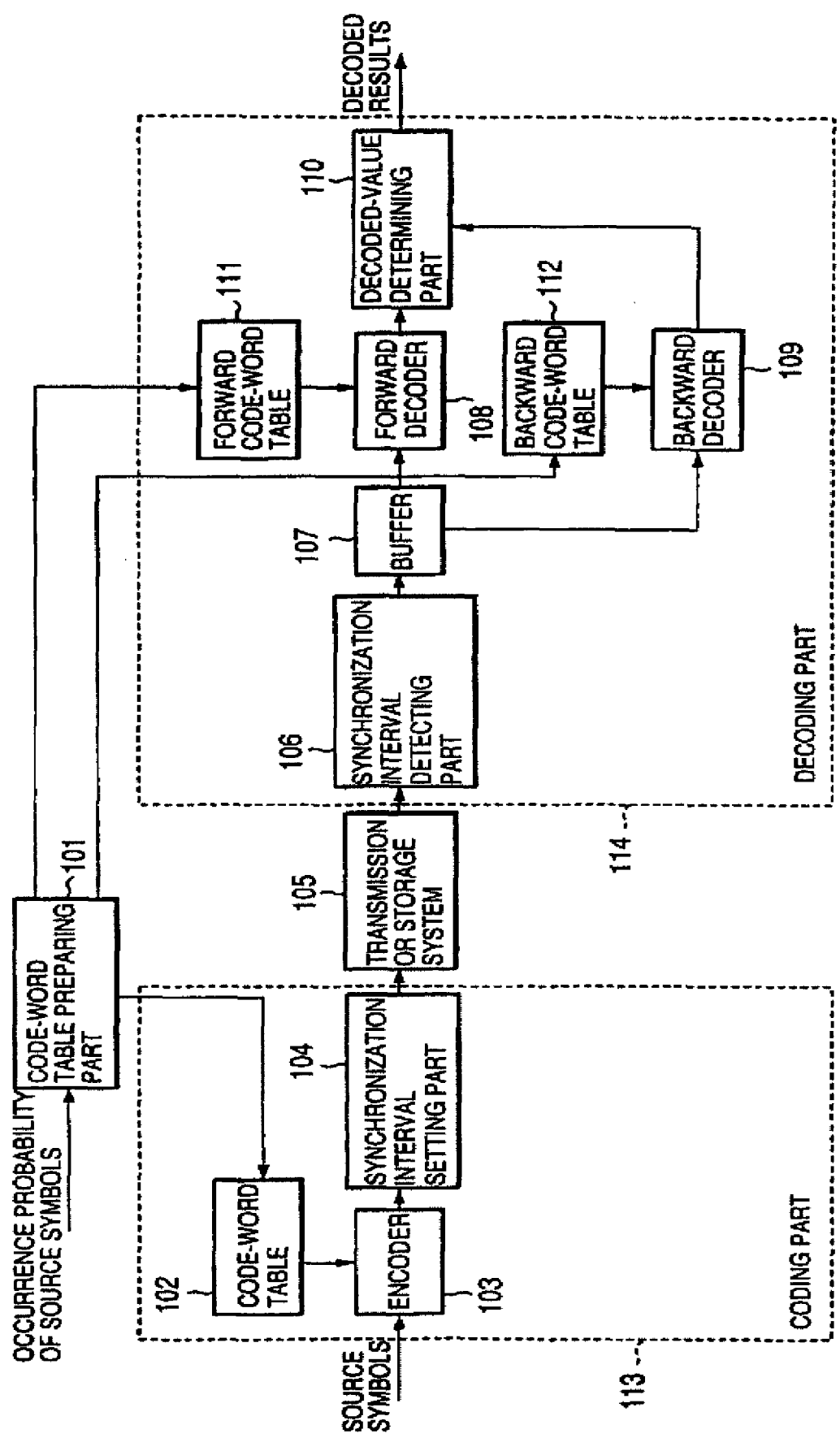
FIG. 6 is a block diagram of the first preferred embodiment of a variable length coding and/or decoding system according to the present invention.

FIG. 6 is a block diagram of the first preferred embodiment of a variable length coding and/or decoding system according to the present invention.

As shown in FIG. 6, the variable length coding and/or decoding system in the first preferred embodiment generally comprises a code-word table preparing part 101, a coding part 113, a transmission or storage system 105 and a decoding part 114. First, the functions of the respective parts will be briefly described. The code-word table preparing part 101 prepares a code-word table on the basis of the occurrence probability of source symbols, and transmits code words to a code-word table 102 provided in the coding part 113 and a forward code-word table 111 and a backward code-word table 112, which are provided in the decoding part 114. The coding part 113 encodes the source symbols to a variable length code, and outputs the variable length code as coded data to the transmission or storage system 105. The decoding part 114 decodes the coded data inputted via the transmission or storage system 105 to reproduce the original source symbol.

The detailed constructions and operations of the respective parts in the first preferred embodiments will be described below.

First, in the coding part 113, inputted source symbols are inputted to an encoder 103. The coding part 113 comprises a code-word table 102, the encoder 103 and a synchronization interval setting part 104. The code-word table 102 stores therein source symbols, which have been prepared by the code-word table preparing part 101, and code words of a variable length code so that the source symbols correspond to the code words. The encoder 103 selects code words corresponding to the inputted source symbols from the code words stored in the code-word table 102, to output the selected code words. In the synchronization interval setting part 104, the code words selected by the encoder 103 are grouped every synchronization interval, and stuffing bits capable of being decoded both in forward and backward directions are inserted, to output coded data every synchronization interval. The coded data are transmitted to the decoding part 114 via the transmission or storage system 105.

The decoding part 114 comprises a synchronization interval detecting part 106, a buffer 107, a forward decoder 108, a backward decoder 109, a decoded-value determining part 110, a forward decoding table 111 and a backward decoding table 112. In the decoding part 114, the synchronization interval detecting part 106 detects the synchronization intervals of coded data inputted by the transmission or storage systems 105, and the buffer 107 stores the coded data. The forward decoder 108 starts to decode the coded data stored in the buffer 107 from the prefix of the coded data, and the backward decoder 109 starts to decode the coded data stored in the buffer 107 from the suffix of the coded data.

The forward decoder 108 determines that an error is detected, when a bit pattern, which does not exist in the forward code-word table 111, appears in the coded data and when coded data having a bit number different from the bit number of the buffer 107 is decoded. Similarly, the backward decoder 109 determines that an error is detected, when a bit pattern, which does not exist in the backward codeword table 112, appears in the coded data and when coded data having a bit number different from the bit number of the buffer is decoded.

The decoded-value determining part 110 determines a decoded value on the basis of a decoded result (hereinafter referred to as a "forward decoded result") obtained by the forward decoder 108 and a decoded result (hereinafter referred to as a "backward decoded result") obtained by the backward decoder 109, and outputs a final decoded result.

Figure 7:
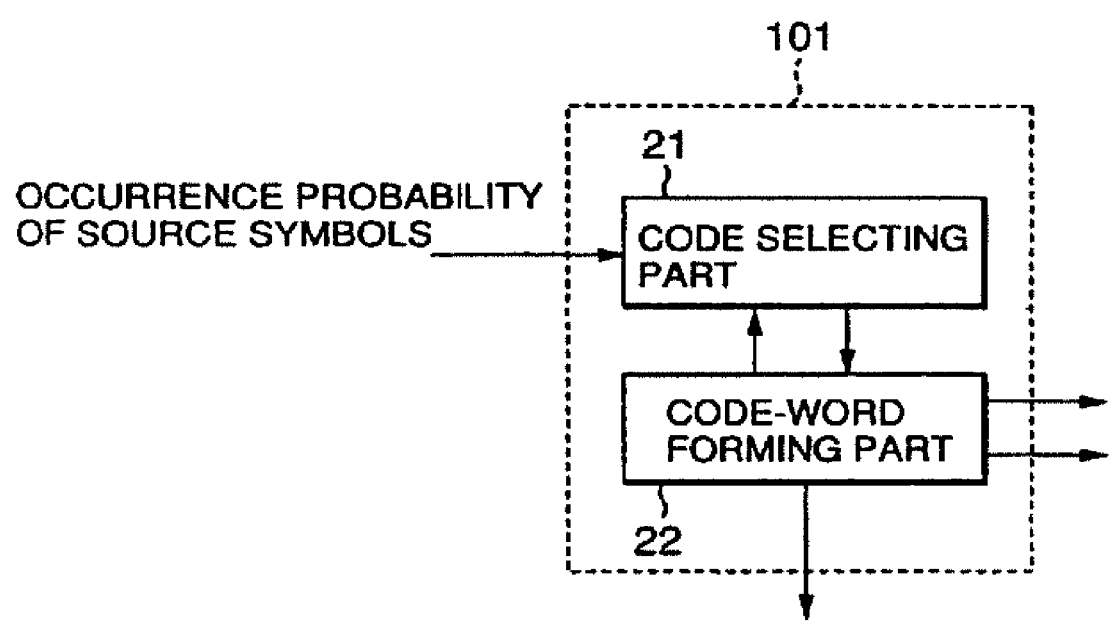
FIG. 7 is a block diagram of a code-word table preparing part of FIG. 6.

FIG. 7 is a block diagram of the coded-word table preparing part 101. A code selecting part 21 receives information on the occurrence probability of source symbols, and selects a code system having a shortest average code length from selectable code systems to transmit the selected result to a code-word forming part 22. The code-word forming part 22 forms code word of a code selected by the code-word selecting part 21.

The code words formed by the code-word forming part 22 are code words of a variable length code (hereinafter referred to as a "reversible code"), which is formed so that the delimiters in the code can be indicated on the basis of a predetermined weight of code words and which can be decoded both in forward and backward directions. This code is disclosed, e.g., in Japanese Patent Laid-Open No. 7-89772 or 7-260383.

In the first preferred embodiment, in order to increase the degree of freedom for the bit pattern of code words corresponding to a wider probability distribution, the following method for forming code words in the code-word forming part 22 is used.

Figure 8:
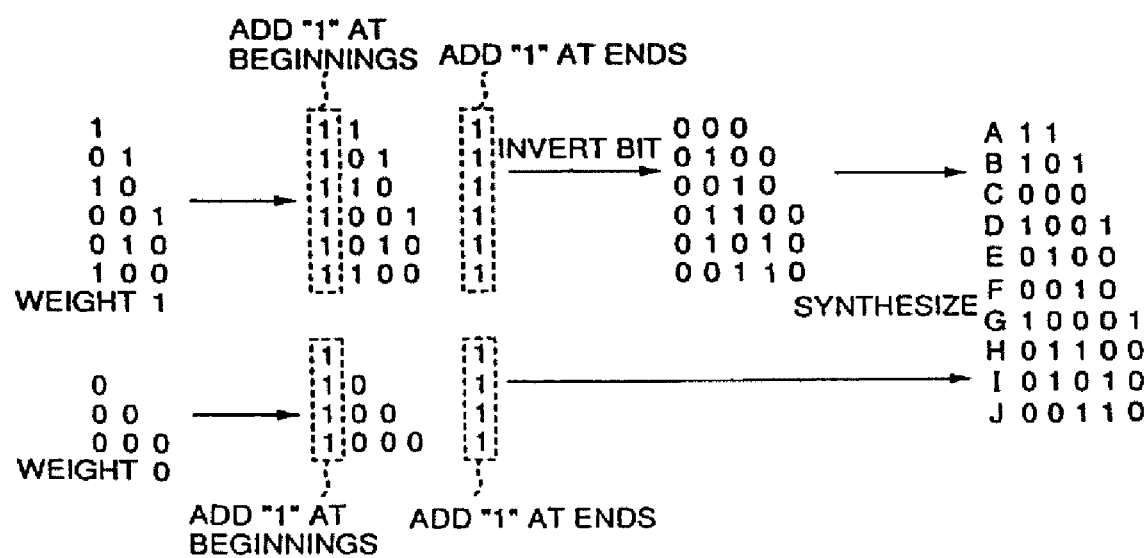
FIG. 8 is a diagram explaining a first code-word forming method in a code-word forming part of FIG. 7.

FIG. 8 shows a first method for forming code words of a reversible code in the code-word forming part 22. First, as shown on the left side of FIG. 8, two binary series, each of which has a constant weight (the weight is the number of "1" in this case) in the order of short code length and which have different weights (the weights are 0 and 1 in this case), are prepared. Then, as shown in the middle of FIG. 8, after "1"s are added to the prefix and suffix of the binary series to reverse the bits of the binary series, the two binary series are synthesized as shown on the right side of FIG. 8.

The code length of this variable length code can be determined by counting the number of symbols at the beginnings of the respective codes. In the example of FIG. 8, when the first is "0", the delimiter of the code (code length) can be identified if two "0"s appear, and when the first is "1", the delimiter of the code can be identified if three "1"s appear. The variable length code shown in FIG. 8 can be decoded both in forward and backward directions since the code words corresponding to all the source symbols A through J are assigned to leaves of a forward decoding tree shown FIG. 9A as well as leaves of a backward decoding tree shown in FIG. 9B.

Figure 10:
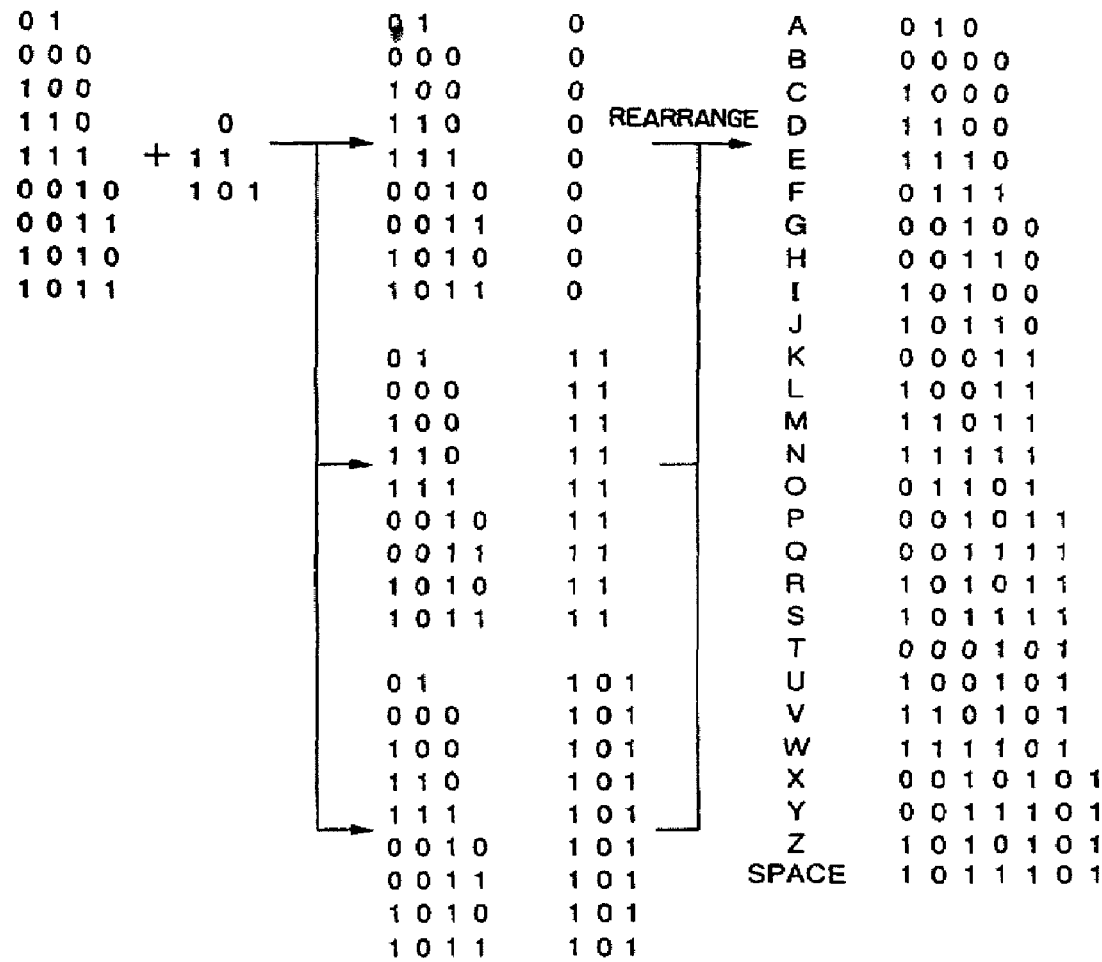
FIG. 10 is a diagram explaining a second code-word forming method in the code-word forming part of FIG. 7.

FIG. 10 shows a second method for forming code words of a reversible code in the code-word forming part 22. First, as shown on the left side of FIG. 10, first and second reversible codes are prepared. Then, as shown in the middle of FIG. 10, a first one code word of the second reversible code is added to each of the suffixes of all the code words of the first reversible code. Then, after all the code words of the second reversible code are added to the suffixes of all the code words of the first reversible code one by one, the code words are rearranged as shown on the right side of FIG. 10 to form a new reversible code. By such a forming method, it is possible to form A×B (27 in this embodiment) new reversible codes, the number of which is obtained by multiplying the number A (A=9 in this embodiment) of the code words of the first reversible code by the number B (B=3 in this embodiment) of the code words of the second reversible code.

When the reversible code is decoded in the forward direction by this forming method, the first reversible code is first decoded, and then, the second reversible code is decoded. When the reversible code is decoded in the backward direction, the second reversible code is first decoded, and then, the first reversible code is decoded. Therefore, the reversible code can be decoded both in the forward and backward directions.

Furthermore, in this embodiment, while the code words of the second reversible code have been added to the suffix of the code words of the first reversible code, the second reversible code may be added to the prefix of the first reversible code. Alternatively, fixed length codes may be added to both the suffix and prefix of the first reversible code. In addition, in this embodiment, while the first reversible code has been different from the second reversible code, both may be the same. Moreover, in this preferred embodiment, while variable length codes have been used as both of the first and second reversible codes, any one of the first and second reversible codes may be changed to a fixed length code.

FIG. 11 shows a third method for forming a reversible code in the code-word forming part 21. First, as shown on the left side of FIG. 11, variable-length reversible codes and fixed-length reversible codes are prepared. Then, as shown on the right side of FIG. 11, the fixed-length reversible codes are added immediately after the respective bits of the code words of the reversible codes. When K-bit fixed-length reversible codes are used by this forming method, H-bit code words can be changed to (K+1)H-bit code words to increase the number of code words by 2KH. In this embodiment, while the fixed length codes have been added immediately after the respective bits of the code words of the reversible codes, fixed length codes may be added immediately before the respective bits, or fixed length codes may be added both immediately before and after the respective bits.

Referring to FIGS. 12A and 12B, examples of methods for setting synchronization intervals of coded data in the synchronization interval setting part 104 will be described below.

FIG. 12A shows a method for setting synchronization intervals by inserting synchronization patterns. In this case, the synchronization interval detecting part 106 can detect the synchronization intervals by detecting the first and last synchronization patterns of coded data. In order to set positions, at which synchronization patterns can be inserted, at predetermined intervals (every M-bit unit in this case), 1-bit to M-bit stuffing codes are inserted into the suffixes of the coded data.

FIG. 12B shows a method for describing the coding amount of the synchronization interval on the prefix of the coded data, i.e., a method for inserting a pointer indicative of the end position of the synchronization interval. In this case, the synchronization interval detecting part 106 can detect the synchronization interval by decoding the description of the coding amount of the synchronization interval at the prefix of the coded data. Since the unit of description of the coding amount is a M-bit unit, 1-bit to M-bit stuffing codes are inserted into the suffix of the coded data.

The stuffing codes used for the methods of FIGS. 12A and 12B can be decoded at least in the backward direction. FIG. 13 shows an example of such a stuffing code. This stuffing code can be decoded both in the forward and backward directions. This stuffing code is a variable length code, the delimiter of which can be identified if "1" appears in the case of 1 bit and if "0"s appear twice in the case of other bits, and which can be decoded both in the forward and backward directions. This stuffing code can be also decoded from the end of the synchronization interval in the backward direction, and the bit number of the coded data can be calculated. The calculated result of the bit number of the coded data is used for an error detection, which will be described later.

While the stuffing code has been inserted into the suffix of the coded data in this embodiment, the stuffing code may be inserted into the prefix or the internal portion of the coded data. The stuffing code may be inserted into a portion in the synchronization interval at any positions if there is no problem of syntax. Alternatively, the stuffing code may be a code capable of being decoded only in the backward direction as shown in FIG. 14. The delimiter of this code can be identified if "0" appears when being decoded in the backward direction.

Referring to FIGS. 15A through 15D, a method for determining a decoded value in the decoded-value determining part 110 will be described below.

Figure 15A:
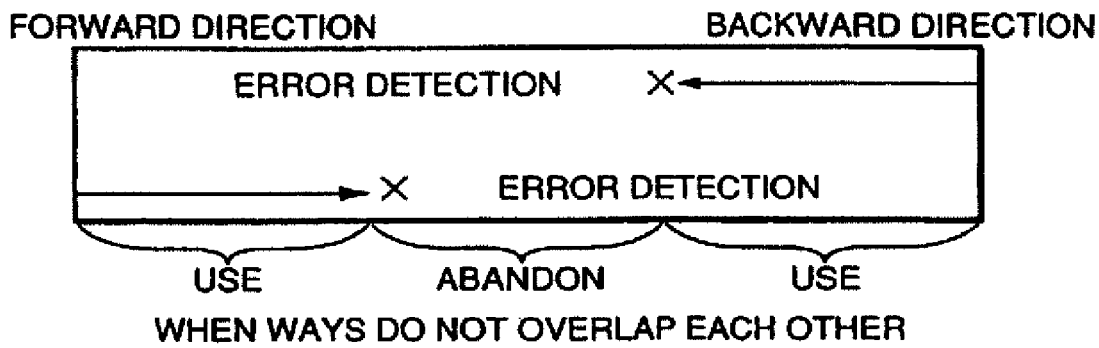
FIGS. 15A through 15D are diagrams explaining the operation of a decoded-value determining part of FIG. 7.
Figure 15B:
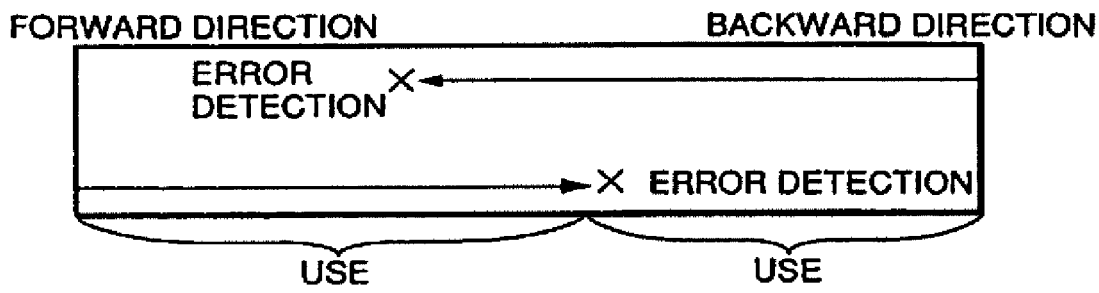

As shown in FIG. 15A, when the ways to the positions of the decoded word (error detected positions), at which errors are detected, in the forward and backward decoded results, do not overlap with each other, only the decoded results, in which the errors are not detected, are used for decoded values, and the decoded results at the two error detected positions are abandoned. As shown in FIG. 15B, when the ways to the error detected positions in the forward and backward decoded results overlaps with each other, the forward decoded results are used for decoded values before the error detected position in the forward decoded results, and the backward decoded results are used for decoded values after the error detected position in the forward decoded results. Alternatively, the backward decoded results may be preferentially used for decoded values before the error detected position in the backward decoded result, and the forward decoded results may be used for decoded values after the error detected position in the backward decoded result.

Figure 15C:
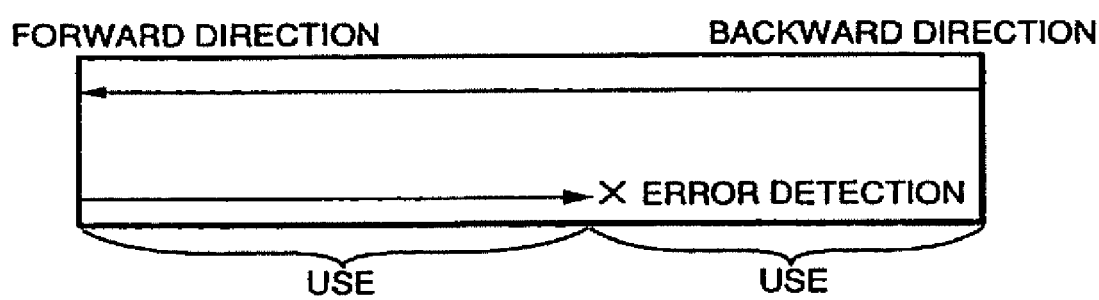
Figure 15D:
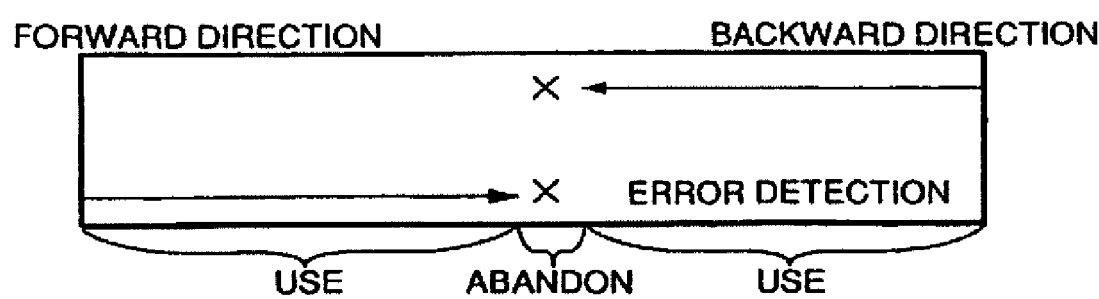

As shown in FIG. 15C, when an error is detected in only one of the forward and backward decoded results (an error is detected only in the forward decoded result in the shown embodiment), the decoded values in the forward decoded result are used before the error detected position, and the decoded values in the backward decoded result are used after the error detected position. As shown in FIG. 15D, when errors are detected in the same code word both in the forward and backward decoded results, the decoded value for the code word at the error detected position is abandoned, and the decoded values in the backward decoded result are used for the code words after the error detected position. When the error determination is carried out in the forward decoder 108 and the backward decoder 109, if a bit pattern, which does not exist as a code word, appears, the position of the bit pattern is regarded as the decoded position. When no error is detected in the above determining method and when the decoded bit number is not coincident with the bit number of the coded data in the synchronization interval, the first position in decoding is regarded as the error detected position.

In this first preferred embodiment, while one example of a decoded-value determining method using four patterns of error detected positions has been described, the decoded-value determining part may use any methods, if the forward or backward decoded result presumed to be correct is used and a portion, which has not been detected both in the decoded results, is abandoned, when errors are detected in both or any one of the forward and backward detected results.

Second Preferred Embodiment

As the second preferred embodiment of the present invention, an applied example of a variable length coding and/or decoding system according to the present invention will be described below.

Figure 16:
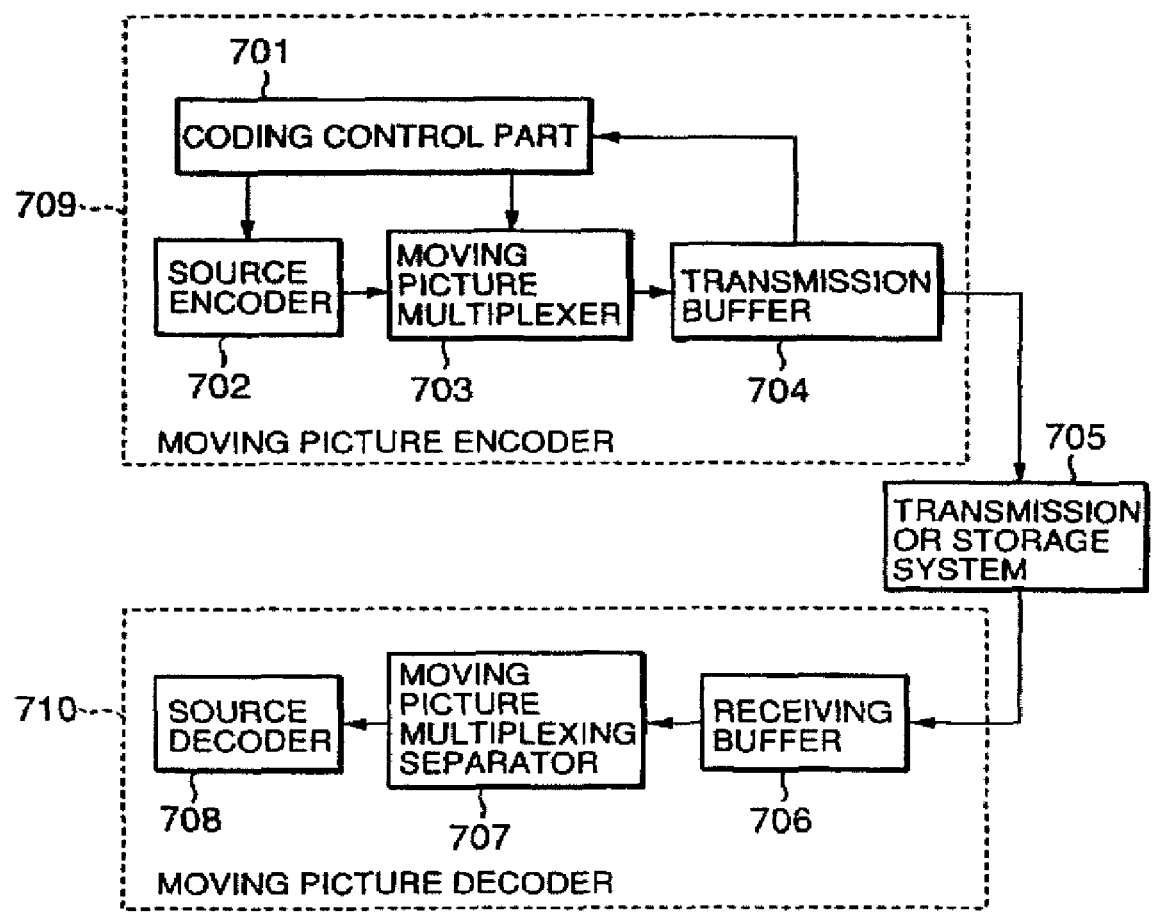
FIG. 16 is a schematic block diagram of the second preferred embodiment of a moving-picture coding and/or decoding system according to the present invention.

FIG. 16 is a block diagram showing the concept of a moving picture coding and/or decoding system, which incorporates the second preferred embodiment of a variable length coding and/or decoding system according to the present invention. First, in a moving picture encoder 709, the variable length coding, multiplexing and so forth of data coded by a source encoder 702 are carried out by means of a moving picture multiplexer 703. Then, the resulting data are smoothed by means of a transmission buffer 704 to be transmitted to a transmission or storage system 705 as coded data. A coding control part 701 controls the source encoder 702 and the moving picture multiplexer 703 in view of the buffer capacity of the transmission buffer 704.

On the other hand, in a moving picture 710, the coded data transmitted from the transmission or storage system 705 are stored in a receiving buffer 706. Then, the multiplexing separation and variable length decoding of the coded data are carried out by means of a moving picture multiplexing separator 707 to be transmitted to a source decoder 708, in which the moving picture information is finally decoded. To the moving picture multiplexer 703 and he moving picture multiplexing separator 707, the first preferred embodiment of a variable length coding and/or decoding system according to the present invention is applied.

Figure 17A:
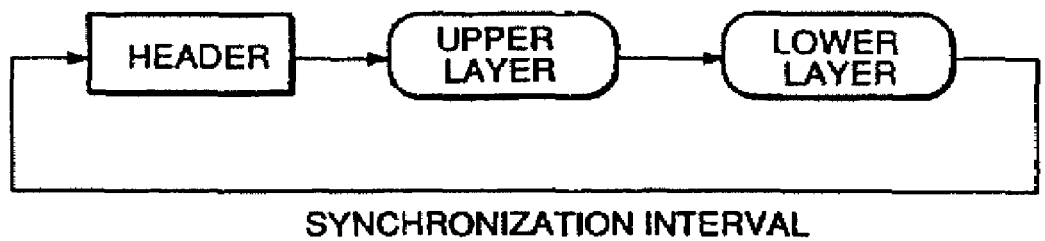
FIGS. 17A through 17C are diagrams, each illustrating a syntax of a coded data in the second preferred embodiment of a moving-picture coding and/or decoding system according to the present invention.
Figure 17B:
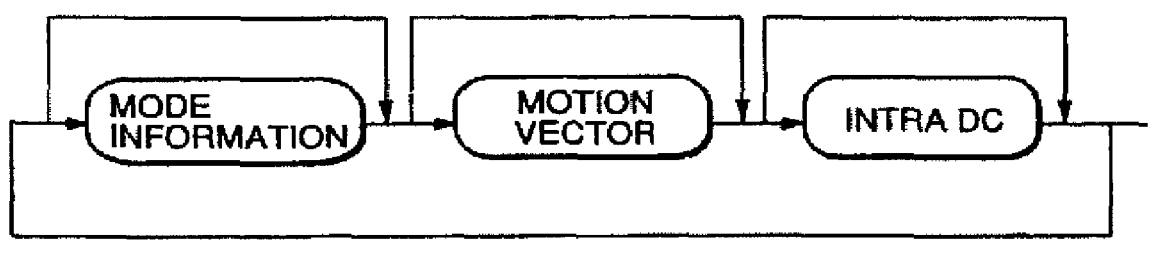
Figure 17C:
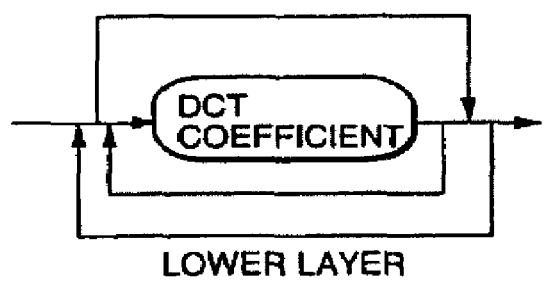

FIGS. 17A through 17C shows syntax of a moving picture coding system in the moving picture multiplexer 703 and the moving picture multiplexing separator 707 in the second preferred embodiment. The mode information, motion vector information and INTRA DC (DC components of DCT coefficients in intraframe coding) information of macro blocks are applied to an upper layer, and DCT coefficient information except for the INTRA DC is applied to a lower layer. Reversible codes are applied to the lower layer.

Figure 18A:
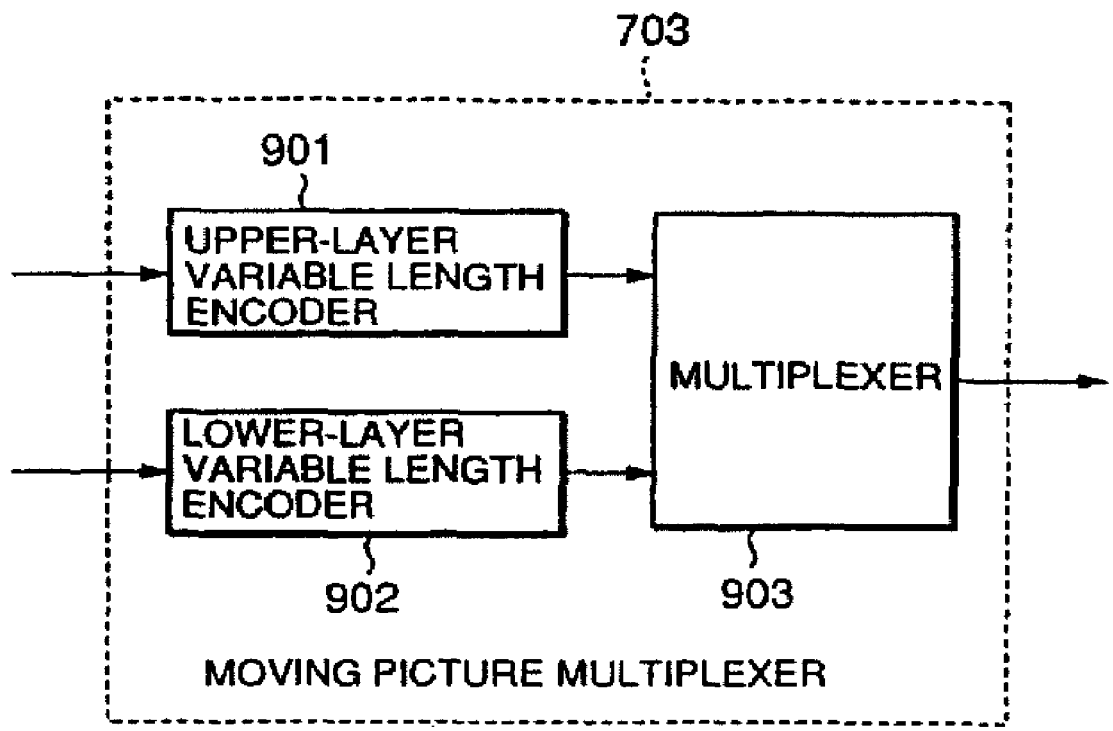
FIG. 18A is a block diagram of a moving-picture multiplexing part of FIG. 16.
Figure 18B:
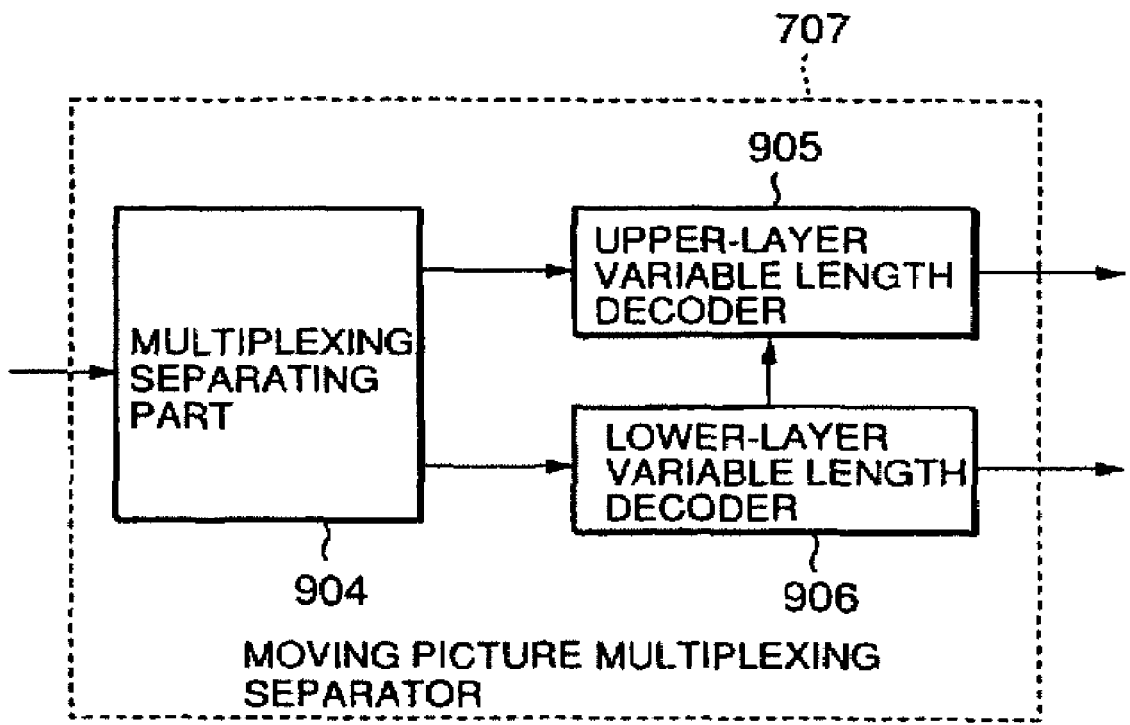
FIG. 18B is a block diagram of a moving-picture multiplex dividing part.

FIGS. 18A and 18B are block diagrams illustrating the moving picture multiplexer 703 and the moving picture multiplexing separator 707 in the second preferred embodiment. In the moving picture multiplexer 703 shown in FIG. 18A, out of the data coded by the source encoder 702 of FIG. 16, the mode information, motion vector information and INTRA DC information of macro blocks are applied to an upper layer, and the usual variable length coding is carried out by means of an upper-layer variable length encoder 901 to be transmitted to a multiplexer 903. Out of the data coded by the source encoder 702, DCT coefficients other than the INTRA DC are coded by means of reversible codes in a lower-layer variable length encoder 902 to be transmitted to the multiplexer 903. In the multiplexer 903, the coded data of the upper and lower layers are multiplexed to be transmitted to a transmission buffer 704.

On the other hand, in the moving picture multiplexing separator decoder 707 shown in FIG. 18B, the coded data of the upper and lower layers are separated by means of a multiplexing separating part 904 to be variable-length decoded by means of an upper-layer variable length decoder 905 and a lower-layer variable length decoder 906, respectively.

FIGS. 19 through 21 and 22 through 23 show examples of code-word tables used for the lower-layer variable length encoder 902. The codes stored in these code tables are obtained by adding 2-bit fixed-length codes to the suffix of each of the codes prepared by the first forming method for the code words of the reversible code in the code-word forming part 22.

In the source encoder 702, the interior of blocks is scanned every block of 8×8 DCT coefficients after quantization to derive LASTs (0: non-zero coefficients, each of which is not the last of the block, 1: non-zero coefficients of the last of the block), RUNs (the numbers of zero runs before the non-zero coefficients) and LEVELs (quantized values of the coefficients), which are transmitted to the moving picture multiplexing part 703.

The lower-layer variable length encoder 902 in the moving picture multiplexing part 703 has a code-word table of non-LAST coefficients shown in FIGS. 19 through 21, wherein the code words of reversible codes (VLC_CODE) correspond to the non-LAST coefficients, RUNs and LEVELs of the INTRA (intraframe coding) and INTER (interframe coding), and a code-word table of LAST coefficients shown in FIGS. 22 and 23, wherein the code words of the reversible codes (VLC_CODE) correspond to the LAST coefficients, RUNs and LEVELs of the INTRA and INTER.

On the basis of the mode information, one of the code-word tables of the non-LAST coefficients and LAST coefficients of the INTRA is selected when the INTRA is carried out, and one of the code-word tables of the non-LAST coefficient and LAST coefficients of the INTER is selected when the INTER is carried out, so that coding is carried out. The last bit "s" of the code word denotes the sign of the LEVEL. When the "s" is "0", the sign of the LEVEL is positive, and when the "s" is "1", the sign of the LEVEL is negative.

Figures 24, 25:
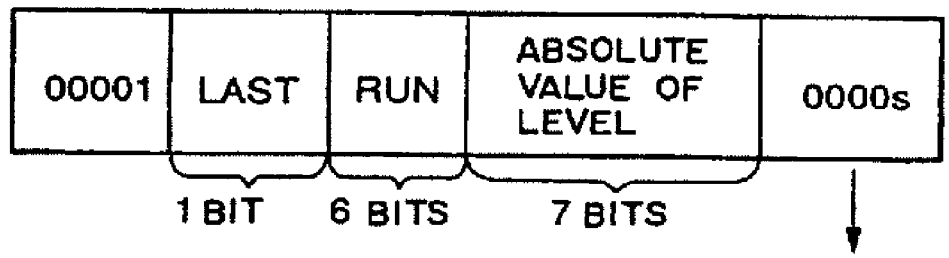
FIG. 24 is a code-word table of escape codes in the second preferred embodiment.
FIG. 25 is a diagram illustrating a coding system of code words, which are not contained in the code-word table in the second preferred embodiment.

With respect to coefficients, which do not exist in these code-word tables, 1 bit indicative of the LAST coefficient, the RUN and the absolute value of the LEVEL are fixed-length coded as shown in FIG. 25. In addition, the "00001" of two escape codes is added to the prefix of the fixed length code, and an escape code is also added to the suffix thereof. FIG. 24 shows a code-word table of escape codes. The last bit "s" of the VLC_CODE used as an ESCAPE code denotes the sign of the LEVEL. When the "s" is "0", the LEVEL is positive, and when the "s" is "1", the LEVEL is negative.

Figure 26:
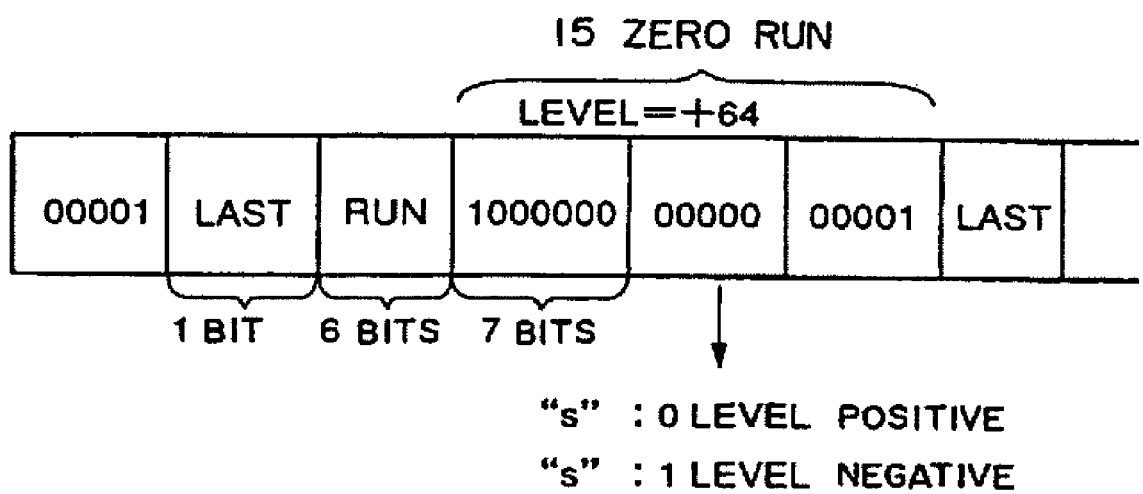
FIG. 26 is a diagram showing the maximum zero run in a code configuration in the second preferred embodiment.

FIG. 26 shows the case that the zero run is maximum when this code-word table is used. Usually, a bit pattern, wherein "1" is added after zero runs continue, is selected as a synchronization pattern. For example, in the case of ITU-T H.263, a bit pattern, wherein "1" is added after 16 "0"s, is selected as a synchronization pattern. In the variable-length coding of the DCT coefficients, the zero run is maximum when 15 "0"s continue in a case where the LEVEL is +64 in the coefficient using an escape code and the next code also uses an escape code. Therefore, if a bit pattern, in which 16 "0"s continue, is used as a synchronization pattern, there is no possibility that a pseudo synchronization pattern may be produced.

The decoded-value determining part 110 determines a decoded value on the basis of the decoded result (hereinafter referred to as a "forward decoded result") obtained by the forward decoder 108 and the decoded result (hereinafter referred to as a "backward decoded result") obtained by the backward decoder 109 to output a final decoded result. In the error determinations in the forward decoder 108 and the backward decoder 109, when a bit pattern, which does not exist as a code word, appears and when an error is detected by a check bit or the like, the position of the bit pattern or the error is used as the detected position, and when no error is not detected by the above determining method and when the decoded bit number is not coincident with the bit number of the coded data in the synchronization interval, the first position of decoding is used as the error detected position.

Figure 27:
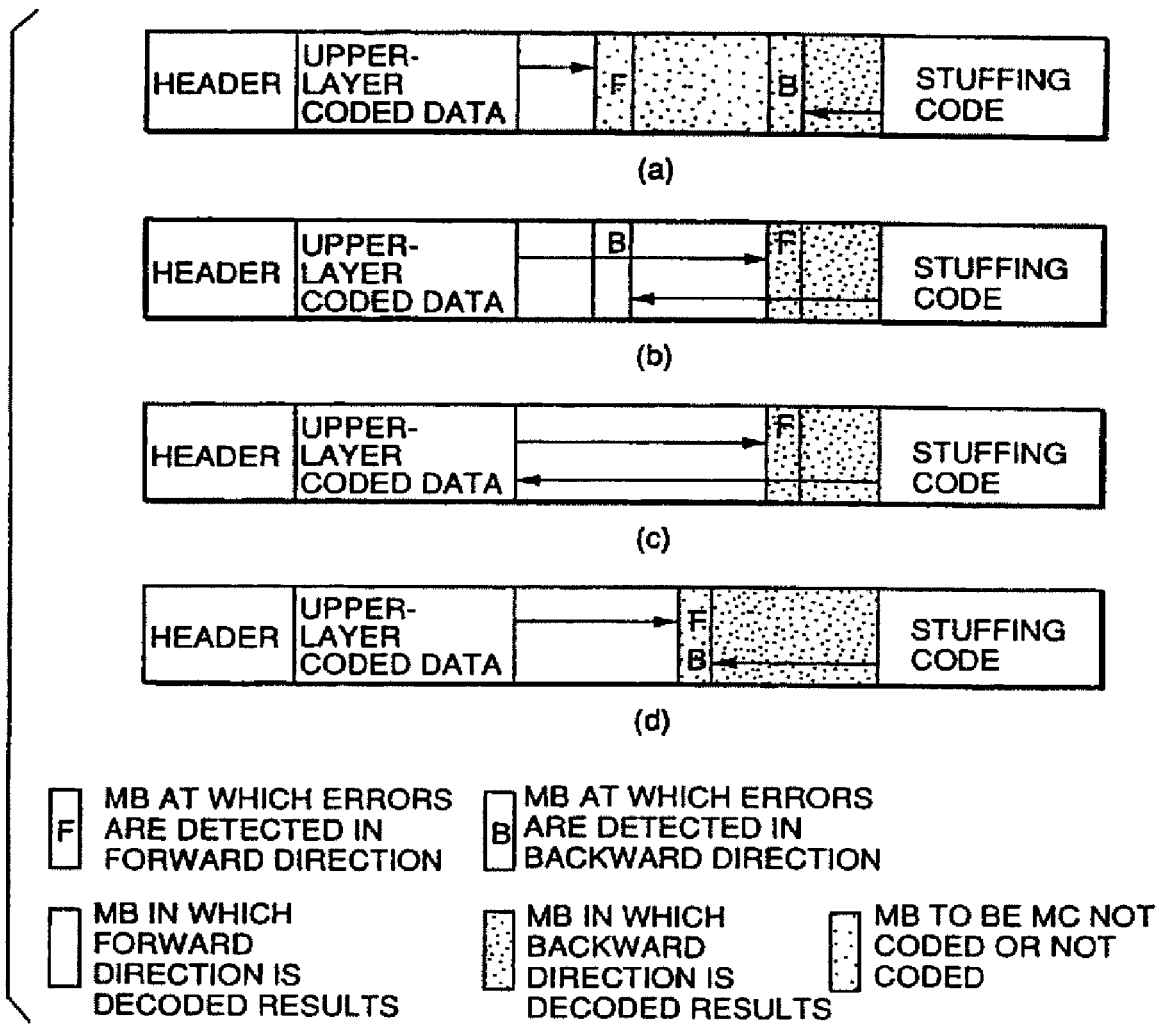
FIGS. 27(a) through 27(d) are diagrams illustrating the operation of a decoded-value determining part in the second preferred embodiment.

FIG. 27 shows a method for determining a decoded value in the lower layer. First, as shown in FIG. 27(a), when the ways to the positions (the error detected positions) of macro blocks (MB), at which errors are detected in the forward and backward decoded results, do not overlap with each other, only the decoded results of the macro blocks, in which no error is not detected, are used for decoded values, and the decoded results at two error detected positions are not used for decoded values. In addition, the decoded results of the upper layer are rewritten on the basis of the decoded results of the mode information of the upper layer so that the INTRA macro blocks (intraframe coded macro blocks) are displayed using the last frame and the INTER macro blocks (interframe coded macro blocks) are displayed only by the motion compensation using the last frame.

As shown in FIG. 27(b), when the ways to error detected positions in the forward and backward decoded results overlap with each other, the forward decoded results before a macro block, in which an error is detected as a result of the forward decoding, are used for decoded values, and the backward decoded results are used for decoded values after the macro block. Alternatively, the backward decoded results may be preferentially used for decoded results after a macro block, in which an error is detected as a result of the backward decoding, and the forward decoded results may be used for decoded values before the macro block.

As shown in FIG. 27(c), when an error is detected in only one of the forward and backward decoded results (an error is detected only in the forward decoded result in the shown embodiment), the backward decoded results are used for decoded values with respect to the macro blocks after the error detected position.

As shown in FIG. 27(d), when errors are detected at the same macro block both in the forward and backward decoded results, the decoded values of the macro block at the error detected position are abandoned so as not to be used as decoded values. In addition, the decoded results of the upper layer are rewritten on the basis of the decoded results of the mode information of the upper layer so that INTRA macro blocks are displayed using the last frame and the INTER macro blocks are displayed only by the motion compensation using the last frame. The backward decoded results are used for decoded values with respect to the macro block after the error detected position.

While the decoded values has been determined every macro block in the decoded-value determining method of FIG. 27, the decoded values may be determined every block or code word. In the second preferred embodiment, while the present invention has been applied to the variable-length coding of the DCT coefficients, the invention may be applied to other source symbols when the variable-length coding is carried out.

Third Preferred Embodiment

Figure 28:
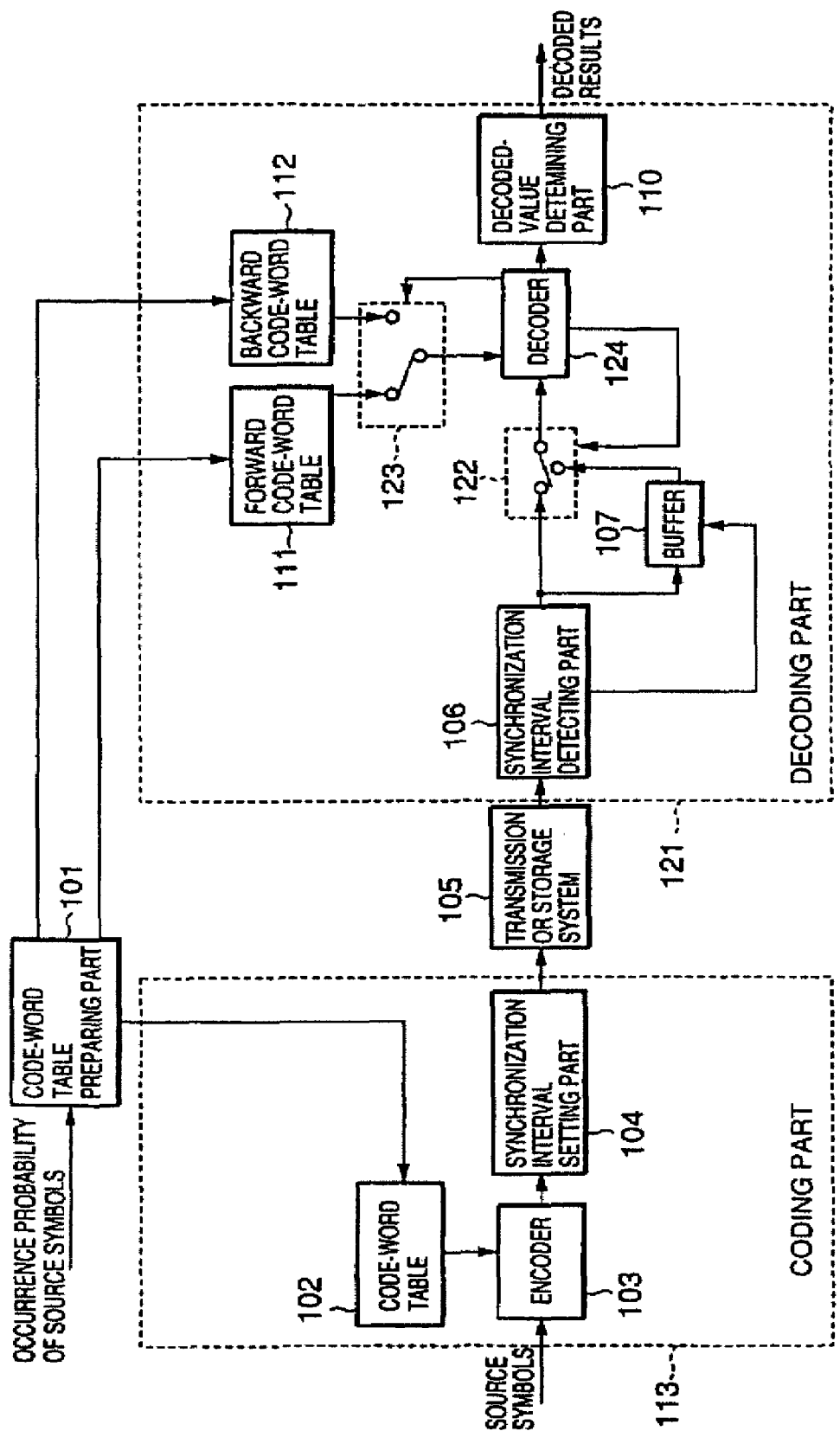
FIG. 28 is a block diagram of the third preferred embodiment of a variable length coding and/or decoding system according to the present invention.

Referring to FIG. 28, the third preferred embodiment of a variable length coding and/or decoding system, according to the present invention, will be described below.

In this third preferred embodiment, the variable length coding and/or decoding system generally comprises a code-word table preparing part 101, a coding part 113, a transmission or storage system 105 and a decoding part 121. First, the functions of the respective parts will be briefly described. The code-word table preparing part 101 prepares a code-word table on the basis of the occurrence probability of source symbols, and transmits code words to a code-word table 102 in the coding part 113 and to forward and backward code-word tables 111 and 112 in the decoding part 121. The coding part 113 encodes the source symbol to a variable length code, and outputs the variable length code to the transmission or storage system 105 as coded data. The decoding part 121 decodes the coded data inputted via the transmission or storage system 105 to reproduce the original source symbol.

The detailed constructions and operations of the respective parts in the third preferred embodiment will be described below.

The construction and operation of the coding part 113 are the same as those in the first preferred embodiment shown in FIG. 6. That is, in the coding part 113, inputted source symbols are inputted to an encoder 103. The code-word table 102 stores therein source symbols prepared by the code-word table preparing part 101 and code words of variable length codes so that the source symbols correspond to the code words. The encoder 103 selects code words corresponding to the inputted source symbols from the code words stored in the code-word table 102. In a synchronization interval setting part 104, the code words selected by the encoder 103 are grouped every synchronization interval, and stuffing bits capable of being decoded both in forward and backward directions are inserted into the code words to output coded data every synchronization interval. The coded data are transmitted to the decoding part 121 via the transmission or storage system 105.

The decoding part 121 comprises a synchronization interval detecting part 106, a buffer 107, a coded data switch 122, a decoder 124, a code-word table switch 125, a decoded-value determining part 110, a forward decoding table 111 and a backward decoding table 112. The coded data switch 122 and the code-word table switch 125 are controlled by the decoder 124 to be switched. In the decoding part 121, while the synchronization interval detecting part 106 inspects the synchronization interval of the coded data inputted by the transmission or storage systems 105, the coded data are inputted to the decoder 124. At this time, the coded data are also stored in the buffer 107. The decoder 124 starts to decode the inputted coded data (hereinafter referred to as "forward decoding"). The decoder 124 determines that an error is detected, when a bit pattern, which does not exist in the forward code-word table 111, appears and when coded data having a bit number different from the bit number of the buffer 107 is decoded.

When it is determined that an error has been detected, the decoder 124 switches the code-word table in the code-word table switch 123 from the forward code-word table 111 to the backward code-word table 112. At this time, the input to the decoder 124 is switched to the buffer 107 by means of the coded data switch 122. When the synchronization interval detecting part 106 detects the next synchronization, the stored coded data are read out of the buffer 107 from the suffix to be outputted to the decoder 124. The decoder 124 starts to decode the inputted coded data (hereinafter referred to as "backward decoding"). Similar to the forward decoding, the decoder 124 determines that an error is detected, when a bit pattern, which does not exist in the backward code-word table 112, appears in the coded data or when coded data having a bit number different from the bit number of the buffer 107 are decoded. The decoded-value determining part 110 determines decoded values on the basis of a decoded result (hereinafter referred to as a "forward decoded results") obtained by the forward decoding and a decoded result (hereinafter referred to as a "backward decoded results") obtained by the backward decoding to output a final decoded result.

In the third preferred embodiment, the coded-word table preparing part 101 is basically the same as that in the first preferred embodiment. As shown in FIG. 7, the code-word table preparing part 101 inputs information on the occurrence probability of source symbols, and comprises a code-word selecting part 21 for selecting a code system having a least average code length from selectable code systems, and a code-word forming part 22 for forming code words of a code selected by the code-word selecting part 21. In this preferred embodiment, the following method for forming code words in the code-word forming part 22 is used in order to increase the degree of freedom for a bit pattern of code words so as to correspond to a wider probability distribution.

Figure 29:
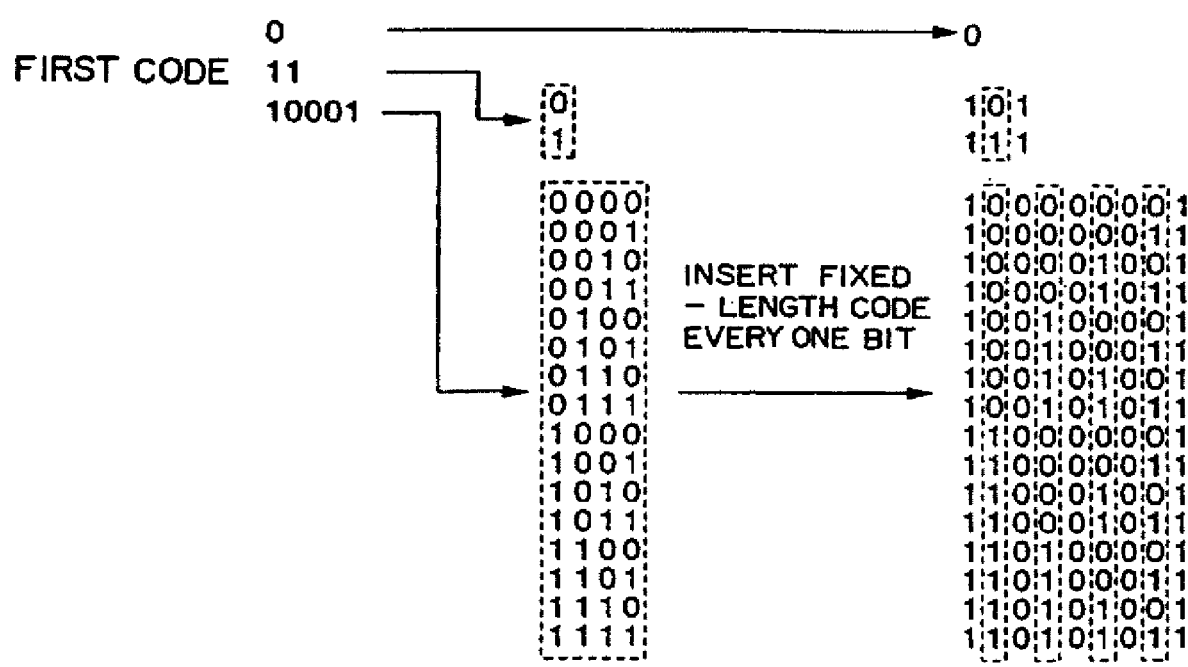
FIG. 29 is a diagram explaining a first code-word forming method in a code-word forming part of FIG. 28.

FIG. 29 shows a first method for forming code words of a reversible code in the code-word forming part 22. First, as shown on the left side of FIG. 29, a first reversible code is prepared. Then, as shown in the middle of FIG. 29, fixed length codes of (code length−1) bits surrounded by the broken line are prepared for the respective code words of the first reversible code, and as shown on the right side of FIG. 29, the code words of the fixed length codes are inserted between the respective bits of the code words of the first reversible code 1 bit by 1 bit so as to be surrounded by the broken line. It can be seen that the variable length codes of FIG. 29 can be decoded both in the forward and backward directions by decoding the fixed length codes every 1 bit while decoding the first reversible code. In the embodiment of FIG. 29, while the code words of the fixed length codes have been inserted between the respective bits of the code words of the first reversible code 1 bit by 1 bit, fixed length codes of (code length−1)×n bits may be prepared for the respective code words of the first reversible code, and the code words of the fixed length codes may be added between the respective bits of the code words of the first reversible code n bits by n bits.

FIG. 30 shows a second method for forming code words of a reversible code in the code-word forming part 22. As shown on the left side of FIG. 30, a first reversible code is prepared. Then, as shown on the upper side of FIG. 30 so as to be surrounded by the broken line, a second reversible code is prepared, and as shown on the right side of FIG. 30, the second reversible code is inserted between the respective bits of the code words of the first reversible code so as to be surrounded by the broken line. It can be seen that the variable length codes of FIG. 30 can be decoded both in the forward and backward directions by decoding the second reversible code 1 bit by 1 bit while decoding the first reversible code. In the embodiment of FIG. 30, while the first and second reversible codes have been the same, these codes may be different.

Figure 31:
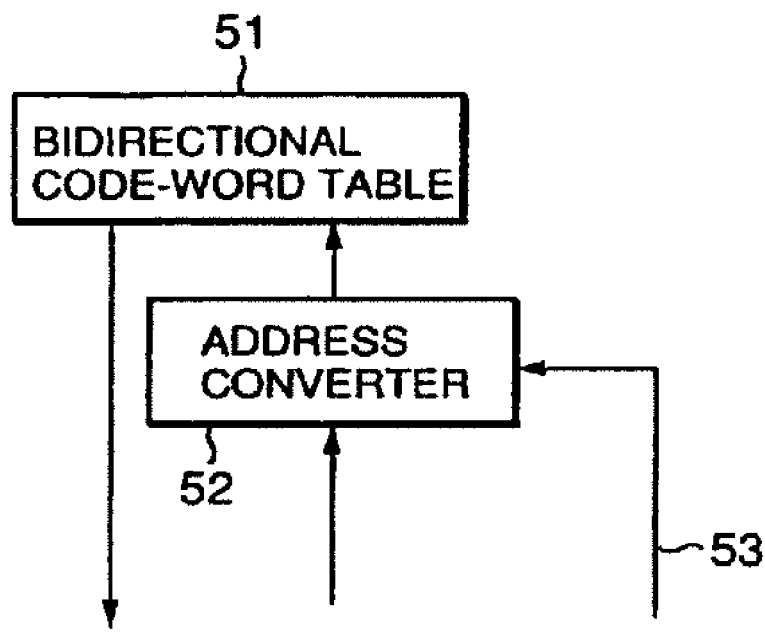
FIG. 31 is a diagram of a bidirectional code-word table, which is common to a forward code-word table and a backward code word table.

In the third preferred embodiment, as shown in FIG. 31, a bidirectional code-word table 51 may be used as a common table in place of the forward code-word table 111 and the backward code-word table 112 shown in FIG. 28. In this case, an identification signal 53 indicative of the discrimination between the forward coding and the backward coding is inputted from the decoder 124 of FIG. 28, and an address converter 52 is operated by the identification signal 53 to produce an address for reading code words out of the bidirectional code-word table 51. Then, the code value corresponding to this address is read out of the bidirectional code-word table 51.

Figure 32:
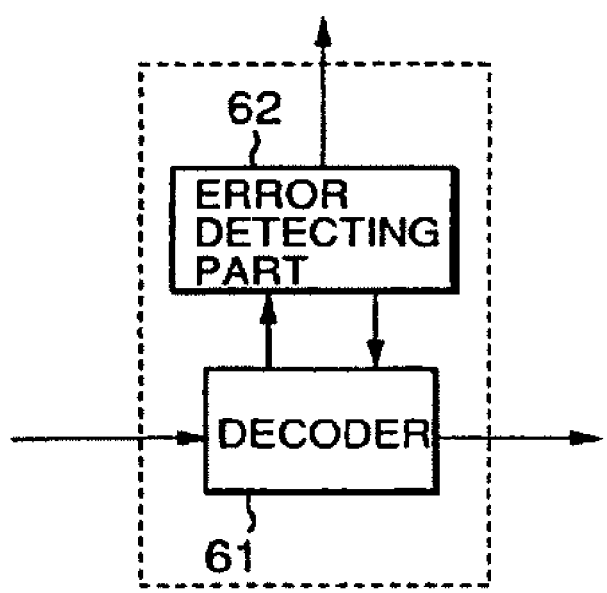
FIG. 32 is a block diagram of a decoder, to which a detection part is added.

In the third preferred embodiment, as shown in FIG. 32, the decoder 124 has an error detection function. An error detecting part 62 connected to a decoder 61 monitors the inside state of the decoder 61, and outputs an error detection signal when it is abnormal. For example, the abnormal inside states include the following states:

(1) when a coded data, which does not exist in the code-word table, is received;
(2) when the length of the coded data is not coincident with the length of the code actually decoded by the decoder 61;
(3) when the decoded value is inadequate although the decoded value can be derived since it exists in the code-word table, specifically, (3-1) when the decoded value is beyond the range of existence, (3-2) when the number of data exceeds the upper limit, and (3-3) when a decoded value, which does not match with the previously decoded value, is outputted; and
(4) when an error has been detected by an error detection code or the like.

Figure 33:
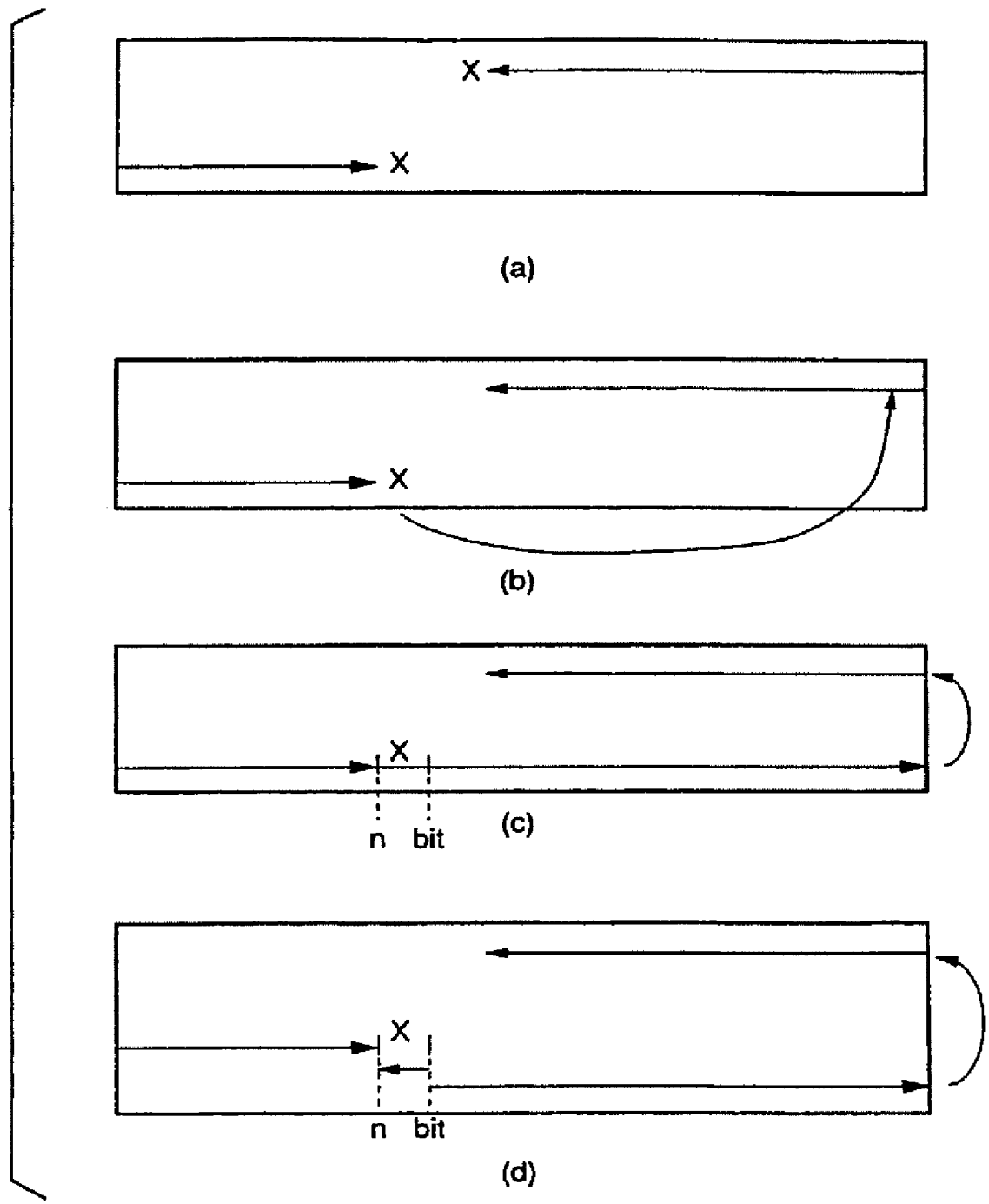
FIGS. 33(a) through 33(d) are diagrams explaining a decoding method in the third preferred embodiment.

Referring to FIG. 33, a decoding method in the third preferred embodiment will be described below.

In the preceding preferred embodiments, as shown in FIG. 33(a), the forward and backward decoding processes in the decoder 124 have been simultaneously carried out until errors are detected in the respective processes, to derive decoded values. The third preferred embodiment should not be limited thereto, but decoding may be carried out by the methods shown in FIGS. 33(b), 33(c) and 33(d). In FIGS. 33(b), 33(c) and 33(d), X denotes error detected points, the arrow to the right denotes the forward decoding process, and the arrow to the left denotes the backward decoding process.

In the method shown in FIG. 33(b), the forward decoding process is carried out, and when an error is detected, the forward decoding process is stopped and the backward decoding process is carried out in the backward direction from the suffix of the coded data in the synchronization interval until an error is detected. In the method shown in FIG. 33(c), when an error is detected in the forward decoding process, the forward decoding process is resumed after n bits from the error detected position. This process is repeated until all the coded data in the present synchronization interval are processed. At the last of the forward decoding process, when the number of the coded data in the synchronization interval is not coincident with the number of data decoded by the decoding process, it is determined that an error is detected, and the backward decoding process is carried out from the suffix of the coded data until an error is detected. In the method shown in FIG. 33(d), when an error is detected in the forward decoding process, the backward decoding process is carried out by n bits in the backward direction from n bits after the error detected position. Thereafter, the forward decoding process is carried out after n bits from the error detected position, i.e., the forward decoding process is carried out from a position, at which the backward decoding process has been started. This process is repeated until all the coded data in the present synchronization interval are processed. Finally, if the number of the coded data in the synchronization interval is not coincident with the number of data decoded by the decoding process, it is determined that an error is detected, and the backward decoding process is carried out from the suffix of the coded data until an error is detected.

Figure 34:
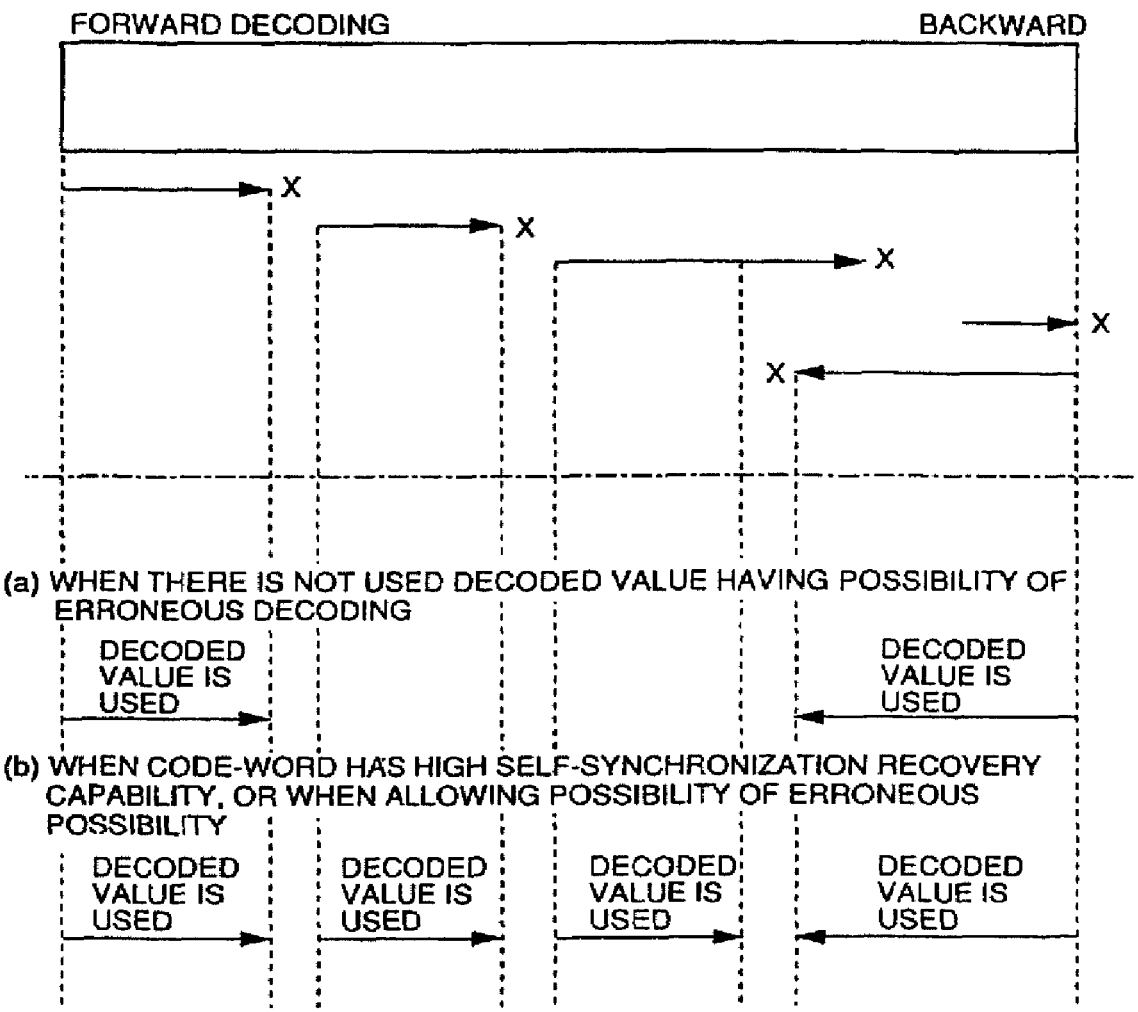
FIG. 34 is a diagram explaining a decoded-value determining method in a decoded-value determining part in the third preferred embodiment.

Referring to FIG. 34, a method for determining decoded values in the decoded-value determining part 111 in the third preferred embodiment will be described below. The decoded values finally utilized in the decoded-value determining part 111 can be selected by the following methods.

In the decoded-value determining method shown in FIG. 34(a), after an error is detected, decoding is not carried out. That is, since there is a possibility that erroneous decoding may be carried out after an error is detected, the decoded values, which may cause erroneous decoding, are not utilized, and only the decoded values before the error detected position are utilized.

In the decoded-value determining method shown in FIG. 34(b), even if an error is detected, decoding is continued to utilize all the usable decoded values. Variable length codes include a code, in which synchronization can be automatically recovered if the decoding process is continuously carried out even if the synchronization is not broken. This is called "self-synchronization-recovery. In the case of a code word having a high self-synchronization-recovery capability, it is possible to obtain a greater amount of correct decoded values by continuing the decoding process as shown in FIG. 34(b) without stopping the decoding process as shown in FIG. 34(a) after the error is detected. However, in this case, there is a possibility that the decoded values may include erroneously decoded values. In the system for allowing such a possibility of erroneous decoding, the decoded-value determining method of FIG. 34(b) may be used.

Fourth Preferred Embodiment

Figure 35:
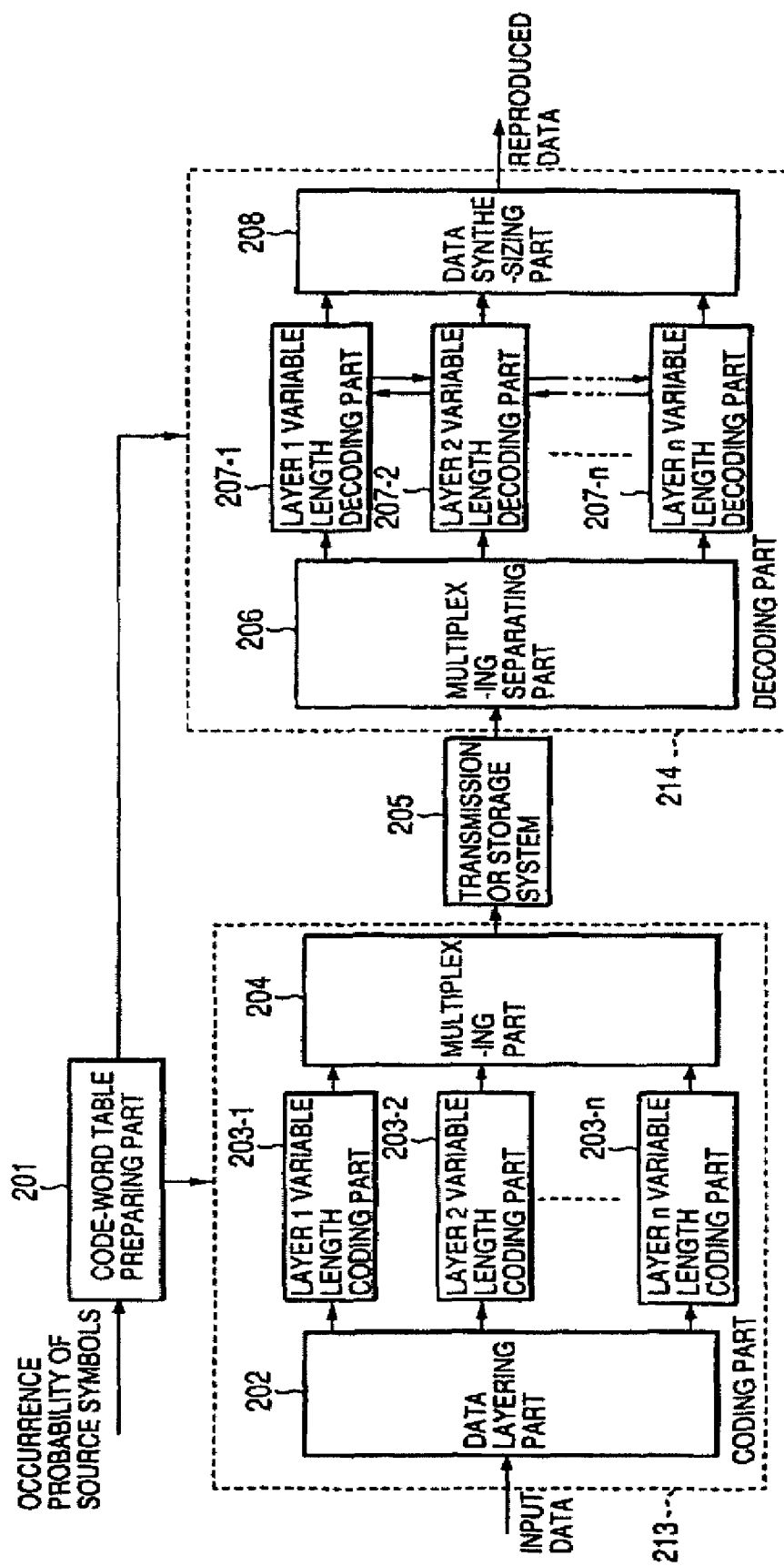
FIG. 35 is a block diagram of the fourth preferred embodiment of a variable length coding and/or decoding system according to the present invention.

Referring to FIG. 35, the fourth preferred embodiment of a variable length coding and/or decoding system, according to the present invention, will be described below.

In the fourth preferred embodiment, the variable length coding and/or decoding system generally comprises a code-word table preparing part 201, a coding part 213, a transmission or storage system 205 and a decoding part 214. First, the functions of the respective parts will be briefly described.

The code-word table preparing part 201 prepares a code-word table on the basis of the occurrence probability of source symbols, to transmit code words to a code-word table in the coding part 213 and to forward and backward code-word tables in the decoding part 214.

The coding part 213 layers source symbols provided as input data, and encodes the input data every layer to variable length codes. Then, the coding part 213 multiplexes the variable length codes to output the multiplexed codes to the transmission or storage system 205. The decoding part 214 multiplexing-separates the coded data inputted via the transmission or storage system 205 to variable-length decode the resulting data every layer to synthesize decoded results every layer to reproduce the original source symbols to output reproduced data.

The detailed constructions and operations of the respective parts in the fourth preferred embodiment will be described below.

In the coding part 213, the source symbols being input data are divided, by means of a data layering part 202, into layers 1 through n (n is a natural number being not less than 2) in accordance with importance. The divided source symbols in the respective layers i (i=1, 2, . . . , n) are inputted to variable length coding parts 203-$i$ prepared every layer i to be coded. The coded data of the respective layers i obtained by the variable length coding parts 203-$i$ are multiplexed by means of a multiplexing part 204 to be transmitted to the decoding part 214 via the transmission or storage system 205.

In the decoding part 214, the coded data inputted by the transmission or storage system 205 are divided into coded data of the respective layers i by means of a multiplexing separating part 206. The divided coded data of the respective layers are inputted to variable length decoding parts 207-*i* prepared every layers i to be decoded. The decoded results of the respective layers i obtained by the variable length decoding parts 207-*i* are synthesized by means of a data synthesizing part 208 to be outputted as reproduced data.

The construction of the code-word table preparing part 201 is the same as that of the code-word table preparing part 101 in the first preferred embodiment shown in FIG. 7. The code-word table preparing part 201 selects a code system having a shortest average code length from selectable code systems on the basis of information on the occurrence probability of source symbols, to form code words of the selected code. The code words are variable length codes (reversible codes), which are formed so that the delimiters between codes can be identified by a predetermined weight of code words and which can be decoded both in forward and backward directions.

Figure 36:
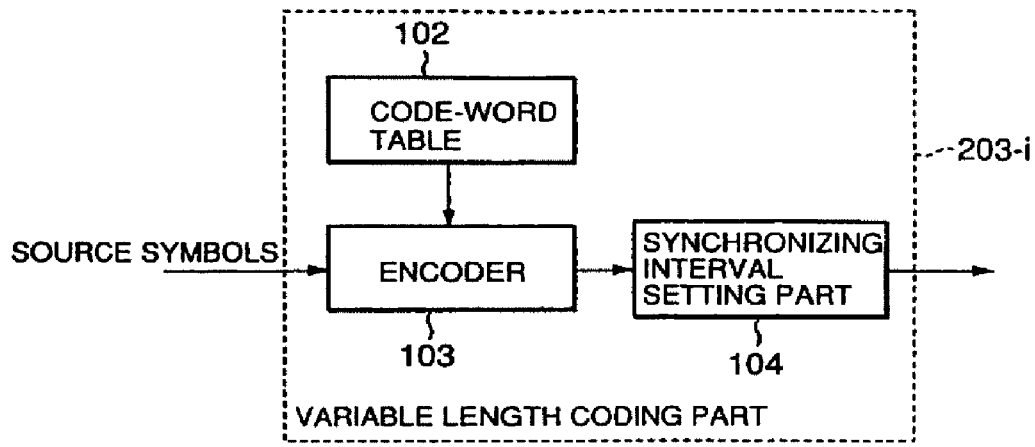
FIG. 36 is a block diagram of a variable length coding part of a hierarchy of FIG. 35.

The construction of each of the variable length coding parts 203-*i* of the respective layers i of FIG. 35 is shown in FIG. 36. Similar to the coding part 113 shown in FIG. 6, each of the variable length coding parts 203-*i* comprises a code-word table 102, an encoder 103 and a synchronization interval setting part 104. That is, the source symbols inputted from the data layering part 202 of FIG. 35 are inputted to the encoder 103. The code-word table 102 stores therein source symbols previously prepared by the code-word table preparing part of FIG. 35 and code words of variable length codes so that the source symbols correspond thereto.

The encoder 103 selects code words corresponding to the source symbols inputted by the data layering part 202, from the code words stored in the code-word table 102 to output the selected code words. The synchronization interval setting part 104 groups the code words selected by the encoder 103 every synchronization interval, and inserts stuffing codes, which can be decoded both in forward and backward directions, into the grouped code words if necessary, to output coded data every synchronization interval. The coded data are transmitted to the multiplexing part 204 of FIG. 35.

Figure 37:
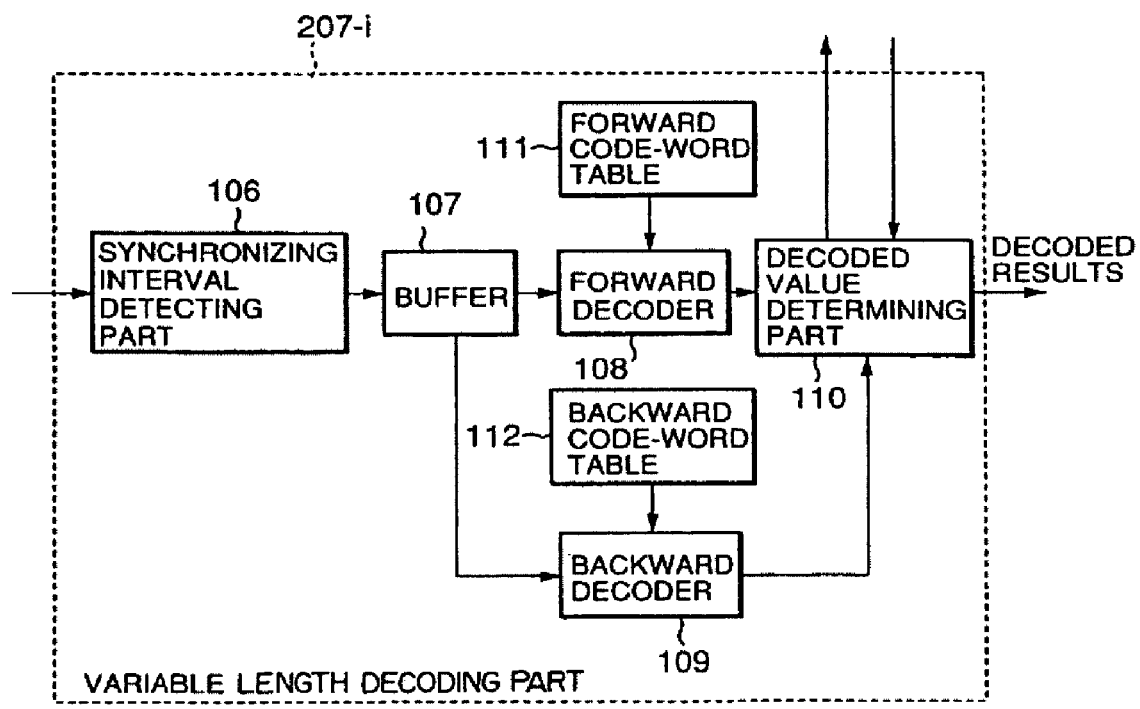
FIG. 37 is a block diagram of a variable length encoding part of a hierarchy of FIG. 35.

On the other hand, the construction of each of the variable length decoding parts 207-*i* of the respective layers i of FIG. 35 is shown in FIG. 37. Similar to the decoding part 114 shown in FIG. 6, each of the variable length decoding parts 207-*i* comprises a synchronization interval detecting part 106, a buffer 107, a forward decoder 108, a backward decoder 109, a decoded-value determining part 110, a forward decoding table 111 and a backward decoding table 112. That is, in the variable length decoding part 207-*i*, the synchronization intervals of the coded data inputted from the transmission or storage system 205 by the synchronization interval detecting part 106 and the coded data are stored in the buffer 107. The forward decoder 108 starts to decode the coded data stored in the buffer 107 from the prefix of the coded data. The backward decoder 109 starts to decode the coded data stored in the buffer 107 from the suffix of the coded data.

The forward decoder 108 determines that an error is detected, when a bit pattern, which does not exist in the forward code-word table 111, appears in the coded data or when the coded data having a bit number different from the bit number of the buffer 107 is decoded. Similarly, the backward decoder 109 determines that an error is detected, when a bit pattern, which does not exist in the backward code-word table 112, appears in the coded data or when the coded data having a bit number different from the bit number of the buffer 107 is decoded. The decoded-value determining part 110 determines decoded values on the basis of a decoded result (a forward decoded result) obtained by the forward decoder 108 and a decoded result (a backward decoded result) obtained by the backward decoder 109, to output a final decoded result. The decoded results of the respective layers i are transmitted to the data synthesizing part 208.

FIGS. 38A through 38C show examples of the data hierarchization in the data layering part 202 and the multiplexing in the multiplexing part 204. If there are input data (a source symbol string) of syntax, which can be divided into n layers as shown in FIG. 38A, the data layering part 202 changes the syntax to carry out the data hierarchization so that the input data are repeated every layer i as shown in FIG. 38B, and transmits the source symbols to the variable length coding part 203-*i* every layer i. In the multiplexing part 204, as shown in FIG. 38C, the source symbols are variable-length coded by the variable length coding part 203-*i* every layer i, and the coded data, in which the synchronization intervals are set by adding the synchronization pattern i, are multiplexed to be outputted.

FIG. 39 shows an example of a method for determining decoded values in the decoded-value determining part 110 of FIG. 37. In the variable length decoding part 207-*i* of the respective layer i, the bidirectional decoding is carried out. If there is an error in the decoded data inputted to the variable length decoding part of a certain layer, the error affects the decoded values of upper and lower layers than the certain layer. Therefore, the decoded-value determining part 110 in the variable length decoding part 207-*i* of the respective layer i exchanges information to determine the final decoded value.

In the embodiment of FIG. 39, if there is an undecodable portion in the upper layer due to an error, an undecodable portion is produced in the decoded data of the lower layer relating thereto. In addition, if there is an undecodable portion in the coded data of the lower layer due to an error, the decoded values of the coded data of the upper layer corresponding thereto are changed. FIG. 39 merely shows one example of a decoded-value determining method. Therefore, it is possible to utilize any methods, wherein the decoded-value determining part 110 in the variable length decoding part 207-*i* of each of the layers i uses a decoded result, which is presumed to be correct, of the forward and backward decoded results when an error is detected in at least one of the forward and backward decoded results using the decoded results of the upper and lower layers, and wherein the decoded result of a portion, which could not have been decoded both in the forward and backward decoding processes, is abandoned. In the fourth preferred embodiment, while the reversible codes have been used both in the forward and backward directions in all the layers, reversible codes may be used only in a part of layers.

Fifth Preferred Embodiment

The fifth preferred embodiment, wherein the variable length coding and/or decoding system in the fourth preferred embodiment is applied to the moving picture multiplexing part 703 and the moving picture multiplexing separating part 707 of the moving picture coding and/or decoding system shown in FIG. 16, will be described below. In this case, the basic construction of the moving picture coding and/or decoding system is the same as that in the second preferred embodiment, except that the variable length coding and decoding processes in the moving picture multiplexing part 703 and the moving picture multiplexing separating part 707 are carried out every layer.

FIGS. 40A, 40B, 41A, 41B, 42A, 42B, 43A and 43B show various examples of syntax of a moving picture coding system in the moving picture multiplexing part 703 in the fifth preferred embodiment. First, the syntax shown in FIGS. 40A and 40B will be described. In this syntax, inputted source symbols being coded data are divided into two layers, i.e., an upper layer and a lower layer, and synchronization intervals are set for the respective layers using synchronization patterns RM and MM. Symbol ST at the suffix of the syntax of the lower layer is a stuffing code capable of being decoded in the backward direction shown in FIG. 14.

Figure 40A:
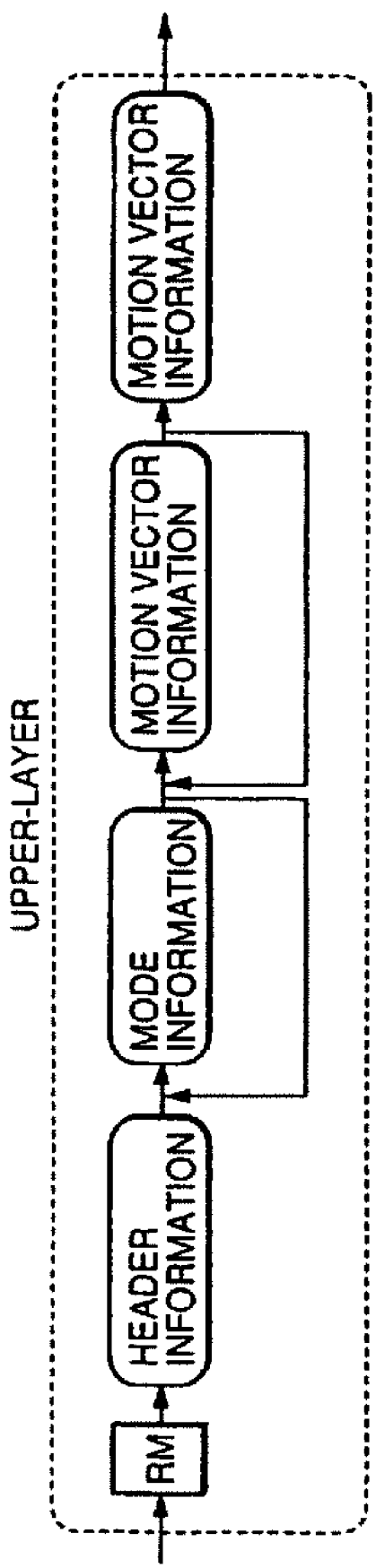
FIGS. 40A and 40B are diagrams showing a first embodiment of a syntax in a moving-picture coding system in a moving-picture multiplexing part and a moving-picture multiplex dividing part when the variable length coding and/or decoding system in the fourth preferred embodiment is incorporated into the moving-picture coding and/or decoding system of FIG. 16, respectively.

As shown in FIG. 40A, the upper layer includes a header information and a mode information, which is arranged on the side of the prefix and which includes coding modes for each of macro blocks, information on the need for coding the respective blocks, and values of INTRA DC. These informations are described by variable length codes capable of being decoded in the usual forward direction. In addition, motion vector informations are variable-length coded to reversible codes by means of coding tables shown in FIGS. 44 through 51 to be arranged after the header and mode informations. In the coding tables shown in FIGS. 44 through 51, "VECTOR DIFFERENCES" denotes predicted values (differential values) of motion vectors, "BIT NUMBER" denotes code lengths of variable length codes, and "VLC CODE" denotes variable length codes.

Figure 40B:
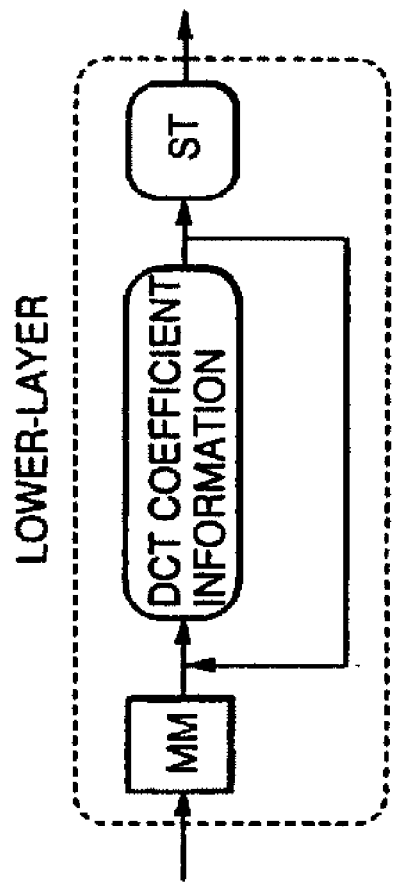
Figure 52:
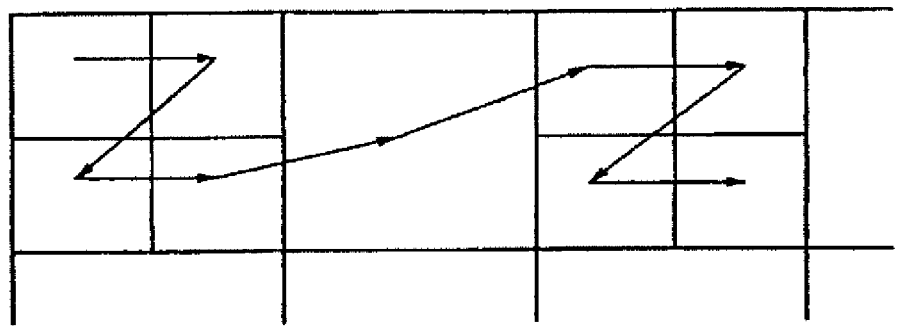
FIG. 52 is a diagram explaining a one-dimensional prediction for motion vectors in the fourth preferred embodiment.

As shown in FIG. 52, motion vectors are obtained by one-dimensional predictions, and predicted values are represented by differential values. The predicting directions of the motion vector is shown by arrows in FIG. 52. As shown in FIG. 52, a macro block (shown by a greater rectangle in FIG. 52) has one motion vector or four motion vectors, each of which exists in each of luminance blocks (shown by smaller rectangles in FIG. 52). The one-dimensional prediction is carried out with respect to these blocks, and predicted values are described by variable length codes in accordance with the coding tables shown in FIGS. 44 through 51. This corresponds to the motion vector information at the end of FIG. 40A. On the other hand, as shown in FIG. 40B, the lower layer has DCT coefficient information other than the INTRA DC. For example, the lower layer is described by reversible codes, which are shown in FIGS. 19 through 25 or disclosed in Japanese Patent Application No. 7-260383.

Figure 41A:
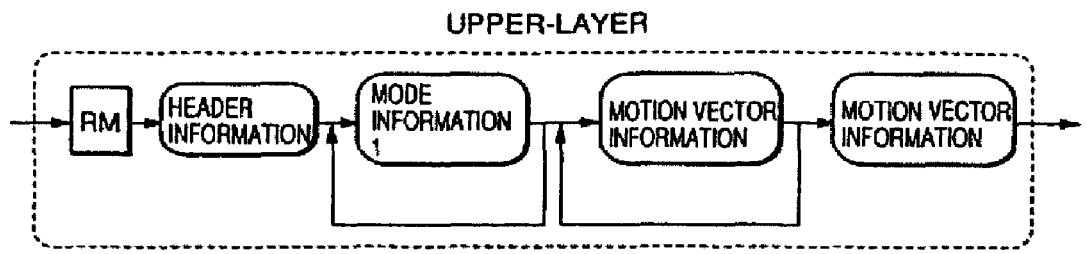
FIGS. 41A and 41B are diagrams showing a second embodiment of a syntax in a moving-picture coding system in a moving-picture multiplexing part and a moving-picture multiplex dividing part when the variable length coding and/or decoding system in the fourth preferred embodiment is incorporated into the moving-picture coding and/or decoding system of FIG. 16, respectively.
Figure 41B:
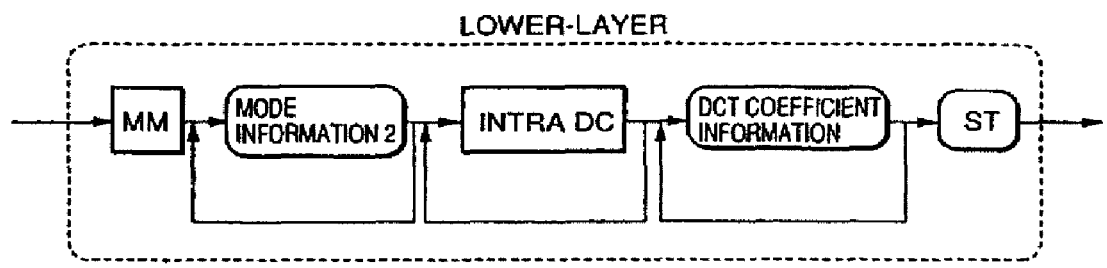

The syntax shown in FIGS. 41A and 41B will be described. In this syntax, as shown in FIG. 41A, a header information and a mode information 1 indicative of the number of motion vectors for each macro coding are arranged on the side of the prefix of the upper layer to be described by variable length codes capable of being decoded in the usual forward direction, and the variable length codes of the motion vectors are described after the header information and the mode information. The variable length codes of the motion vector information are the same as those of the syntax of FIG. 40A. As shown in FIG. 41B, a mode information 2 indicative of the presence of DCT coefficients in the respective blocks and the INTRA DC are arranged on the side of the prefix of the lower layer to be described by variable length codes capable of being decoded in the usual forward direction, and a DCT coefficient information other than the INTRA DC is described by reversible codes after the DCT coefficient information similar to the syntax of FIG. 40B.

Figure 42A:
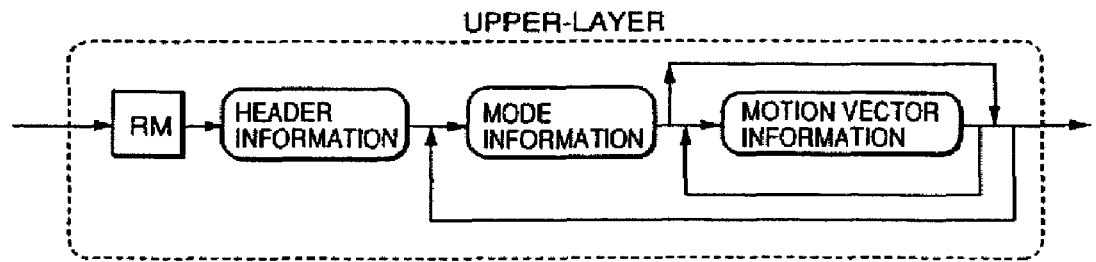
FIGS. 42A and 42B are diagrams showing a third embodiment of a syntax in a moving-picture coding system in a moving-picture multiplexing part and a moving-picture multiplex dividing part when the variable length coding and/or decoding system in the fourth preferred embodiment is incorporated into the moving-picture coding and/or decoding system of FIG. 16, respectively.
Figure 42B:
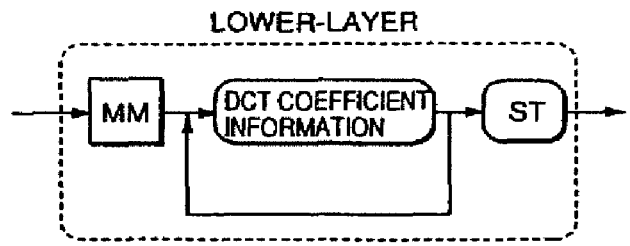

The syntax shown in FIGS. 42A and 42B will be described. In this syntax, only variable length codes capable of being decoded in the forward direction are used for the upper layer. That is, as shown in FIG. 42A, in the upper layer, a header information, a mode information and a motion vector information are described by variable length codes capable of being decoded in the forward direction. In the lower layer, as shown in FIG. 42B, a DCT coefficient information is described by reversible codes similar to the syntax of FIG. 40B.

Figure 43A:
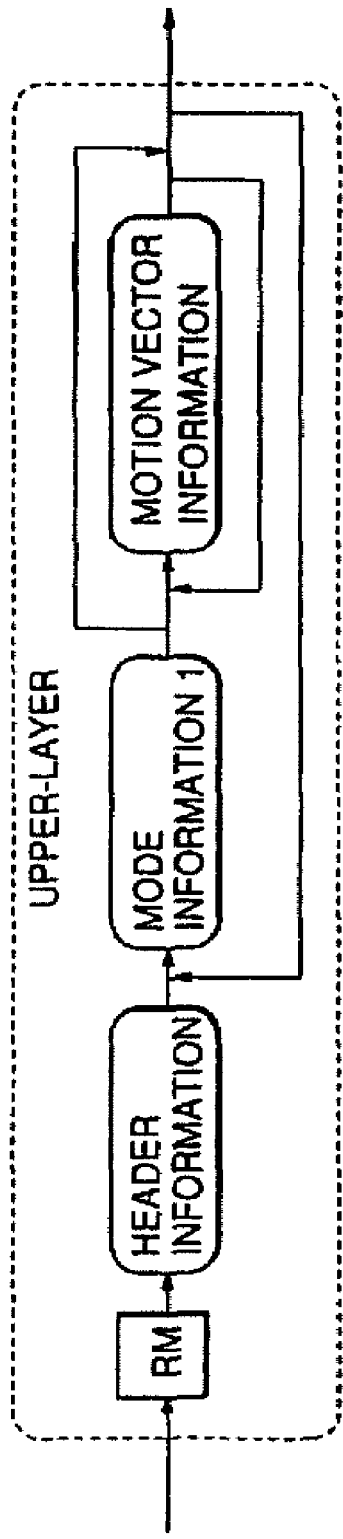
FIGS. 43A and 43B are diagrams showing a fourth embodiment of a syntax in a moving-picture coding system in a moving-picture multiplexing part and a moving-picture multiplex dividing part when the variable length coding and/or decoding system in the fourth preferred embodiment is incorporated into the moving-picture coding and/or decoding system of FIG. 16, respectively.
Figure 43B:
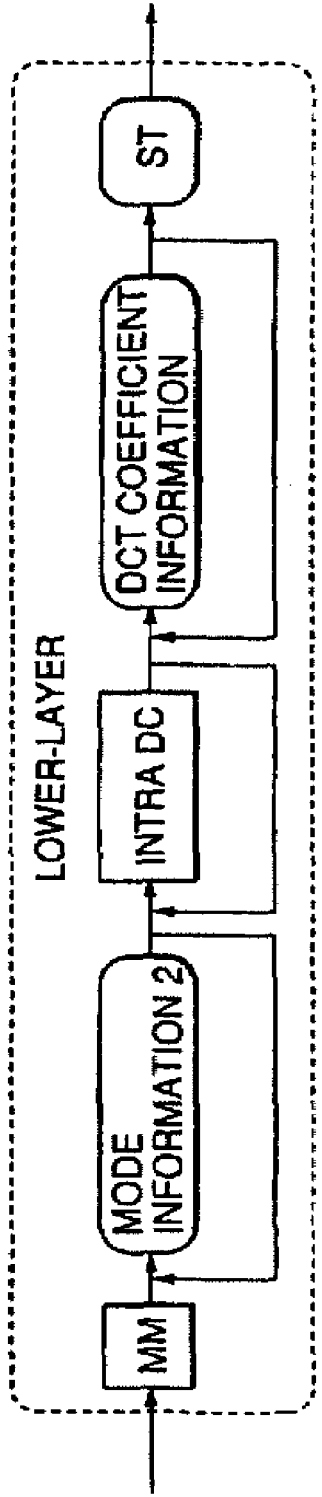

The syntax shown in FIGS. 43A and 43B also uses, in the upper layer, only variable length codes capable of being decoded in the forward direction. That is, as shown in FIG. 43A, in the upper layer, a header information, a mode information 1 indicative of the number of motion vectors for each macro coding, and a motion vector information are described by variable length codes capable of being decoded in the forward direction. As shown in FIG. 43B, in the lower layer, a mode information 2 indicative of the presence of DCT coefficient of each block, and an INTRA DC are arranged on the side of the prefix to be described by variable length codes capable of being decoded in the usual forward direction, and in the rear thereof, a DCT coefficient information other than the INTRA DC is described by reversible codes similar to the syntax of FIG. 41B.

In the fifth preferred embodiment, although the basic constructions of the moving picture multiplexing part 703 and the moving picture multiplexing separating part 707 are the same as those of FIGS. 18A and 18B, the constructions of the upper-layer variable length encoder 901, the lower-layer variable length encoder 903, the upper-layer variable length decoder 905 and the lower-layer variable length decoder 906 are different from those in the second preferred embodiment. That is, out of data coded by the source encoder 702, the upper layer data indicated by, e.g., the syntax of FIG. 40A or 41A, are variable-length coded by means of the upper-layer variable length encoder 901 to be transmitted to the multiplexing. part 903. In addition, out of data coded by the source encoder 702, the lower layer data indicated by the syntax of FIG. 40B or 41B are variable-length coded by means of the lower-layer variable length encoder 903 to be transmitted to the multiplexing part 903. In the multiplexing part 903, the coded data in the upper and lower layers are multiplexed to be transmitted to the transmission buffer 704.

In the fifth preferred embodiment, the decoded-value determining part 110 (shown in FIG. 37) in the upper-layer variable length decoder 905 and the lower-layer variable length decoder 906 determines decoded values on the basis of the forward decoded result obtained by the forward decoder 108, to output a final decoded result. In the error detection in the forward decoder 108 and the backward decoder 109 in the respective layers, when a bit pattern, which does not exist as code words, appears or when an error is detected by a check bit or the like, the position of the bit pattern or the error is regarded as a detected position. When no error is detected by the above described determining method and when the number of decoded bits is not coincident with the bit number of coded data in the synchronization interval, the first decoding position is regarded as an error detected position.

In the fifth preferred embodiment, a decoded-value determining method will be described below.

Figure 53:
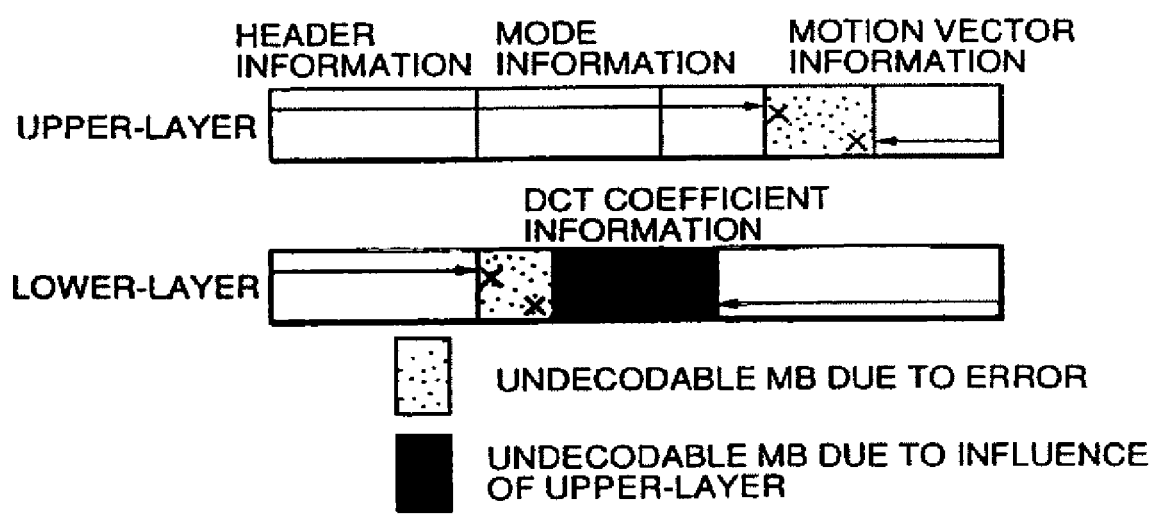
FIG. 53 is a diagram explaining a decoded-value determining method in the case of the syntax of FIG. 40.

FIG. 53 shows a decoded-value determining method when the syntax of the moving picture coding system in the moving picture multiplexing part 703 is the syntax shown in FIGS. 40A and 40B. Since the syntax of FIGS. 40A and 40B uses reversible codes for the motion vector information of the upper layer and the DCT coefficient information of the lower layer, the bidirectional decoding can be carried out both in the upper and lower layers.

In the upper layer, the header information and the mode information are first decoded. When the header information and/or the mode information can not be completely decoded due to an error, all the decoded values of the macro blocks of a synchronization interval, in which the error occurs, are regarded as "Not Coded", and the last screen is directly displayed. If all the header information and the mode information can be decoded, the bidirectional decoding of the motion vector information is then carried out. A portion of the motion vector information, which can not decoded, is regarded as "Not Coded". In the lower layer, the DCT coefficient information of the lower layer is used for only macro blocks, which have been decoded to the motion vector. The macro blocks, in which the DCT coefficient information has been abandoned due to the error, are regarded as "Not Coded".

Figure 54:
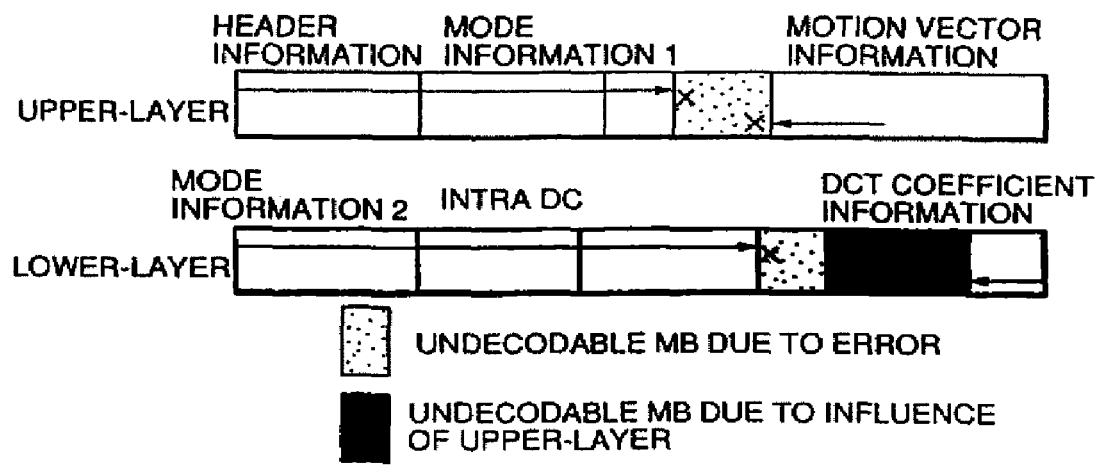
FIG. 54 is a diagram explaining a decoded-value determining method in the case of the syntax of FIG. 41.

FIG. 54 shows a decoded-value determining method when the syntax of the moving picture coding system in the moving picture multiplexing part 703 is the syntax shown in FIG. 41. According to the syntax of FIG. 41, in the upper layer, the header information and the mode information 1 are first decoded. If the header information and/or the mode information 1 can not be completely decoded due to an error, all the decoded value of macro blocks in a synchronization interval, in which the error has occurred, are regarded as "Not Coded", and the last screen is directly displayed. If all the header information and the mode information 1 can be decoded, the bidirectional decoding of the motion vector information is then carried out. A portion of the motion vector information, which can not be decoded, is regarded as "Not Coded". In the lower layer, the DCT coefficient information of the lower layer is used for only macro blocks, which have been decoded to the motion vector. The macro blocks, in which the DCT coefficient information has been abandoned due to the error, are regarded as "Not Coded".

While the decoded values have been determined every macro blocks in the decoded-value determining methods shown in FIGS. 53 and 54, the decoded values may be determined every block or code word. In the fifth preferred embodiment, while the present invention has been applied to the variable length codes of the motion vector information and the DCT coefficient information, the invention may be applied to other source symbols for variable length coding.

Sixth Preferred Embodiment

The sixth preferred embodiment of a variable length coding and/or decoding system, according to the present invention, will be described below. Since the basis constructions in the sixth preferred embodiment are the same as those in the first preferred embodiment shown in the block diagram of FIG. 6, the sixth preferred embodiment will be described referring to FIG. 6.

In a coding part 113, inputted source symbols are inputted to an encoder 103. A code-word table 102 stores therein source symbols previously prepared by a code-word table preparing part 101 and code words of variable length codes so that the source symbols correspond to the code words. The encoder 103 selects code words corresponding to the inputted source symbols from the code words stored in the code-word table 102. A synchronization interval setting part 104 outputs the code words selected by the encoder 103, as coded data every synchronization interval. The coded data are transmitted to a decoding part 114 via a transmission or storage system 105.

In the decoding part 114, a synchronization interval detecting part 106 detects the synchronization interval of the coded data inputted by the transmission or storage systems 105, and a buffer 107 stores therein the coded data. A forward decoder 108 starts to decode the coded data stored in the buffer 107 from the prefix of, the coded data, and a backward decoder 109 starts to decode the coded data stored in the buffer 107 from the suffix of the coded data.

The forward decoder 108 determines that an error is detected, when a bit pattern, which does not exist in a forward code-word table 111, appears in the decoded data or when a decoded data having a bit number different from the bit number of the buffer 107 is decoded. Similarly, the backward decoder 109 determines that an error is detected, when a bit pattern, which does not existed in a backward code-word table 112, appears in the decoded data and when a decoded data having a bit number different from the bit number of the buffer is decoded.

The decoded-value determining part determines decoded values on the basis of a decoded result (a forward decoded result) obtained by the forward decoder and a decoded result (a backward decoded result) obtained by the backward decoder, to output a final decoded result.

Figure 55:
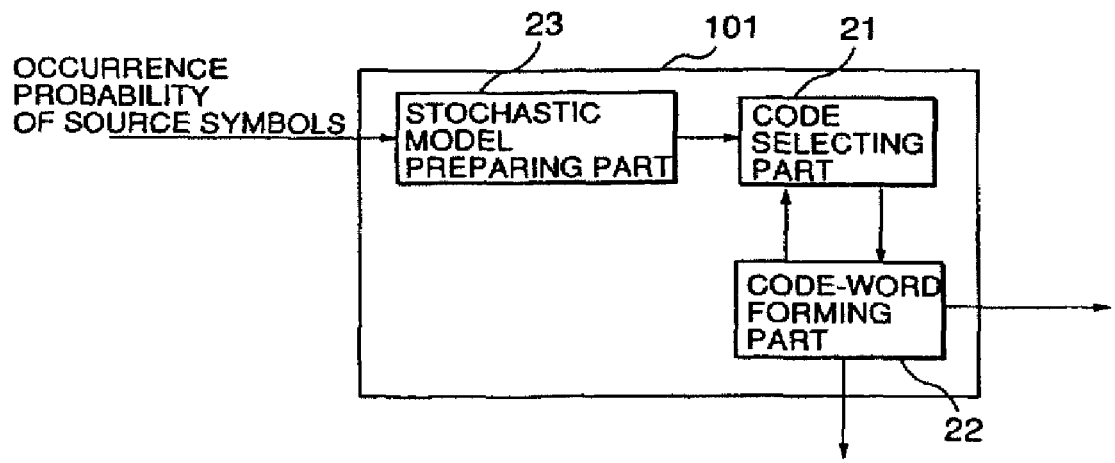
FIG. 55 is a block diagram of the sixth preferred embodiment of a coding and/or decoding system according to the present invention, which shows a detailed construction of a code-word table preparing part of FIG. 6.

FIG. 55 is a block diagram of the code-word table preparing part 101. The occurrence probability of source symbols is inputted to a stochastic model preparing part 23 to prepare a stochastic model, which is inputted to a code selecting part 21. The code selecting part 21 selects a code system having a shortest average code length from selectable code systems to transmit the selected result to a code-word forming part 22. The code-word forming part 22 forms code words of the code selected by the code-word selecting part 21.

In this sixth preferred embodiment, a method for designing a stochastic model is as follows. In the sixth preferred embodiment, a method for designing a generalized stochastic model of a high coding efficiency with respect to various probability distributions of source symbols will be described.

First, notation will be described.
$\theta i$: Information Source (i=1, . . . , n)
X: Source Symbols of Information Source X=(x1, x2, . . . , xm)
$P(X|\theta i)$: Frequency Distribution of $\theta i$ As an example, a plurality of test images may be used as information sources, and the frequency distribution obtained by coding the test images may be considered.

A designed stochastic model Q(X) is derived by weighting and averaging the frequency distribution obtained by the plurality of information source.

$$Q(X) = w(\theta 1)P(X | \theta 1) + \ldots + w(\theta n)P(X | \theta n)$$

$$= \sum_{i=1}^{n} w(\theta i)P(X | \theta n)$$

$w(\theta i)$: Weighting Factor $w(\theta 1)+ \ldots +w(\theta n)=1$

In this case, it is a problem how to derive the weighting factor w(θi). When the information source θi is coded by Q(X), an ideal code length L(X|θi) is as follows.

$$L(X \mid \theta i) = \sum_{i=1}^{m} P(X \mid \theta i) \log 2(Q(X))$$

In order to minimize the ideal code lengths L(X|θi) of the respective information sources on average, assuming that $$U(X) = (1/n) \sum_{i=1}^{n} P(X \mid \theta i),$$

$$M(X) = -(1/n) \sum_{i=1}^{n} \sum_{i=1}^{m} P(X \mid \theta i) \log 2(Q(X))$$

$$= \sum_{i=1}^{m} U(X) \log 2(Q(X))$$

When U(X)=Q(X), this function is minimum as follows.

w(θ1)= . . . =w(θn)=1/n

As another method for designing a stochastic model Q(X), a method for designing a stochastic model Q(X) by supposing the worst information source will be described.

When the information source θi is coded by Q(X), redundancy R(X|θi) is as follows.

$$R(X \mid \theta i) = L(X \mid \theta i) + \sum_{i=1}^{m} P(X \mid \theta i) \log 2(P(X \mid \theta i))$$

A weighting mean S(X) of these redundancy with respect to the respective information sources is a function indicative of a mutual information of event X and event θ as follows.

$$S(X) = \sum_{i=1}^{n} w(\theta i) R(X \mid \theta i)$$

$$= \sum_{i=1}^{n} w(\theta i) \sum_{i=1}^{m} P(X \mid \theta i) \log 2 \left( P(X \mid \theta i) \bigg/ \sum_{i=1}^{n} w(\theta i) P(X \mid \theta i) \right)$$

As a method for deriving the maximum value of this function, there is known Arimoto-Blahut's algorithm, which is disclosed in "An algorithm for computing the capacity of arbitrary discrete memoryless channels" (S. Arimoto, IEEE Trans. Inform. Theory, Vol. IT-18, pp.14-20, 1972), and "Computation of channel capacity and rate-distortion functions" (R. E. Blahut, IEEE Trans. Inform. Theory, Vol. IT-18, pp.460-473, 1972). By this algorithm or the like, it is possible to derive w(θi) (i=1, . . . , n) having the maximum S(X), i.e., the worst w(θi).

As methods for designing the stochastic model Q(X), although the method for minimizing the ideal code length on average and the method for supposing the worst information source on average have been described, a method for combining the above two methods to group information sources to prepare some stochastic models by the former method to use the latter method for the stochastic models may be applied.

The code selecting part 21 shown in FIG. 55 prepares Q(Y), which is obtained by sorting the source symbols X in order of probability in the stochastic models Q(X) prepared by the stochastic model preparing part 23. The code selecting part 21 also prepares F(Z), which is obtained by sorting the code lengths of the reversible codes prepared by the code forming part 22 in order of shorter length, to calculate $$\sum_{i=1}^{m} Q(Y) F(Z)$$

to select one of the minimum value to prepare a code-word table, in which source symbols correspond to code words.

As the codes formed by the code-word forming part 22, variable length codes are used, which are described in, e.g., Japanese Patent Application 7-89772 or 7-260383, which uses the weights of the code words and which can be decoded both in the forward and backward directions.

Seventh Preferred Embodiment

The seventh preferred embodiment of the present invention will be described below.

Figure 56:
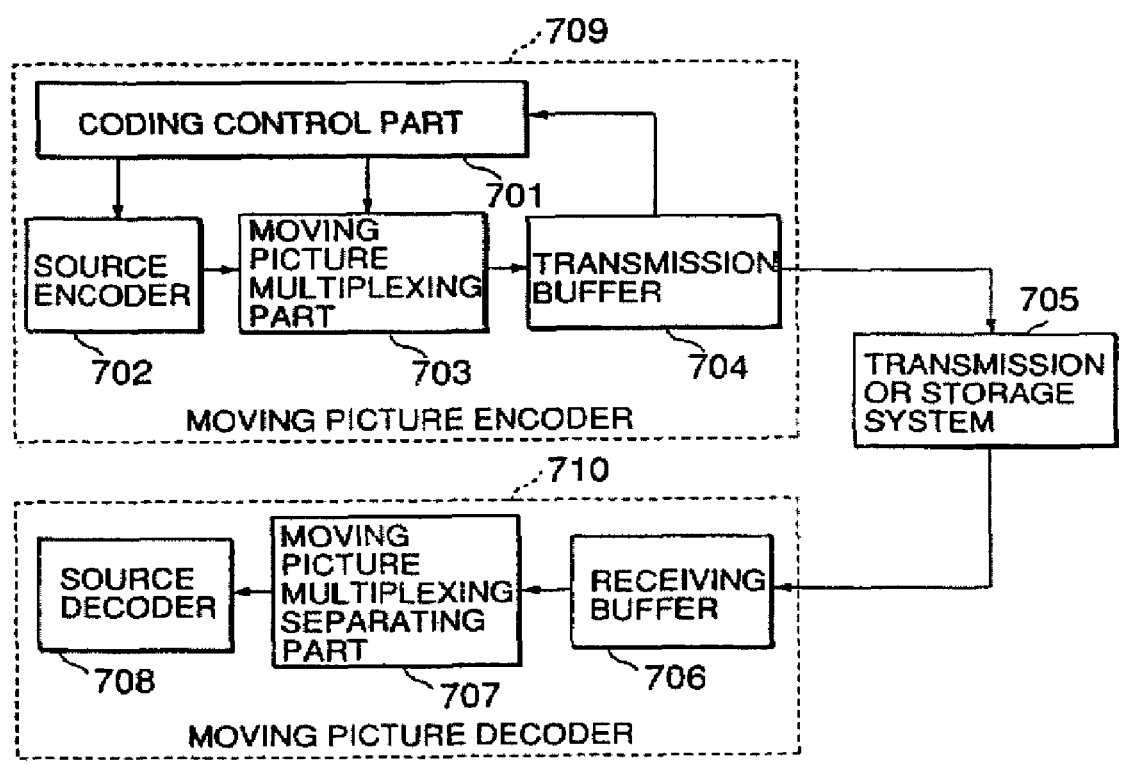
FIG. 56 is a schematic block diagram of the seventh preferred embodiment of a moving-picture coding and/or decoding system according to the present invention.

FIG. 56 is a block diagram illustrating a conception of a moving picture coding and/or decoding system, which incorporates the seventh preferred embodiment of a variable length coding and/or decoding system according to the present invention. In a moving picture encoder 709, data coded by a source encoder 702 are variable-length coded and multiplexed by a moving picture multiplexing part 703 to smoothed by a transmission buffer 704 to be transmitted to a transmission or storage system 705 as coded data. A coding control part 701 controls the source encoder 702 and the moving picture multiplexing part 703 in view of the buffer capacity of the transmission buffer 704. In a moving picture decoder 710, the coded data transmitted from the transmission or storage system 705 are stored in a receiving buffer 706 to be multiplex-separated and variable-length decoded by a moving picture multiplexing separating part 707 to be transmitted to a source decoder 708, so that the moving picture is finally decoded.

Additional syntax in the seventh preferred embodiment will be described. FIGS. 57A, 57B, 58A and 58B show syntax of a moving picture coding system in the moving picture multiplexing part 703 and the moving picture multiplexing separating part 707 in the seventh preferred embodiment. Coded data are separated into upper and lower layers, and synchronization intervals of the respective layers are set by synchronization patterns RM and MM. In the lower layer, ST denotes a stuffing code capable of being decoded in the backward direction as shown in FIG. 68. As shown in FIG. 69, an intraframe coding frame is separated into an upper layer, which has a part of mode information of macro blocks and INTRA DC, and a lower layer, which has the rest of the mode information and an AC-DCT coefficient information, to which reversible codes are applied. As shown in FIG. 70, an interframe coding frame is separated into an upper layer, which has a part of mode information of macro blocks and a motion vector information, and a lower layer, which has the rest of the mode information and an AC-DCT coefficient information, to which reversible codes are applied.

Figure 57A:
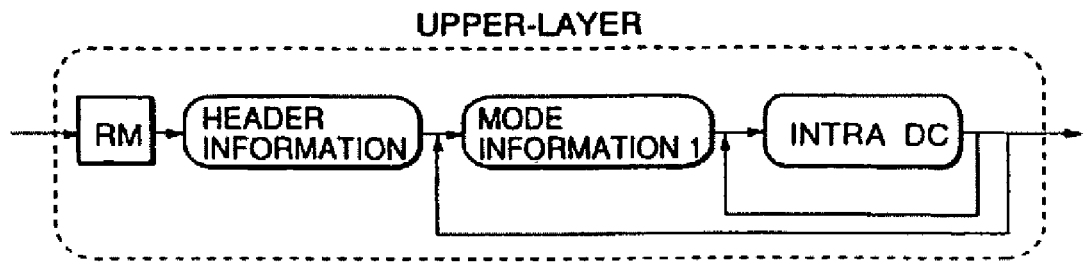
FIGS. 57A and 57B are diagrams showing examples of syntax in a moving-picture coding system in a moving-picture multiplexing part and a moving-picture multiplex dividing part in the seventh preferred embodiment, respectively.
Figure 57B:
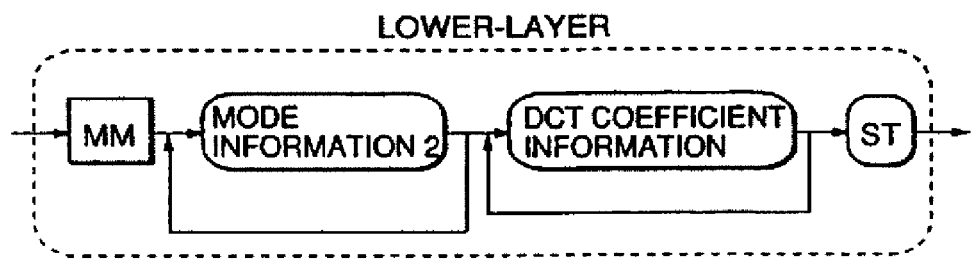
Figure 58A:
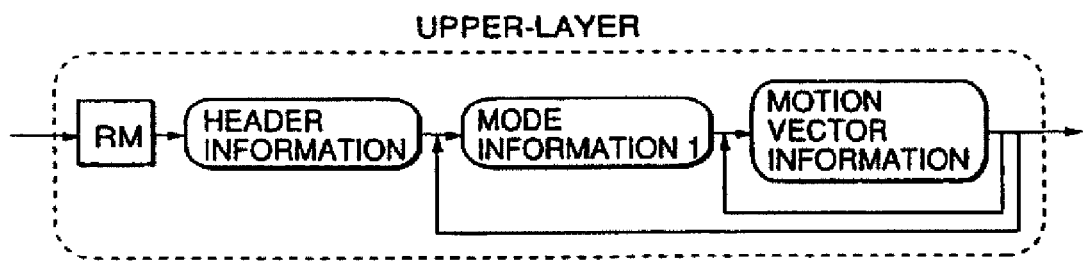
FIGS. 58A and 58B are diagrams showing examples of syntax in a moving-picture coding system in a moving-picture multiplexing part and a moving-picture multiplex dividing part in the seventh preferred embodiment, respectively.
Figure 58B:
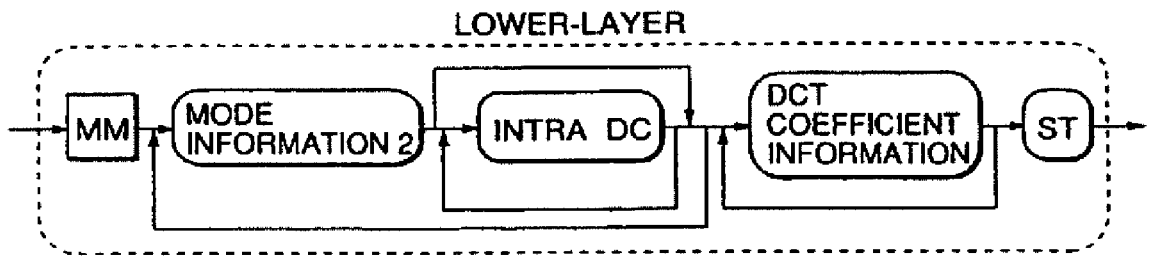
Figure 59A:
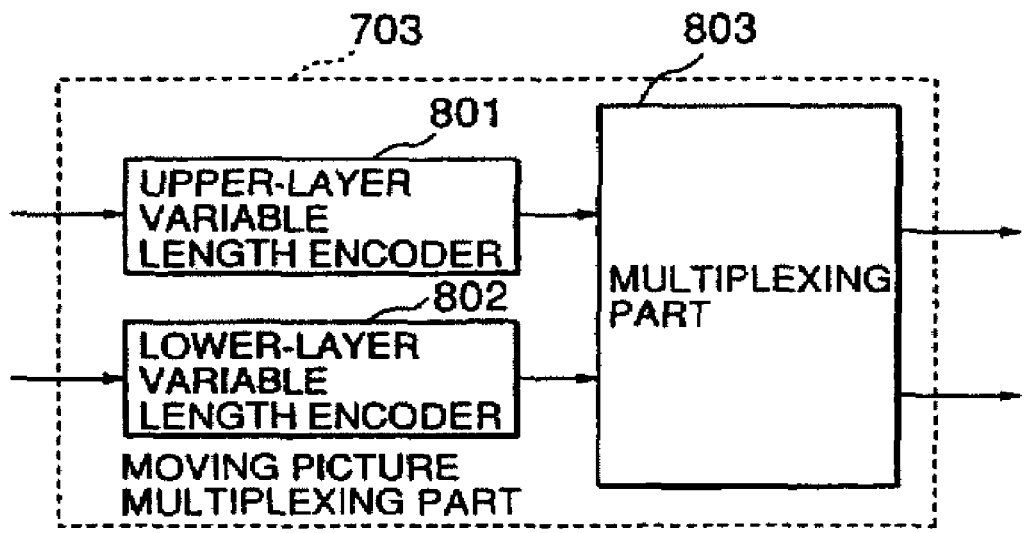
FIGS. 59A and 59B are block diagrams of a moving-picture multiplexing part and a moving-picture multiplex dividing part of FIG. 55.
Figure 59B:
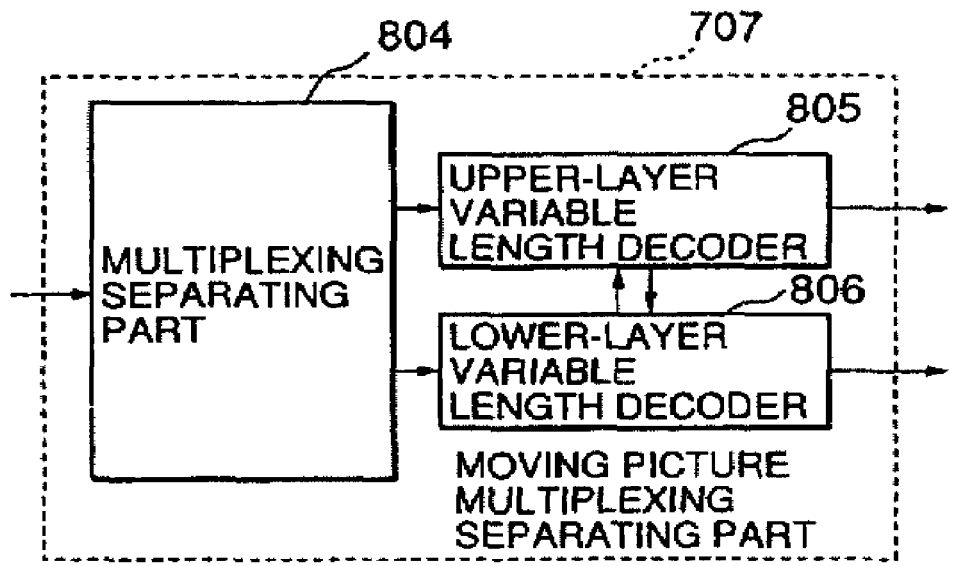

The coding and decoding of the upper and lower layers shown in FIGS. 57A through 58B are carried out by means of a moving picture multiplexing part shown in FIG. 59. These constructions are the same as those of a coding and/or decoding system in the fifth preferred embodiment. That is, although the basic constructions of the moving picture multiplexing part 703 and the moving picture multiplexing separating part 707 of FIG. 56 are the same as those shown in FIGS. 57A through 58B, the constructions of an upper-layer variable length encoder 801, a lower-layer variable length encoder 803, an upper-layer variable length decoder 805 and a lower-layer variable length decoder 806 are different from those in the second preferred embodiment. That is, out of data coded by the source encoder 702, the upper layer data indicated by, e.g., the syntax of FIG. 57A or 58A, are variable-length coded by the upper-layer variable length encoder 801 to be transmitted to the multiplexing part 803. In addition, out of data coded by the source encoder 702, the lower layer data indicated by, e.g., the syntax of FIG. 57B or 58B, are variable-length coded by the variable length encoder 802 to be transmitted to the multiplexing part 803. The coded data of the upper and lower layers are multiplexed by the multiplexing part 803 to be transmitted to a transmission buffer 704.

In the seventh preferred embodiment, decoded-value determining parts 110 (shown in FIG. 37) in the upper-layer variable length decoder 805 and the lower-layer variable length decoder 806 determine decoded values on the basis of the forward decoded result obtained by a forward decoder 108, to output a final decoded result. In the error detection in the forward decoder 108 and the backward decoder 109 in the respective layers, when a bit pattern, which does not exist as code words, appears or when an error is detected by a check bit or the like, the position of the bit pattern or the error is regarded as a detected position, and when no error is detected by the above described determining method and when the number of decoded bits is not coincident with the bit number of coded data in the synchronization interval, the first decoding position is regarded as an error detected position.

Eight Preferred Embodiment

Figure 60:
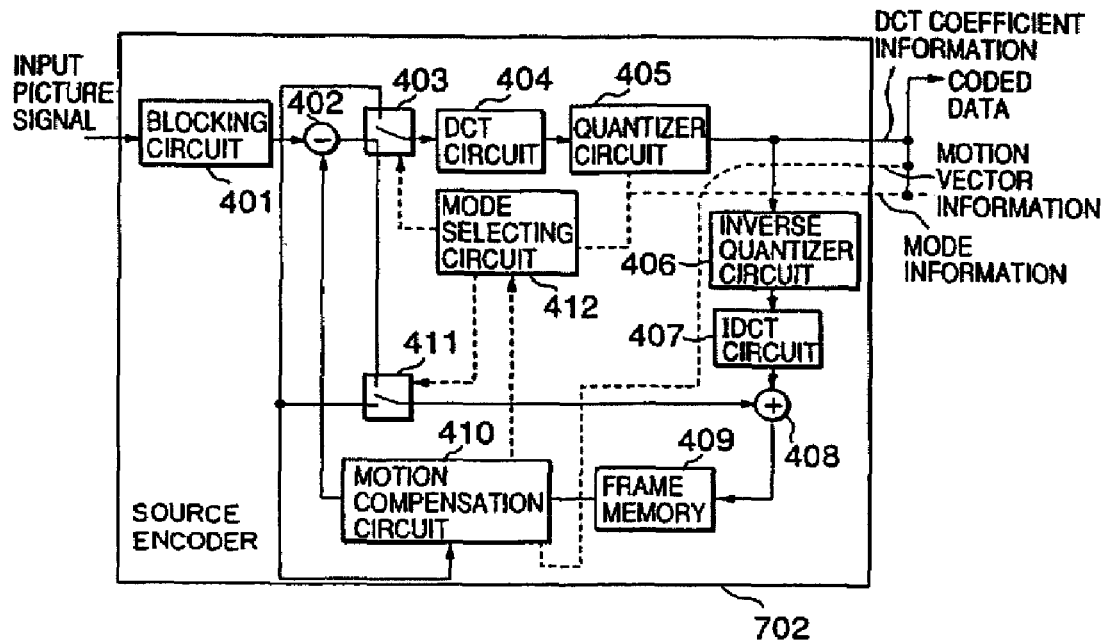
FIG. 60 is a block diagram of the eighth preferred embodiment of a source encoder according to the present invention.
Figure 61:
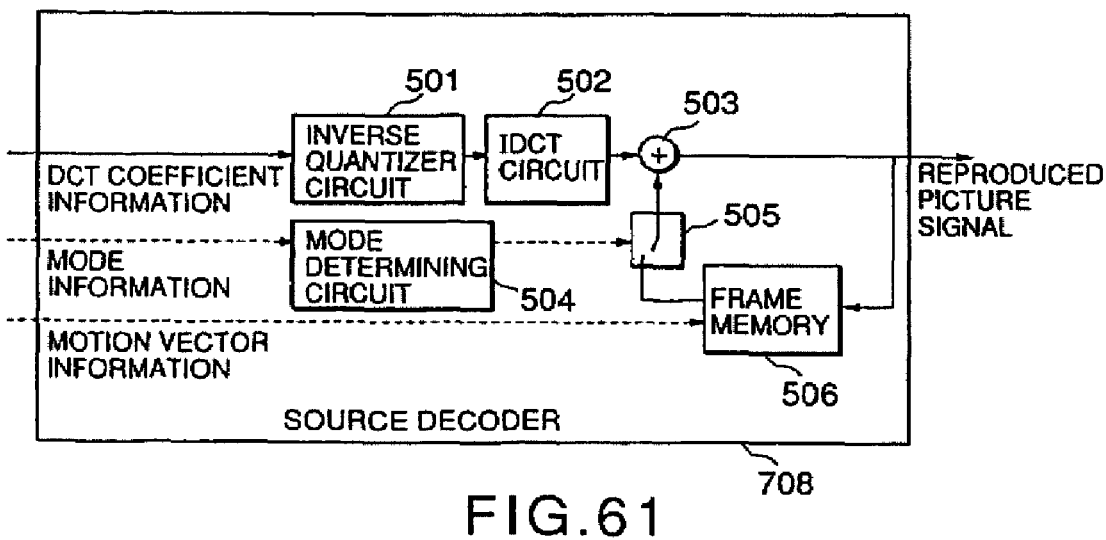
FIG. 61 is a block diagram of the eighth preferred embodiments of a source decoder according to the present invention.

FIGS. 60 and 61 show examples of a source encoder 702 and a source decoder 708 in the eighth preferred embodiment of a coding and/or decoding system according to the present invention. In FIG. 60, an input picture signal is divided into macro blocks by means of a blocking circuit 401. The input picture signal divided into macro blocks is inputted to a subtracter 402, by which a difference between the input picture signal and a prediction picture signal is derived to produce a prediction residual signal. One of this prediction residual signal and the input signal outputted from the blocking circuit 401 is selected by a mode selecting switch 403 to be discrete-cosine-transformed by a DCT (discrete cosine transform) circuit 404. DCT coefficient data obtained by the DCT circuit are quantized by a quantizer circuit 405. The quantized data are divided into two parts, one of which is transmitted to a moving picture multiplexer 703 as a DCT coefficient information, and the other of which is sequentially processed by an inverse quantizer circuit 406 and an IDCT (inverse discrete cosine transform) circuit 407, the processes being inverse to those of the quantizer circuit 405 and the DCT circuit 404, to be added, by means of an adder 408, to the prediction picture signal inputted via a switch 411 to produce a local decoded signal. This local decoded signal is stored in a frame memory 409 and inputted to a motion compensation circuit 410. The motion compensation circuit 410 carries out the motion compensation between the input picture signal and the local decoded signal to derive a motion vector to produce a prediction picture signal. The derived motion vector information is transmitted to a moving picture multiplexer 703. A mode selecting circuit 412 determines a prediction system for coding the respective macro blocks, on the basis of information from the motion compensation circuit 410, to transmit the result to the moving picture multiplexer 703 as a mode information with quantization parameters and so forth. In FIG. 60, the output coded data are formed by grouping the DCT coding coefficient, the motion vector information and the mode information.

Referring to FIG. 61, the construction of an information source decoder 708 for decoding data coded in FIG. 60 will be described below. FIG. 61 shows an example of the information source decoder 708 corresponding to FIG. 60. In FIG. 61, the information source decoder 708 receives a mode information divided by a moving picture multiplexing separating circuit 707, a motion vector information, a DCT coefficient information and so forth.

In a mode determining circuit 504, to which the mode information is inputted, if the mode information is an INTRA, a mode selecting switch 505 is turned OFF, and the DCT coefficient information is inverse quantized by an inverse quantizer circuit 501 to be inverse discrete-cosine-transformed by an IDCT circuit 502 to produce a regenerative picture signal. This regenerative picture signal is stored in a frame memory 506 as a reference image and outputted as a regenerative picture signal. If the mode information is an INTER, the mode selecting switch 505 is turned OFF, and the DCT coefficient information is inverse quantized by the inverse quantizer circuit 501 to be inverse discrete-cosine transformed by the ICDT circuit 502. Then, the reference image is motion-compensated in the frame memory 504 on the basis of the motion vector information to be added in an adder 503 to produce a regenerative picture signal. This picture signal is stored in the frame memory 504 as a reference image and outputted as a regenerative picture signal.

Ninth Preferred Embodiment

Referring to FIG. 62, as an applied example of the present invention, an embodiment of an image transmitter receiver, to which the ninth preferred embodiment of a moving picture coding and/or decoding system incorporating a variable length coding and/or decoding system according to the present invention is applied, will be described below.

A picture signal inputted to a camera 1002 mounted on a personal computer (PC) 1001 is coded by means of a moving picture encoder 709 incorporated in the PC. The coded data outputted from the moving picture encoder 709 are multiplexed with other informations on voice and data to be radio-transmitted by a radio transmitter receiver 1003 to be received by another radio transmitter receiver 1004. The signal received by the radio transmitter receiver 1004 is divided into coded data and voice data of a picture signal. The coded data of the picture signal are decoded by means of a moving picture decoder 710 incorporated in a work station (EWS) 1005 to be displayed on the EWS 1005.

Similarly, a picture signal inputted by a camera 1006 mounted on the EWS 1005 is coded by the moving picture encoder 709 incorporated in the EWS 1005. The coded data are multiplexed with other information on voice and data to be radio-transmitted by the radio transmitter receiver 1004 to be received by the transmitter receiver 1003. The signal received by the transmitter receiver 1003 is divided into coded data and voice data of the picture signal. The coded data of the picture signal are decoded by means of the moving picture decoder 710 incorporated in the PC 1001 to be displayed on the PC 1001.

Tenth Preferred Embodiment

While the present invention has been grasped as a hardware construction of a moving picture coding and/or decoding system in the first through ninth preferred embodiments, the invention may be grasped as a recording medium for recording data or programs for use in a coding and/or decoding system in the above preferred embodiments. The tenth preferred embodiment of a recording medium for recording data or programs will be described below.

In an information source encoder 702 shown in FIG. 56, 8×8 blocks of DCT coefficients after quantization are scanned in the blocks to derive LASTs (0: non-zero coefficient, which is not the last of the block, 1: non-zero coefficient of the last of the block), RUNs (the number of zero runs before the non-zero coefficient) and LEVELs (quantized value of the coefficient), which are transmitted to a moving picture multiplexing part 703.

A lower-layer variable length encoder 802 in the moving picture multiplexing part 703 has an INDEX table wherein INDEXs of code words (VLC_CODE) of reversible codes correspond to RUNs and LEVELs of non-LAST coefficients of INTRA (intraframe coding) shown in FIG. 66, an INDEX table wherein INDEXs of code words (VLC_CODE) of reversible codes correspond to RUNs and LEVELs of non-LAST coefficients of INTER (interframe coding) shown in FIG. 67, an INDEX table wherein INDEXs of code words (VLC_CODE) of reversible codes correspond to RUNs and LEVELs of common LAST coefficients of INTRA and INTER shown in FIG. 68, and a code-word table wherein code words correspond to the INDEX values shown in FIGS. 69 and 70.

Figure 63:
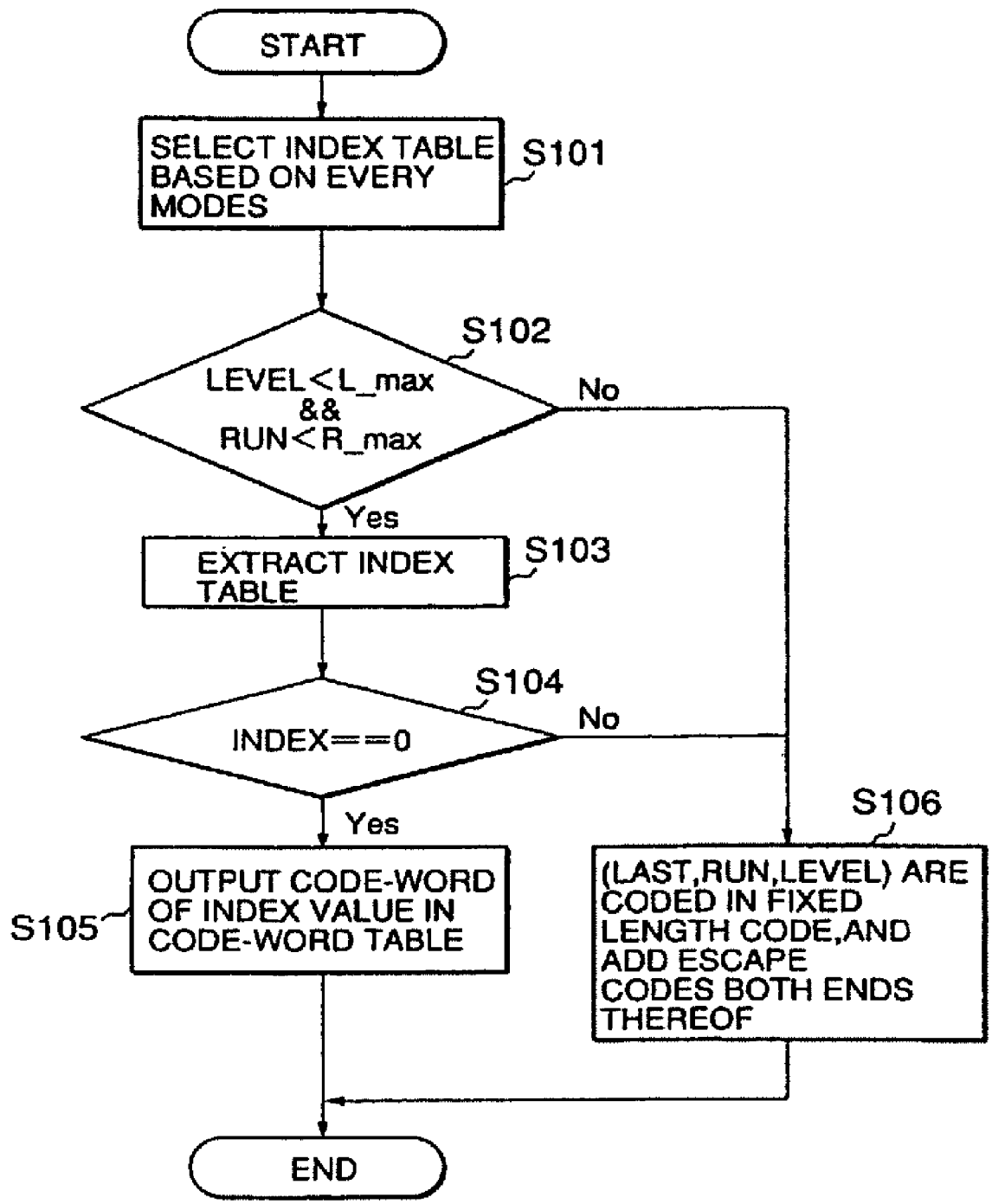
FIG. 63 is a flow chart showing the operation of the tenth preferred embodiment of a variable length encoder according to the present invention.

Referring to a flow chart of FIG. 63, the operation of the lower-layer variable length encoder 802 will be described. First, on the basis of the mode information, the code-word table of the non-LAST coefficients and the LAST coefficients of the INTRA is selected when the INTRA is carried out, and the INDEX table of the non-LAST coefficients and the LAST coefficients of the INTER when the INTER is carried out (S101). Then, in order to code using the code-word table, (RUN, LEVEL) is compared with the maximum value R_max of the RUNs and the maximum value L_max of the LEVELs in the INDEX table, so that it is verified whether (RUN, LEVEL) exists in the INDEX table (S102).

Figures 71, 72, 73:
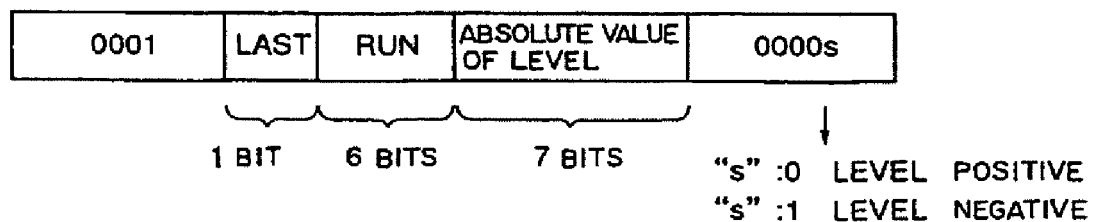
FIG. 71 is a fixed value code-word table of RUNs in the tenth preferred embodiment.
FIG. 72 is a fixed value code-word table of LEVELs in the tenth preferred embodiment.
FIG. 73 is a diagram illustrating a coding of code words, which are contained in a code-word table.

If it exists therein, the INDEX table of FIGS. 66 through 68 is used to check whether the value of the INDEX is 0 (S104). If it is not 0, the code words of the INDEX in the code-word table of FIG. 17 are outputted. The last bit "s" of the code words in the code-word table denotes the sign of the LEVEL. When "s" is "0", the sign of the LEVEL is positive, and when "s" is "1", the sign of the LEVEL is negative (S105). When the value of the INDEX is 0 or beyond the range, ESCAPE codes continue as shown in FIG. 73 by coefficients, which do not exist in the code-word table, and 1 bit indicating whether it is a LAST coefficient and the absolute values of the RUNs and LEVELs shown in FIGS. 71 and 72 are fixed-length coded. To the prefix of the fixed-length coding part, "00001" of two escapes is added, and to the suffix, an escape code is also added. The code words, wherein the INDEX values in FIGS. 69 and 70 are 0, are escape codes. The last bit "s" of the VLC_CODE used as the ESCAPE code denotes the sign of the LEVEL. If the "s" is "0", the LEVEL is positive, and if the "s" is "1", the LEVEL is negative (S106).

As described above, if the INDEX table is used, it is possible to efficiently output code words without the need of search even if the ESCAPE codes are used. The lower-layer variable length decoder 802 has a decoded-value table shown in FIGS. 74 and 75, and operates on the basis of the INDEX values obtained by decoding variable length codes.

Referring to flow charts of FIGS. 64 and 65, the operation of the lower-layer variable length decoder will be described below.

Figure 64:
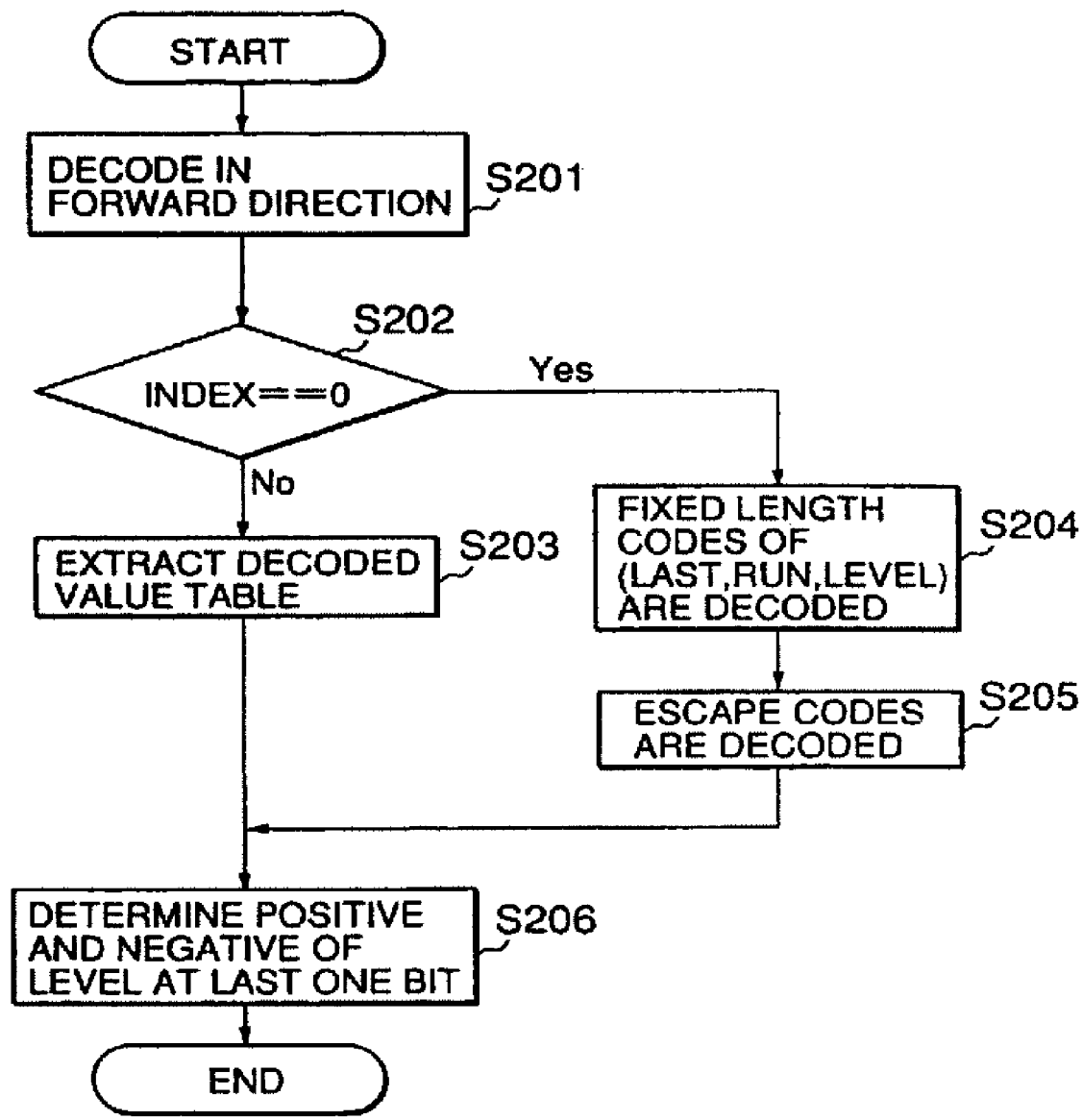
FIG. 64 is a flow chart showing the operation of the tenth preferred embodiment a forward variable length decoder according to the present invention.

FIG. 64 shows the decoding operation in the forward direction. First, variable length code are decoded in the forward direction (S201). Then, it is check whether the INDEX value obtained by decoding is 0 (S202). If it is not 0, the INTRA and INTER of the decoded-value table of FIG. 74 are selected on the basis of the mode information of the upper layer, to derive decoded values of the LAST, RUN and LEVEL (S203). Since it is an escape code when the INDEX value is 0, the subsequent fixed-length code is decoded to derive decoded values of the LAST, RUN and LEVEL (S204). Subsequently, the end ESCAPE code is decoded (S205). The sign of the LEVEL is positive when the last bit of the code word is "0", and negative when it is "1" (S206).

Figure 65:
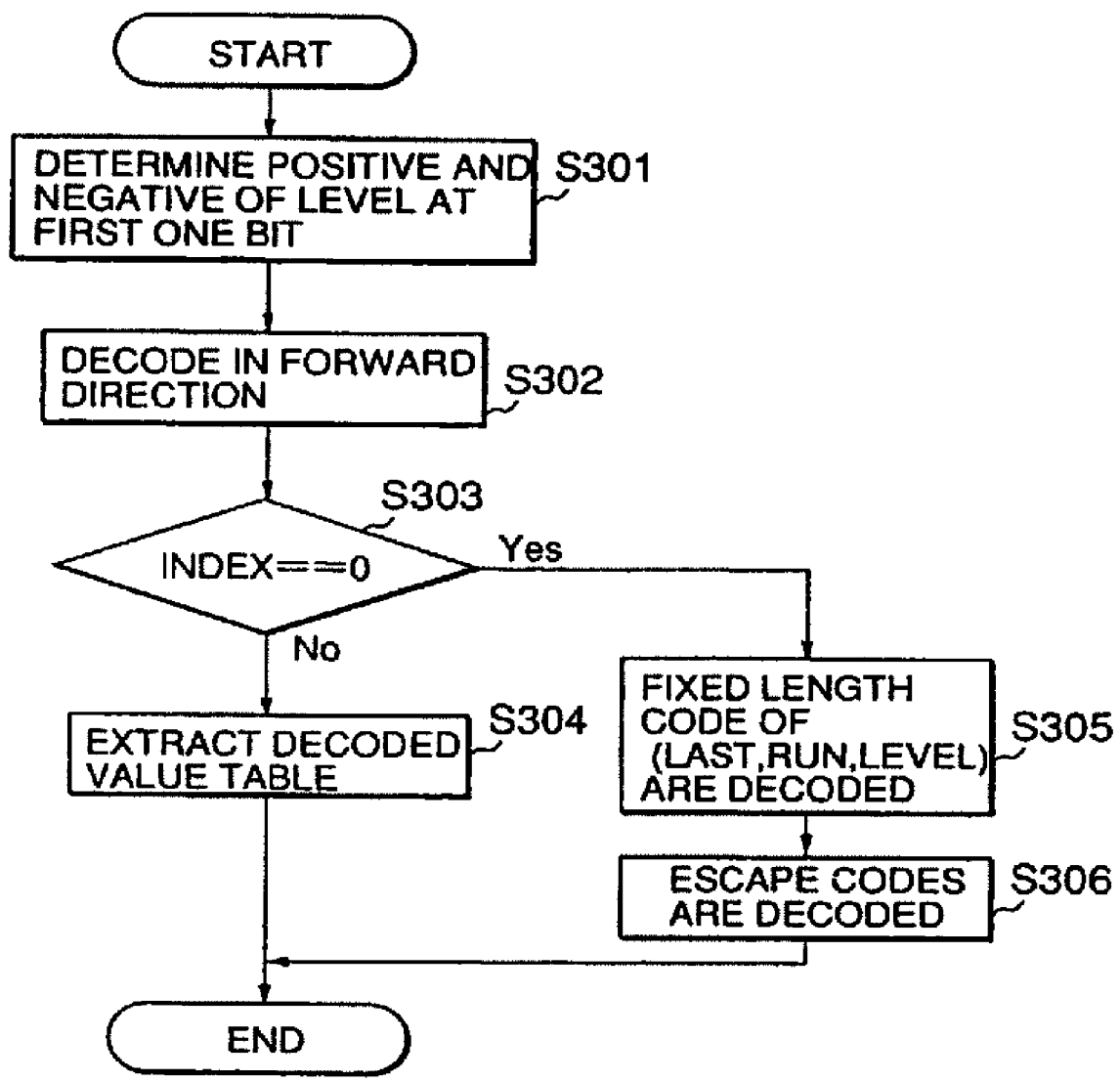
FIG. 65 is a flow chart showing the operation of the tenth preferred embodiment of a backward variable length decoder according to the present invention.

FIG. 65 shows the decoding operation in the backward direction. First, the sign of the LEVEL is determined by the first bit of the code word. If it is "0", the sign is positive, and if it is "1", the sign is negative (S301). Then, the variable length code is decoded in the backward direction (S302). Then, it is checked whether the INDEX value obtained by decoding in the backward direction is 0 (S303). When the INDEX value is not 0, the INTRA and INTER in the decoded-value table of FIG. 74 are selected on the basis of the mode information of the upper layer, to derive decoded values of the LAST, RUN and LEVEL (S304). When the INDEX value is 0, it is an escape code, so that the subsequent fixed-length code is decoded to derive decoded values of the LEVEL, RUN and LAST (S305). Subsequently, the first ESCAPE code is decoded (S306). As described above, if the decoded-value table is used, it is possible to save the memory capacity and to efficiently carry out the bidirectional decoding even if the ESCAPE code is used.

The supplementary explanation of the decoding process in the tenth preferred embodiment will be given. That is, a decoded-value determining method when the syntax of the moving picture coding system in the moving picture multiplexing part 703 is syntax shown in FIGS. 57A through 58A will be described. First, a mode information 1 and a INTRA DC of the upper layer are decoded. If an error is found and the mode information 1 and the INTRA DC are not completely decoded, all the decoded values of macro blocks of a synchronization interval, in which an error occurs, are regarded as "Not Coded". If the first frame is coded and the last frame does not exist, the macro blocks are colored in gray or a special color.

In the lower layer, when a mode information 2 can not be decoded due to an error, all the coded data of the lower layer are abandoned, and the decoded values of the upper layer are rewritten to be regarded as "Not Coded", or indicated by only the INTRA DC. When AC-DCT coefficients are predicted in some of macro blocks of the INTRA mode, variable length codes can be decoded. However, since the prediction is carried out on the basis of the surrounding macro blocks, when the variable length codes can not be decoded in the surrounding macro blocks, the decoded values are regarded as "Not Coded".

In the interframe coding frame, the mode information 1 and the motion vector of the upper layer are first decoded. If an error is founded and the mode information 1 and the motion vector can not be completely decoded, all the decoded values of the macro blocks of a synchronization interval, in which the error occurs, are regarded as "Not Coded". If all can be decoded, it is verified that the synchronization interval MM exists. If it does not exist, all the decoded values of the macro blocks of the synchronization interval are regarded as "Not Coded".

In the lower layer, when the mode information 2 and the INTRA DC can not be decoded due to an error, the coded data of the lower layer are abandoned, and the decoded values of the upper layer are rewritten by the indication of "Not Coded" or the indication (MC Not Coded) of only motion vectors from the last frame.

If the AC-DCT coefficients are predicted in some macro blocks of the INT.RA mode, the variable length codes can be decoded. However, since the prediction is carried out on the basis of the surrounding macro blocks, when the variable length codes can not be decoded in the surrounding macro blocks, the decoded values are regarded as "Not Coded".

Figure 76:
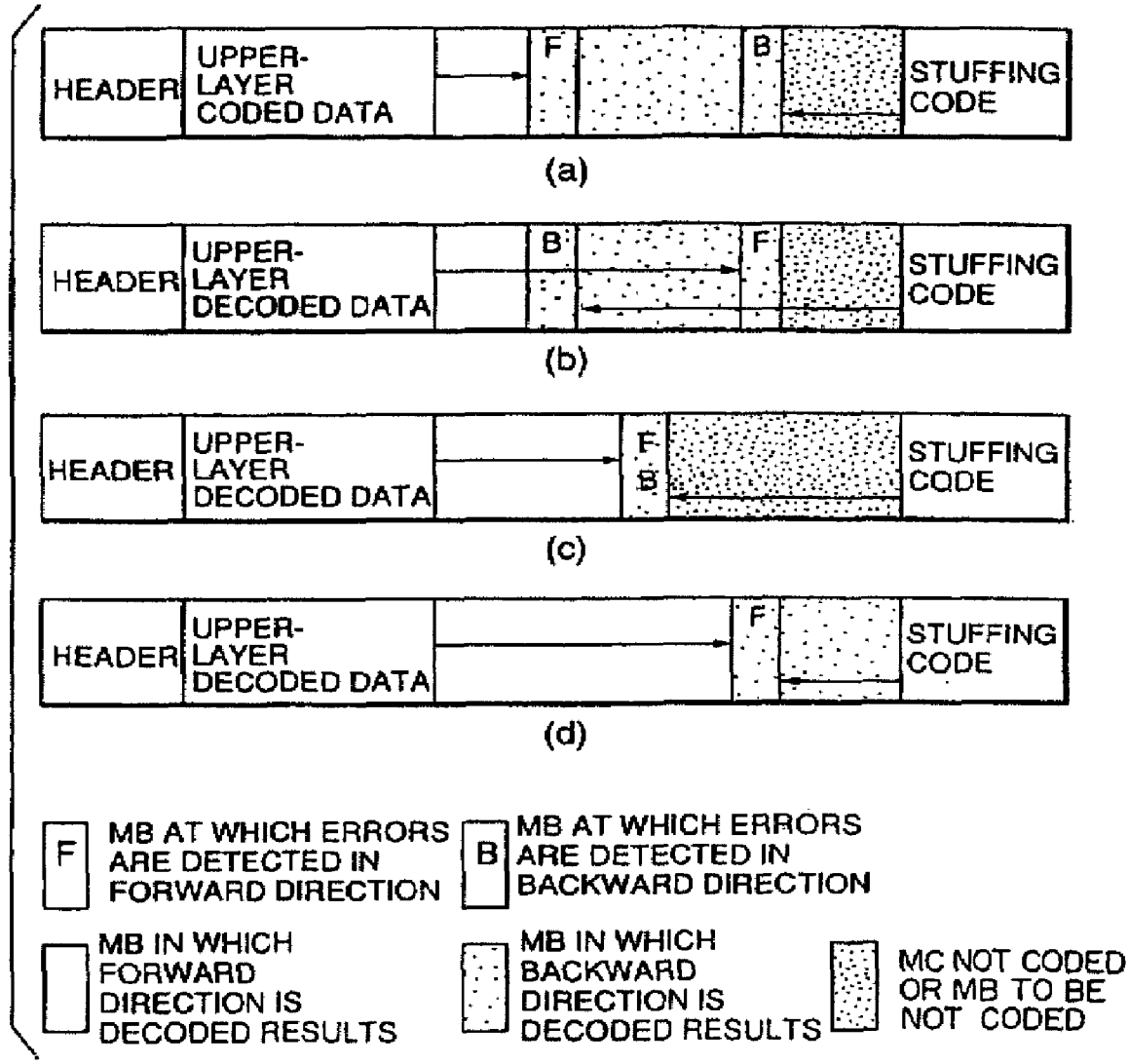
FIG. 76 is a diagram explaining the operation of a decoded-value determining part.

FIG. 76 shows a detailed decoded-value determining method in the AC-DCT coefficient portion of the interframe coding frame. First, as shown in FIG. 76(*a*), when the ways to the positions (error detected positions) of a macro block, in which errors are detected in the forward and backward decoded results, do not overlap with each other, only the decoded results of a macro block, in which no error has been decoded, are used as decoded values, and the decoded results at the two error detected positions are not used. In addition, the decoded results of the upper layer are rewritten on the basis of the decoded results of the upper layer so that the INTRA macro block is directly indicated by the last frame and the INTRA macro block is indicated only by the motion compensation using the last frame.

As shown in FIG. 76(*b*), when the ways to the error detected positions overlap with each other in the forward and backward decoded results, the forward decoded results are used for decoded values before the macro block, in which the error has been detected in the forward decoded result, and the backward decoded results are used for decoded values after the macro block.

Alternatively, the backward decoded results may be preferentially used for decoded values before the macro block, in which the error has been detected in the backward decoded result, and the forward decoded results may be used for decoded values after the macro block.

As shown in FIG. 76(*c*), when errors are detected in the same macro block both in the forward and backward decoded results, the decoded values in the macro block at the error detected position are abandoned and are not used for decoded values. In addition, the decoded results of the upper layer are rewritten on the basis of the decoded results of the mode information of the upper layer so that the INTRA macro block is directly indicated by the last frame and the INTER macro block is indicated by only the motion compensation using the last frame, and the backward decoded results are used for the decoded values after the macro block.

As shown in FIG. 76(*d*), when an error is detected in the stuffing code and the decoding can not be decoded in the backward direction, the decoding is carried out only in the forward direction. When the error is detected, the decoded results of the upper layer with respect to the macro blocks after the error detected position are rewritten on the basis or the decoded results of the mode information of the upper layer so that the INTRA macro blocks are directly indicated by the last frame and the INTER macro blocks are indicated only by the motion compensation using the last frame.

While the decoded values have been determined every macro blocks in the decoded-value determining method of FIG. 76, the detected values may be determined every block or code word.

As described in the above preferred embodiments, a variable length coding and/or decoding system of the present invention requires smaller amounts of calculation and storage to be efficient. Specifically, the variable length coding and/or decoding system can be applied to a moving picture coding and/or decoding, and it is possible to provide an efficient moving picture coding and/or decoding system with smaller amounts of calculation and storage.

The invention claimed is:

1. A computer-readable recording medium having stored therein a computer program for use in a variable length code, the program when executed by a computer, causing the computer to execute steps comprising:

selecting a code word corresponding to an inputted source symbol from a code word table, the code word table storing code words having code length according to occurrence probability of a plurality of source symbols, the code words being assigned for the source symbols, the code words being capable of being decoded both in forward and backward directions and being formed so that delimiters of the code words are capable of being identified by a predetermined weight of the code words, the code word table associating the code words with the inputted source symbols;

assigning the selected code word to every synchronization interval; and inserting a stuffing code capable of being decoded in backward direction to set a code length corresponding to the synchronization interval when code length of the code word assigned to the synchronization interval is less than code length of the synchronization interval.

2. A computer-readable recording medium having stored therein a computer program for use in a variable length code, the program, when executed by a computer, causing the computer to execute steps comprising:

selecting a code word corresponding to an inputted source symbol from a code word table storing code words having code length according to occurrence probability of a plurality of source symbols, the code words being assigned for the source symbols, the code words being capable of being decoded both in forward and backward directions, the code words being formed so that delimiters of the code words are capable of being identified by a predetermined weight of the code words, the code word table associating the code words with the inputted source symbols;

generating coding data by using the selected code word; and inserting a stuffing code capable of being decoded in backward direction to the coding data to set a synchronization interval.

3. A computer-readable recording medium having stored therein a computer program for use in a variable length code, the program assigning code words having code length according to occurrence probability of a plurality of source symbols to the source symbols, the code words being capable of being decoded both in forward and backward directions and being formed so that delimiters of the code words are capable of being identified by a predetermined weight of the code words, the variable length code associating the code words with the source symbols and being obtained by outputting the code words as coding data, the computer program, when executed by the computer, causing the computer to execute steps comprising:

assigning the code word corresponding to the inputted source symbol to every synchronization interval; and inserting a stuffing bit capable of being decoded in backward direction to set code length of the code word corresponding to the synchronization interval when code length of the code word assigned to the synchronization interval is less than code length of the synchronization interval.

4. A computer-readable recording medium having stored therein a computer program for use in a variable length code, the program relating to code words having code length according to occurrence probability of a plurality of source symbols, the code words being capable of being decoded both in forward and backward directions and being formed so that delimiters of the code words are capable of being identified by a predetermined weight of the code words, the computer program, when executed by the computer, causing the computer to execute steps comprising:

generating coding data capable of being assigned to a predetermined synchronization interval by using the code word corresponding to the inputted source symbol; and inserting a stuffing code capable of being decoded in backward direction in the coding data to set the synchronization interval.

5. A computer-readable recording medium having stored therein a computer program for use in a variable length code, the program, when executed by the computer, causing the computer to assign code words having code length according to occurrence probability of a plurality of source symbols, the code words being capable of being decoded both in forward and backward directions and being formed so that delimiters of the code words are capable of being identified by a predetermined weight of the code words, the computer program, when executed by the computer, causing the computer to execute steps comprising:

generating coding data by using the code word corresponding to the inputted source symbol;

assigning the generated coding data to a predetermined synchronization interval; and inserting a stuffing code capable of being decoded in backward direction in the synchronization interval to set code length corresponding to the synchronization interval.

6. A computer-readable recording medium having stored therein a computer program for use in a variable length code, the program, when executed by the computer, causing the computer to assign code words having code length according to occurrence probability of a plurality of source symbols to the source symbols, the code words being capable of being decoded both in forward and backward directions and being formed so that delimiters of the code words are capable of being identified by a predetermined weight of the code words, the variable being obtained by outputting the code word corresponding to the inputted source symbol as coding data, the computer program, when executed by the computer, causing the computer to execute steps comprising:

generating coding data by using the code word corresponding to the inputted source symbol; and adding to the coding data a stuffing code capable of being decoded in backward direction to set a synchronization interval.

7. A computer-readable recording medium having stored therein a computer program for use in a variable length code, the computer program when executed by the computer, causing the computer to execute steps comprising:

generating coding data by using a code word formed so that delimiters of the code words are identified by a predetermined weight of the code words, the code word being capable of being decoded in forward and backward directions; and setting a synchronization interval by adding to the coding data a stuffing code capable of being decoded in backward direction.

8. A computer-readable recording medium having therein a computer program for use in a variable length code, the program, when executed by the computer, causing the computer to assign code words having code length according to occurrence probability of a plurality of source symbols, the variable length code being obtained by outputting the code word corresponding to the inputted source symbol as coding data, the computer program, when executed by the computer, causing the computer to execute steps comprising:

reading out the code word corresponding to the source symbol inputted from a code word table storing the code words including at least the code words formed so that delimiters of the code words are identified by a weight predetermined in the code word, the code words being stored corresponding to the source symbols; and generating the coding data by using the read-out code word and inserting a stuffing code capable of being decoded in backward direction to set a synchronization interval.

9. A computer-readable recording medium having stored therein a computer program, the computer program, when executed by a computer, causing the computer to execute steps comprising:

reading out a variable length code corresponding to an input signal from a variable length code table in which variable length codes capable of being decoded in forward and backward directions are stored;

generating coding data by using the read-out variable length code; and adding a stuffing code capable of being decoded at least in backward direction to the generated coding data to set a predetermined synchronization interval.

* * * * *